US012271163B2

United States Patent
Sridharan et al.

(10) Patent No.: US 12,271,163 B2
(45) Date of Patent: Apr. 8, 2025

(54) BUILDING INFORMATION MODEL MANAGEMENT SYSTEM WITH HIERARCHY GENERATION

(71) Applicant: Tyco Fire & Security GmbH, Neuhausen am Rheinfall (CH)

(72) Inventors: Ashok Sridharan, Tiruchirappalli (IN); Ankur Thareja, Alwar (IN); Subrata Bhattacharya, Navi Mumbai (IN); Barnini Chatterjee, Kolkata (IN); Shailesh Mahadeo Tavate, Pune (IN); Shyam Sunder, Pune (IN); Sachin Ghorpade, Kamothe (IN); Piyush Mahajan, Pune (IN); Akash Kumar, Pune (IN)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 335 days.

(21) Appl. No.: 17/136,752

(22) Filed: Dec. 29, 2020

(65) Prior Publication Data

US 2021/0200174 A1    Jul. 1, 2021

(30) Foreign Application Priority Data

Dec. 31, 2019    (IN) .............................. 201941054631

(51) Int. Cl.
*G05B 17/02*    (2006.01)
*G05B 15/02*    (2006.01)
(Continued)

(52) U.S. Cl.
CPC ............. *G05B 15/02* (2013.01); *G05B 17/02* (2013.01); *G06F 16/13* (2019.01); *G06F 16/185* (2019.01);
(Continued)

(58) Field of Classification Search
CPC ....... G05B 17/02; G06F 16/288; G06F 40/30; G06Q 50/163
See application file for complete search history.

(56) References Cited

U.S. PATENT DOCUMENTS

| 5,301,109 | A | 4/1994 | Landauer et al. |
| 5,446,677 | A | 8/1995 | Jensen et al. |

(Continued)

FOREIGN PATENT DOCUMENTS

| AU | 2019226217 A1 | 11/2020 |
| AU | 2019226264 A1 | 11/2020 |

(Continued)

OTHER PUBLICATIONS

Balaji, Bharathan, et al. "Brick: Towards a unified metadata schema for buildings." Proceedings of the 3rd ACM International Conference on Systems for Energy-Efficient Built Environments. 2016. (Year: 2016).*

(Continued)

*Primary Examiner* — Robert E Fennema
*Assistant Examiner* — Vi N Tran
(74) *Attorney, Agent, or Firm* — Foley & Lardner LLP

(57) ABSTRACT

A system includes one or more memory devices having instructions stored thereon that, when executed by one or more processors, cause the one or more processors to perform operations including receiving building information model (BIM) data associated with a building comprising one or more building assets, identifying one or more BIM objects within the BIM, identifying one or more object relationships between the one or more BIM object, applying a semantic description to each of the one or more BIM objects and the one or more object relationships, and generating a hierarchy structure for the building based on the one of more BIM objects and the one or more object (Continued)

relationships. The one or more BIM objects are associated with the one or more building assets and the hierarchy structure includes the semantic description of each of the one or more BIM objects and the one or more object relationships.

20 Claims, 33 Drawing Sheets

(51) Int. Cl.
*G06F 16/13* (2019.01)
*G06F 16/185* (2019.01)
*G06F 16/28* (2019.01)
*G06F 40/30* (2020.01)
*G06Q 50/163* (2024.01)

(52) U.S. Cl.
CPC ............ *G06F 16/288* (2019.01); *G06F 40/30* (2020.01); *G06Q 50/163* (2013.01)

(56) References Cited

U.S. PATENT DOCUMENTS

| | | | |
|---|---|---|---|
| 5,581,478 A | 12/1996 | Cruse et al. | |
| 5,812,962 A | 9/1998 | Kovac | |
| 5,960,381 A | 9/1999 | Singers et al. | |
| 5,973,662 A | 10/1999 | Singers et al. | |
| 6,014,612 A | 1/2000 | Larson et al. | |
| 6,031,547 A | 2/2000 | Kennedy | |
| 6,134,511 A | 10/2000 | Subbarao | |
| 6,157,943 A | 12/2000 | Meyer | |
| 6,285,966 B1 | 9/2001 | Brown et al. | |
| 6,363,422 B1 | 3/2002 | Hunter et al. | |
| 6,385,510 B1 | 5/2002 | Hoog et al. | |
| 6,389,331 B1 | 5/2002 | Jensen et al. | |
| 6,401,027 B1 | 6/2002 | Xu et al. | |
| 6,437,691 B1 | 8/2002 | Sandelman et al. | |
| 6,477,518 B1 | 11/2002 | Li et al. | |
| 6,487,457 B1 | 11/2002 | Hull et al. | |
| 6,493,755 B1 | 12/2002 | Hansen et al. | |
| 6,577,323 B1 | 6/2003 | Jamieson et al. | |
| 6,626,366 B2 | 9/2003 | Kayahara et al. | |
| 6,646,660 B1 | 11/2003 | Patty | |
| 6,704,016 B1 | 3/2004 | Oliver et al. | |
| 6,732,540 B2 | 5/2004 | Sugihara et al. | |
| 6,764,019 B1 | 7/2004 | Kayahara et al. | |
| 6,782,385 B2 | 8/2004 | Natsumeda et al. | |
| 6,813,532 B2 | 11/2004 | Eryurek et al. | |
| 6,816,811 B2 | 11/2004 | Seem | |
| 6,823,680 B2 | 11/2004 | Jayanth | |
| 6,826,454 B2 | 11/2004 | Sulfstede | |
| 6,865,511 B2 | 3/2005 | Frerichs et al. | |
| 6,925,338 B2 | 8/2005 | Eryurek et al. | |
| 6,986,138 B1 | 1/2006 | Sakaguchi et al. | |
| 7,031,880 B1 | 4/2006 | Seem et al. | |
| 7,401,057 B2 | 7/2008 | Eder | |
| 7,552,467 B2 | 6/2009 | Lindsay | |
| 7,627,544 B2 | 12/2009 | Chkodrov et al. | |
| 7,818,249 B2 | 10/2010 | Lovejoy et al. | |
| 7,889,051 B1 | 2/2011 | Billig et al. | |
| 7,996,488 B1 | 8/2011 | Casabella et al. | |
| 8,078,330 B2 | 12/2011 | Brickfield et al. | |
| 8,104,044 B1 | 1/2012 | Scofield et al. | |
| 8,229,470 B1 | 7/2012 | Ranjan et al. | |
| 8,401,991 B2 | 3/2013 | Wu et al. | |
| 8,495,745 B1 | 7/2013 | Schrecker et al. | |
| 8,516,016 B2 | 8/2013 | Park et al. | |
| 8,532,808 B2 | 9/2013 | Drees et al. | |
| 8,532,839 B2 | 9/2013 | Drees et al. | |
| 8,600,556 B2 | 12/2013 | Nesler et al. | |
| 8,635,182 B2 | 1/2014 | MacKay | |
| 8,682,921 B2 | 3/2014 | Park et al. | |
| 8,731,724 B2 | 5/2014 | Drees et al. | |
| 8,737,334 B2 | 5/2014 | Ahn et al. | |
| 8,738,334 B2 | 5/2014 | Jiang et al. | |
| 8,751,487 B2 | 6/2014 | Byrne et al. | |
| 8,788,097 B2 | 7/2014 | Drees et al. | |
| 8,805,995 B1 | 8/2014 | Oliver | |
| 8,843,238 B2 | 9/2014 | Wenzel et al. | |
| 8,874,071 B2 | 10/2014 | Sherman et al. | |
| 8,941,465 B2 | 1/2015 | Pineau et al. | |
| 8,990,127 B2 | 3/2015 | Taylor | |
| 9,070,113 B2 | 6/2015 | Shafiee et al. | |
| 9,116,978 B2 | 8/2015 | Park et al. | |
| 9,185,095 B1 | 11/2015 | Moritz et al. | |
| 9,189,527 B2 | 11/2015 | Park et al. | |
| 9,196,009 B2 | 11/2015 | Drees et al. | |
| 9,229,966 B2 | 1/2016 | Aymeloglu et al. | |
| 9,286,582 B2 | 3/2016 | Drees et al. | |
| 9,311,807 B2 | 4/2016 | Schultz et al. | |
| 9,344,751 B1 | 5/2016 | Ream et al. | |
| 9,354,968 B2 | 5/2016 | Wenzel et al. | |
| 9,447,985 B2 | 9/2016 | Johnson | |
| 9,507,686 B2 | 11/2016 | Horn et al. | |
| 9,524,594 B2 | 12/2016 | Ouyang et al. | |
| 9,558,196 B2 | 1/2017 | Johnston et al. | |
| 9,652,813 B2 | 5/2017 | Gifford et al. | |
| 9,753,455 B2 | 9/2017 | Drees | |
| 9,811,249 B2 | 11/2017 | Chen et al. | |
| 9,838,844 B2 | 12/2017 | Emeis et al. | |
| 9,886,478 B2 | 2/2018 | Mukherjee | |
| 9,948,359 B2 | 4/2018 | Horton | |
| 10,055,114 B2 | 8/2018 | Shah et al. | |
| 10,055,206 B2 | 8/2018 | Park et al. | |
| 10,116,461 B2 | 10/2018 | Fairweather et al. | |
| 10,169,454 B2 | 1/2019 | Ait-Mokhtar et al. | |
| 10,171,297 B2 | 1/2019 | Stewart et al. | |
| 10,171,586 B2 | 1/2019 | Shaashua et al. | |
| 10,187,258 B2 | 1/2019 | Nagesh et al. | |
| 10,346,968 B2 * | 7/2019 | Yau | G06T 7/0004 |
| 10,372,090 B2 * | 8/2019 | Park | G05B 15/02 |
| 10,402,506 B2 * | 9/2019 | Bumbalough | G06F 30/13 |
| 10,467,758 B1 * | 11/2019 | Lorenzo | G06T 11/203 |
| 10,514,963 B2 | 12/2019 | Shrivastava et al. | |
| 10,515,098 B2 | 12/2019 | Park et al. | |
| 10,534,326 B2 | 1/2020 | Sridharan et al. | |
| 10,536,295 B2 | 1/2020 | Fairweather et al. | |
| 10,564,993 B2 | 2/2020 | Deutsch et al. | |
| 10,705,492 B2 | 7/2020 | Harvey | |
| 10,708,078 B2 | 7/2020 | Harvey | |
| 10,760,815 B2 | 9/2020 | Janakiraman et al. | |
| 10,762,475 B2 | 9/2020 | Song et al. | |
| 10,824,120 B2 | 11/2020 | Ahmed | |
| 10,845,771 B2 | 11/2020 | Harvey | |
| 10,854,194 B2 | 12/2020 | Park et al. | |
| 10,862,928 B1 | 12/2020 | Badawy et al. | |
| 10,871,756 B2 | 12/2020 | Johnson et al. | |
| 10,908,578 B2 | 2/2021 | Johnson et al. | |
| 10,921,760 B2 | 2/2021 | Harvey | |
| 10,921,768 B2 | 2/2021 | Johnson et al. | |
| 10,921,972 B2 | 2/2021 | Park et al. | |
| 10,969,133 B2 | 4/2021 | Harvey | |
| 10,986,121 B2 | 4/2021 | Stockdale et al. | |
| 11,016,998 B2 | 5/2021 | Park et al. | |
| 11,024,292 B2 | 6/2021 | Park et al. | |
| 11,038,709 B2 | 6/2021 | Park et al. | |
| 11,041,650 B2 | 6/2021 | Li et al. | |
| 11,054,796 B2 | 7/2021 | Holaso | |
| 11,070,390 B2 | 7/2021 | Park et al. | |
| 11,073,976 B2 | 7/2021 | Park et al. | |
| 11,108,587 B2 | 8/2021 | Park et al. | |
| 11,113,295 B2 | 9/2021 | Park et al. | |
| 11,156,978 B2 | 10/2021 | Johnson et al. | |
| 11,229,138 B1 | 1/2022 | Harvey et al. | |
| 11,288,412 B2 * | 3/2022 | Golparvar-Fard | G06F 30/13 |
| 11,314,726 B2 | 4/2022 | Park et al. | |
| 11,314,788 B2 | 4/2022 | Park et al. | |
| 11,481,526 B2 * | 10/2022 | Tierney | G06Q 50/08 |
| 11,556,105 B2 | 1/2023 | Cooley et al. | |
| 11,561,522 B2 | 1/2023 | Cooley et al. | |
| 11,561,523 B2 | 1/2023 | Cooley et al. | |
| 11,573,551 B2 | 2/2023 | Cooley et al. | |
| 11,586,167 B2 | 2/2023 | Cooley et al. | |

(56) References Cited

U.S. PATENT DOCUMENTS

| | | |
|---|---|---|
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0131533 A1 | 5/2010 | Ortiz |
| 2010/0198563 A1 | 8/2010 | Plewe |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | MacKay et al. |
| 2011/0087988 A1 | 4/2011 | Ray et al. |
| 2011/0088000 A1 | 4/2011 | Mackay |
| 2011/0093424 A1* | 4/2011 | Zimmermann ........ G05B 17/02 706/47 |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218772 A1 | 9/2011 | Bumbalough et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | MacKay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0211791 A1 | 8/2013 | Tsai et al. |
| 2013/0246916 A1 | 9/2013 | Reimann et al. |
| 2013/0247205 A1 | 9/2013 | Schrecker et al. |
| 2013/0257850 A1* | 10/2013 | Chen ...................... G06T 19/20 345/522 |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2013/0338970 A1 | 12/2013 | Reghetti |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0089344 A1 | 3/2015 | Pickering et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | McFarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |

(56) References Cited

U.S. PATENT DOCUMENTS

| | | |
|---|---|---|
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0210377 A1 | 7/2016 | Bumbalough et al. |
| 2016/0210569 A1* | 7/2016 | Enck .................. G06Q 10/0637 |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0247129 A1 | 8/2016 | Song et al. |
| 2016/0260063 A1 | 9/2016 | Harris et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357521 A1 | 12/2016 | Zhang et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0032581 A1 | 2/2017 | Petrucci et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0115642 A1 | 4/2017 | Sridharan et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | MacMillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357738 A1 | 12/2017 | Garske et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gärtner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0239322 A1* | 8/2018 | Matsuo ................ G06Q 50/163 |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0356775 A1 | 12/2018 | Harvey |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0102840 A1 | 4/2019 | Perl et al. |
| 2019/0121801 A1 | 4/2019 | Jethwa et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0268178 A1 | 8/2019 | Fairweather et al. |
| 2019/0310979 A1 | 10/2019 | Masuzaki et al. |
| 2019/0377306 A1 | 12/2019 | Harvey |
| 2020/0081979 A1* | 3/2020 | Gauderis ................ G06F 40/30 |
| 2020/0133978 A1 | 4/2020 | Ramamurti et al. |
| 2020/0226156 A1 | 7/2020 | Borra et al. |
| 2020/0285203 A1 | 9/2020 | Thakur et al. |
| 2020/0336328 A1 | 10/2020 | Harvey |
| 2020/0348632 A1 | 11/2020 | Harvey |
| 2020/0387576 A1* | 12/2020 | Brett ................... G06F 3/04815 |
| 2020/0396208 A1 | 12/2020 | Brett et al. |
| 2021/0018881 A1* | 1/2021 | Rezgui .................. G06N 5/01 |
| 2021/0042299 A1 | 2/2021 | Migliori |
| 2021/0043221 A1 | 2/2021 | Yelchuru et al. |
| 2021/0073449 A1* | 3/2021 | Segev ................... G06F 30/27 |
| 2021/0325070 A1 | 10/2021 | Endel et al. |
| 2021/0342961 A1 | 11/2021 | Winter et al. |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0121965 A1 | 4/2022 | Chatterji et al. |
| 2022/0138684 A1 | 5/2022 | Harvey |
| 2022/0147000 A1 | 5/2022 | Cooley et al. |
| 2022/0150124 A1 | 5/2022 | Cooley et al. |
| 2022/0215264 A1 | 7/2022 | Harvey et al. |
| 2023/0010757 A1 | 1/2023 | Preciado |

(56) References Cited

U.S. PATENT DOCUMENTS

| | | |
|---|---|---|
| 2023/0071312 A1 | 3/2023 | Preciado et al. |
| 2023/0076011 A1 | 3/2023 | Preciado et al. |
| 2023/0083703 A1 | 3/2023 | Meiners |

FOREIGN PATENT DOCUMENTS

| | | |
|---|---|---|
| AU | 2019351573 A1 | 5/2021 |
| CA | 2957726 A1 | 3/2016 |
| CA | 3043996 A1 | 2/2018 |
| CN | 101415011 A | 4/2009 |
| CN | 102136099 A | 7/2011 |
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 186 687 A4 | 7/2017 |
| EP | 3 268 821 B1 | 1/2018 |
| EP | 3 324 306 A1 | 5/2018 |
| EP | 3 497 377 A1 | 6/2019 |
| EP | 4 226 263 A1 | 8/2023 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |
| WO | WO-2018/132112 A1 | 7/2018 |
| WO | WO-2020/061621 A1 | 4/2020 |
| WO | WO-2022/042925 A1 | 3/2022 |
| WO | WO-2022/103812 A1 | 5/2022 |
| WO | WO-2022/103813 A1 | 5/2022 |
| WO | WO-2022/103820 A1 | 5/2022 |
| WO | WO-2022/103822 A1 | 5/2022 |
| WO | WO-2022/103824 A1 | 5/2022 |
| WO | WO-2022/103829 A1 | 5/2022 |
| WO | WO-2022/103831 A1 | 5/2022 |

OTHER PUBLICATIONS

Lange, Henrik, Aslak Johansen, and Mikkel Baun Kjærgaard. "Evaluation of the opportunities and limitations of using IFC models as source of building metadata." Proceedings of the 5th Conference on Systems for Built Environments. 2018. (Year: 2018).*
Brick. "Metadata Schema for Buildings." Brickschema.org, 2018, https://brickschema.org/docs/Brick-Leaflet.pdf (Year: 2018).*
Li, Zhi, Sander van Nederveen, and Rogier Wolfert. "Towards more integrated information management solutions for lifecycle asset management for integrated infrastructure projects." Life-Cycle of Engineering Systems: Emphasis on Sustainable Civil Infrastructure CRC Press, 2016. 662-668. (Year: 2016).*
Lin, Jia-Rui, et al. "A natural-language-based approach to intelligent data retrieval and representation for cloud BIM." Computer-Aided Civil and Infrastructure Engineering 31.1 (2016): 18-33. (Year: 2016).*
Balaji et al, "Brick: Metadata schema for portable smart building applications," Applied Energy, 2018 (20 pages).
Balaji et al, "Brick: Metadata schema for portable smart building applications," Applied Energy, Sep. 15, 2018, 3 pages, (Abstract).
Balaji et al, "Demo Abstract: Portable Queries Using the Brick Schema for Building Applications," BuildSys '16, Palo Alto, CA, USA, Nov. 16-17, 2016 (2 pages).
Bhattacharya et al., "Short Paper: Analyzing Metadata Schemas for Buildings—The Good, The Bad and The Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema for Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).

(56) References Cited

OTHER PUBLICATIONS

Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jun. 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, mailed Oct. 5, 2017, 11 pages.
International Search Report and Written Opinion on PCT/US2017/052633, mailed Oct. 23, 2017, 9 pages.
International Search Report and Written Opinion on PCT/US2017/052829, mailed Nov. 27, 2017, 24 pages.
International Search Report and Written Opinion on PCT/US2018/024068, mailed Jun. 15, 2018, 22 pages.
International Search Report and Written Opinion on PCT/US2018/052971, dated Mar. 1, 2019, 19 pages.
International Search Report and Written Opinion on PCT/US2018/052974, mailed Dec. 19, 2018, 13 pages.
International Search Report and Written Opinion on PCT/US2018/052975, mailed Jan. 2, 2019, 13 pages.
International Search Report and Written Opinion on PCT/US2018/052994, mailed Jan. 7, 2019, 15 pages.
International Search Report and Written Opinion on PCT/US2019/015481, dated May 17, 2019, 78 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Nissin Electric Co., Ltd., "Smart power supply system (SPSS)," Outline of the scale verification plan, Nissin Electric Technical Report, Japan, Apr. 23, 2014, vol. 59, No. 1 (23 pages).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, 2021 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work for Your Business: A guide to effective Big Data analytics," Impackt Publishing LTD., Birmingham, UK, Oct. 2014 (170 pages).
The Virtual Nuclear Tourist, "Calvert Cliffs Nuclear Power Plant," URL: http://www.nucleartourist.com/us/calvert.htm, Jan. 11, 2006 (2 pages).
University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).
Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
W3c, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
Zhou, Q. et al., "Knowledge-infused and Consistent Complex Event Processing over Real-time and Persistent Streams," Further Generation Computer Systems, 2017, 76 (pp. 391-406).
Balaji et al, "Brick: Towards a Unified Metadata Schema for Buildings," dated Nov. 16-17, 2016, 10 pages.
Koh et al., "Poster: Scrabble: Converting Unstructured Metadata into Brick for Many Buildings," BuildSys'17, Nov. 8-9, 2017, 2 pages.
Koh et al., "Scrabble: Transferrable Semi-Automated Semantic Metadata Normalization using Intermediate Representation," dated Nov. 7-8, 2018, 10 pages.
Coolinglogic, "CoolingLogic: Up early, saving billions." URL: http://coolinglogic.com/documents/MarketingFlyer_FINAL_HiRes8.5x11.pdf, retrieved from internet Oct. 27, 2022 (1 page).
Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
Johnson Heating and Cooling L.L.C., "Divine Grace Building Automation (Images)," URL: http://cooljohnson.com/Building-

(56) References Cited

OTHER PUBLICATIONS

Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building- Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).
Johnson, David, "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).
Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
White et al., "Reduce building maintenance costs with AWS IoT TwinMaker Knowledge Graph," The Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).
U.S. Appl. No. 17/566,029, PASSIVELOGIC, INC.
U.S. Appl. No. 17/567,275, PASSIVELOGIC, INC.
U.S. Appl. No. 17/722,115, PASSIVELOGIC, INC.

\* cited by examiner

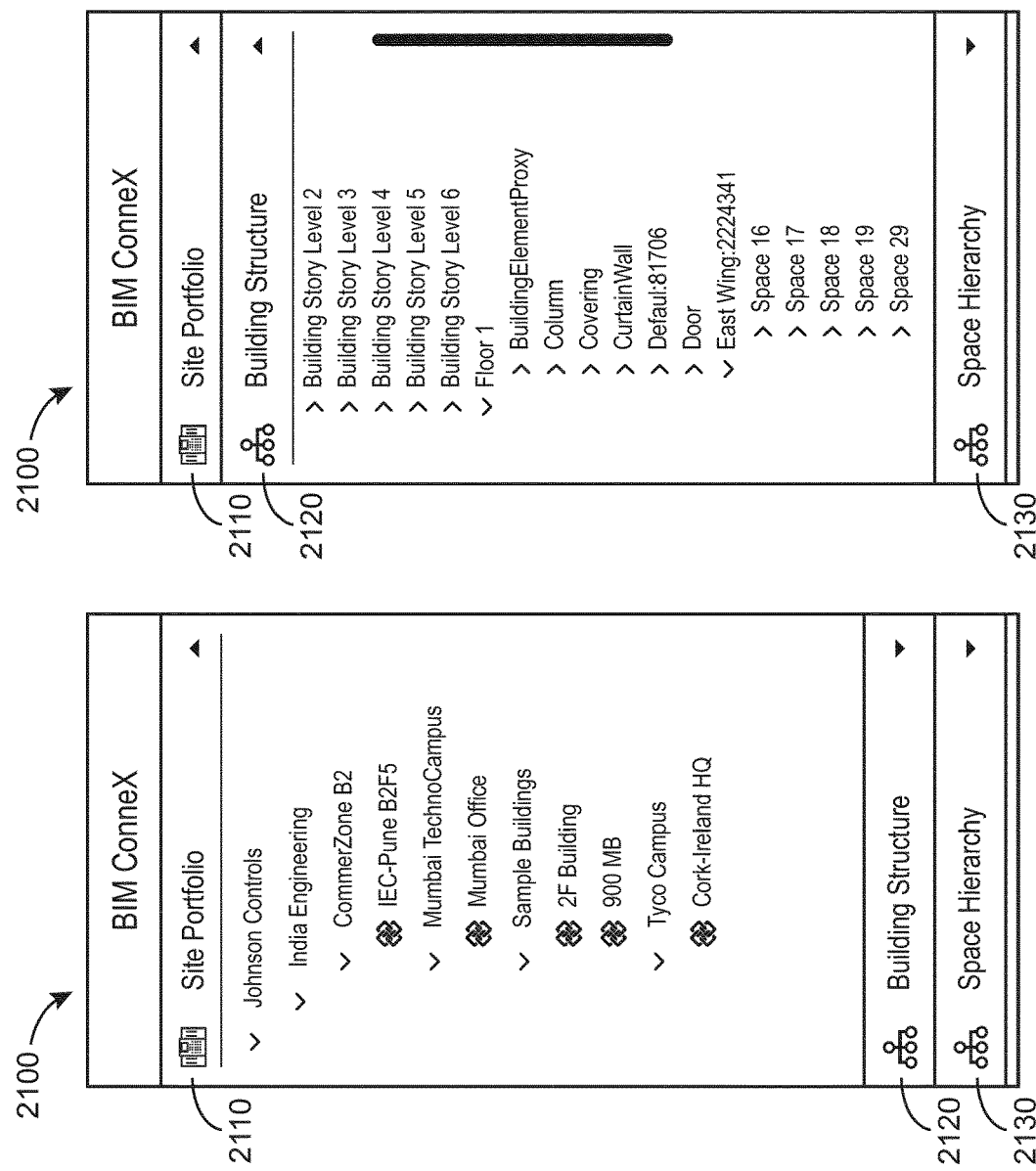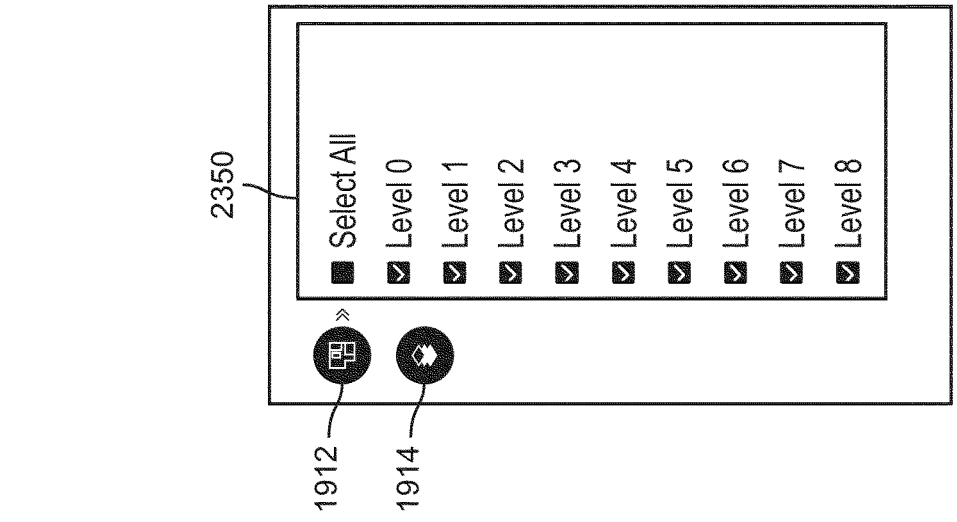
FIG. 21A   FIG. 21B   FIG. 21C

BUILDING INFORMATION MODEL MANAGEMENT SYSTEM WITH HIERARCHY GENERATION

CROSS-REFERENCE TO RELATED PATENT APPLICATIONS

This application claims the benefit of and priority to Indian Patent Application No. 201941054631, filed Dec. 31, 2019, which is incorporated by reference herein in its entirety.

BACKGROUND

The present disclosure relates generally to building information models (BIMs) and more particularly to systems and methods for configuring BIMs and generating graphical (e.g., three dimensional, or 3D) models from BIM data.

A BIM is a representation of the physical and/or functional characteristics of a building. A BIM may represent structural characteristics of the building (e.g., walls, floors, ceilings, doors, windows, etc.) as well as the systems or components contained within the building (e.g., lighting components, electrical systems, mechanical systems, HVAC components, furniture, plumbing systems or fixtures, etc.). In some embodiments, a BIM is a 3D graphical model of the building. A BIM may be created using computer modeling software or other computer-aided design (CAD) tools and may be used by any of a plurality of entities that provide building-related services.

Configuring a BIM can be a time consuming process, and configuring BIMs and generating 3D graphical models may not be easily understandable for many users. Further, BIM software often has functional limitations, such as allowing manipulation and/or presentation of only one BIM file at a time. It would be desirable to use systems and methods to configure BIMs that automate at least a portion of the configuration process. Additionally, such systems and methods would preferably make BIM configuration and facility management more accessible, for example, by providing more intuitive user interfaces or by reducing the complexity in organizing and navigating between and within BIMs.

SUMMARY

One implementation of the present disclosure is a system. The system includes one or more memory devices having instructions stored thereon that, when executed by one or more processors, cause the one or more processors to perform operations including obtaining building information model (BIM) data associated with a building including one or more building assets; identifying one or more BIM objects within the BIM data, the one or more BIM objects associated with the one or more building assets; identifying one or more object relationships between the one or more BIM objects; applying semantic descriptions to the one or more BIM objects and the one or more object relationships; and generating a hierarchy structure for the building based on the one of more BIM objects and the one or more object relationships, the hierarchy structure including the semantic descriptions of the one or more BIM objects and the one or more object relationships.

In some embodiments, the operations further include extracting metadata from the BIM data, and the metadata is used to identify the one or more BIM objects and the one or more object relationships.

In some embodiments, the operations further include mapping the one or more BIM objects to points within a building automation system (BAS) associated with the building, and the points within the BAS correspond to the one or more building assets.

In some embodiments, the BIM data is received as one or more industry foundation class (IFC) files.

In some embodiments, the semantic description describes the one or more BIM objects and the one or more object relationships in a natural language.

In some embodiments, applying the semantic description includes mapping the one or more BIM objects and the one or more object relationships to a Brick schema.

In some embodiments, the one or more building assets include building equipment and spaces within the building.

In some embodiments, the operations further including generating a 3D model of the building based on the BIM data, the 3D model including the semantic description of the one or more BIM objects and the one or more object relationships.

In some embodiments, the hierarchy structure defines physical or spatial relationships between the one or more BIM objects.

In some embodiments, generating the hierarchy structure includes identifying hierarchy levels associated with the one or more BIM objects based on the one or more object relationships and ordering the one or more BIM objects based in an associated hierarchy level.

Another implementation of the present disclosure is a method. The method includes obtaining, by one or processors, building information model (BIM) data associated with a building including one or more building assets; identifying, by the one or more processors, one or more BIM objects within the BIM, the one or more BIM objects associated with the one or more building assets; identifying, by the one or more processors, one or more object relationships between the one or more BIM objects; applying, by the one or more processors, semantic descriptions the one or more BIM objects and the one or more object relationships; and generating, by the one or more processors, a hierarchy structure for the building based on the one of more BIM objects and the one or more object relationships, the hierarchy structure including the semantic description of each of the one or more BIM objects and the one or more object relationships.

In some embodiments, the method further includes extracting metadata from the BIM data, and the metadata is used to identify the one or more BIM objects and the one or more object relationships.

In some embodiments, the method further includes mapping the one or more BIM objects to points within a building automation system (BAS) associated with the building, and the points within the BAS corresponds to one of the one or more building assets.

In some embodiments, the BIM data is obtained as one or more industry foundation class (IFC) files.

In some embodiments, the semantic description describes the one or more BIM objects and the one or more object relationships in a natural language.

In some embodiments, applying the semantic description includes mapping the one or more BIM objects and the one or more object relationships to a Brick schema.

In some embodiments, the one or more building assets include building equipment and spaces.

In some embodiments, the method further includes generating a 3D model of the building based on the BIM data, the 3D model includes the semantic descriptions of the one or more BIM objects and the one or more object relationships.

In some embodiments, the hierarchy structure defines physical or spatial relationships between the one or more BIM objects.

Yet another implementation of the present disclosure is non-transitory computer readable media. The non-transitory computer readable media has instructions stored thereon that, when executed by one or more processors, cause the one or more processors to perform operations including obtaining building information model (BIM) data associated with a building including one or more building assets; extracting metadata from the BIM data to identify one or more BIM objects associated with the one or more building assets and relationships between the one or more BIM objects; applying a semantic description schema to the extracted metadata, the semantic description schema defining the one or more BIM objects and relationships in a natural language; generating a hierarchy structure for the building based on the one of more BIM objects and the relationships, the hierarchy structure including the semantic description of the one or more BIM objects and the one or more object relationships; and presenting, via a user interface of a user device, the hierarchy structure.

Yet another implementation of the present disclosure is a system. The system includes one or more memory devices having instructions stored thereon that, when executed by one or more processors, cause the one or more processors to perform operations including obtaining a first building information model (BIM) file associated with a building, the building including one or more building assets; obtaining a second BIM file associated with the building; linking data from the first BIM file to data from the second BIM file; and concurrently presenting, via a single user interface, a representation of at least a portion of the first BIM file and the second BIM file based on the linked data.

In some embodiments, the operations further include applying a semantic description schema to the first BIM file and the second BIM file.

In some embodiments, the semantic description schema is Brick schema.

In some embodiments, the operations include receiving a first user input identifying one of the first BIM file or the second BIM file as a base file herein data from the first BIM file or the second BIM file not identified as the base file is linked to the base file.

In some embodiments, concurrently presenting the representation includes generating a 3-dimensional (3D) model of the building based on the linked data.

In some embodiments, the operations further include generating a hierarchy structure for the first BIM file and the second BIM file, and the hierarchy structure defines physical relationships between building assets represented within the first BIM file and the second BIM file.

In some embodiments, the one or more building assets include at least one of building equipment or building spaces.

In some embodiments, the first BIM file includes a first set of BIM objects and the second BIM file includes a second set of BIM objects, the operations further including mapping the first set of BIM objects and the second set of BIM objects to a plurality of points within a building automation system (BAS), the plurality of points corresponding to one of the one or more building assets.

In some embodiments, the one or more building assets include at least one of building equipment or building spaces.

Yet another implementation of the present disclosure is a method. The method includes receiving, by one or more processors, a first building information model (BIM) file associated with a building, the building including one or more building assets; obtaining, by the one or more processors, a second BIM file associated with the building; linking, by the one or more processors, data from the first BIM file to data from the second BIM file; and concurrently presenting, by the one or more processors via a single user interface, a representation of at least a portion of the first BIM file and the second BIM file based on the linked data.

In some embodiments, the method further includes applying a semantic description schema to the first BIM file and the second BIM file.

In some embodiments, the semantic description schema is Brick schema.

In some embodiments, the method further includes receiving a first user input identifying one of the first BIM file or the second BIM file as a base file, and data from the first BIM file or the second BIM file not identified as the base file is linked to the base file.

In some embodiments, concurrently presenting the representation includes generating a 3-dimensional (3D) model of the building based on the linked data.

In some embodiments, the method further includes generating a hierarchy structure for the first BIM file and the second BIM file, and the hierarchy structure defines physical relationships between building assets represented within the first BIM file and the second BIM file.

In some embodiments, the one or more building assets include at least one of building equipment or building spaces.

In some embodiments, the first BIM file includes a first set of BIM objects and the second BIM file includes a second set of BIM objects, the operations further includes mapping the first set of BIM objects and the second set of BIM objects to a plurality of points within a building automation system (BAS), the plurality of points corresponding to one of the one or more building assets.

In some embodiments, the one or more building assets include at least one of building equipment and building spaces.

Yet another implementation of the present disclosure is a method. The method includes receiving, by one or more processors, two or more building information model (BIM) files corresponding to a building including one or more building assets; receiving, by the one or more processors, a first user input selecting one of the two or more BIM files as a base file; linking, by the one or more processors, data from the base file to any of the two or more BIM files not identified as the base file; and generating, by the one or more processors, a 3-dimensional (3D) building model based on the linked data, wherein the 3D building model includes at least a portion of each of the two or more BIM files; and presenting, via a single user interface, the 3D building model.

In some embodiments, the method further includes applying a semantic description schema to each of the two or more BIM file.

Yet another implementation of the present disclosure is a method for identifying faults within a building including one or more building assets. The method includes receiving a building information model (BIM) associated with the building identifying a first asset of the one or more building assets, determining at least one of an input asset or an output asset of the first asset within the BIM, identifying a fault condition for the first asset, and presenting, via a user interface, a representation of at least a portion of the BIM comprising the first asset and the at least one of the input asset or the output asset. The first asset is represented within the BIM, and the input asset affects the first asset and the output asset is affected by the first asset. The first asset indicates the fault condition within the representation and a visual appearance of the at least one of the input asset or the output asset within the representation changes responsive to a selection of the first asset.

In some embodiments, the visual appearance of the at least one of the input asset or the output asset changes by altering a style or a color of the visual appearance to distinguish the at least one of the input asset or the output asset.

Yet another implementation of the present disclosure is a method. The method includes receiving, by one or more processors, a first building information model (BIM) file and a second BIM file, the first BIM file and the second BIM file both associated with a building including one or more assets; identifying, by the one or more processors, a first set of BIM objects within the first BIM file and a second set of BIM objects within the second BIM file, the first set of BIM objects and the second set of BIM objects each including one or more BIM objects associated with the one or more assets; identifying, by the one or more processors, one or more relationships between objects of the first set of BIM objects and objects of the second set of BIM objects; applying, by the one or more processors, a semantic description to the first set of BIM objects, the second set of BIM objects, and the one or more relationships; and after applying the semantic description, generating, by the one or more processors, a data structure including the first set of BIM objects, the second set of BIM objects, and the relationships.

In some embodiments, the method further includes identifying, by the one or more processors, a hierarchy level for the first BIM file and the second BIM file, and the hierarchy level indicates a category for a corresponding BIM file.

In some embodiments, identifying the hierarchy level for the first BIM file and the second BIM file further includes receiving, by the one or more processors, a first user input selecting a particular hierarchy level as a placeholder and linking, by the one or more processors, the first BIM file and the second BIM file to the placeholder.

In some embodiments, at least one of the one or more assets are spaces within the building.

In some embodiments, the data structure further includes a hierarchical list of the spaces within the building.

In some embodiments, the method further includes presenting, via a graphical user interface, a representation of the data structure.

In some embodiments, the method further includes mapping, by the one or more processors, the first set of BIM objects and the second set of BIM objects to one or more points within a building automation system (BAS).

In some embodiments, the semantic description is a natural language description.

Yet another implementation of the present disclosure is a system. The system includes one or more memory devices having instructions stored thereon that, when executed by one or more processors, cause the one or more processors to perform operations including receiving a first building information model (BIM) file and a second BIM file, the first BIM file and the second BIM file both associated with a building including one or more assets; identifying a first set of BIM objects within the first BIM and a second set of BIM objects within the second BIM, the first set of BIM objects and the second set of BIM object each including one or more BIM objects associated with the one or more assets; identifying one or more relationships between objects of the first set of BIM objects and objects of the second set of BIM objects; applying a semantic description to the first set of BIM objects, the second set of BIM objects, and the one or more relationships; and after applying the semantic description schema, generating a data structure including the first set of BIM objects, the second set of BIM objects, and the relationships.

In some embodiments, the operations further including identifying a hierarchy level for the first BIM file and the second BIM file, and the hierarchy level indicates a category for a corresponding BIM file.

In some embodiments, identifying the hierarchy level for the first BIM file and the second BIM file further includes receiving a first user input selecting a particular hierarchy level as a placeholder and linking the first BIM file and the second BIM file to the placeholder.

In some embodiments, at least one of the one or more assets are spaces within the building.

In some embodiments, the data structure further includes a hierarchical list of the spaces within the building.

In some embodiments, the operations further including presenting, via a graphical user interface, a representation of the data structure.

In some embodiments, the operations further including mapping the first set of BIM objects and the second set of BIM objects to one or more points within a building automation system (BAS).

In some embodiments, applying the semantic description includes mapping the first set of BIM object, the second set of BIM objects, and the relationships to Brick schema.

Yet another implementation of the present disclosure is a method. The method includes receiving two or more building information model (BIM) files corresponding to a building including one or more building assets; identifying, for the two or more BIM files, hierarchy levels corresponding to spaces within the building; generating a site portfolio based on the hierarchy levels for the two or more BIM files, wherein the site portfolio is a data structure that includes a plurality of BIM objects associated with the two or more BIM files and defines relationships between the plurality of BIM objects according to the hierarchy levels; and presenting, via a user interface, a representation of the site portfolio and a 3-dimensional (3D) model of the building based on the two or more BIM files.

In some embodiments, the one or more building assets include at least one of building equipment or spaces within the building.

In some embodiments, the method further includes applying a semantic description schema to the two or more BIM files, the semantic description schema describing the plurality of BIM objects and relationships between the BIM objects in a natural language.

In some embodiments, the method further includes mapping the plurality of BIM objects to one or more points of a building automation system (BAS).

Yet another implementation of the present disclosure is a method that includes receiving a building information model (BIM) associated with a building that a plurality of spaces and a plurality of assets, receiving at least one of thermal data or energy consumption data associated with the plurality of spaces and assets, generating at least one of aggregate thermal data or aggregate energy consumption data, mapping the at least one of aggregate thermal data or aggregate energy consumption data to the plurality of BIM objects, and presenting, via a user interface, the BIM, where the at least one of aggregate thermal or aggregate energy consumption data is presented within the BIM. The BIM includes a plurality of BIM objects each associated with one of the plurality of spaces and one of the plurality of assets. In some embodiments, the aggregate thermal data indicating an average temperature for one or more of the plurality of spaces and the aggregated energy consumption data indicating a total energy consumption for one or more of the plurality of assets.

Yet another implementation of the present disclosure is a system including one or more processing circuits configured to receive a first building information model (BIM) associated with a building comprising one or more building assets, identify one or more BIM objects within the BIM and one or more object relationships between the one or more BIM objects, generate a configuration for the first BIM based on the one or more BIM objects and the one or more object relationships, store, in a memory, the first BIM and the configuration for the first BIM, receive, via a user interface, a second BIM associated with the building, and apply the configuration for the first BIM to the second BIM. Generally, each the one or more BIM objects correspond to one of the one or more building assets and the configuration includes at least one of parameters, thermal data, or energy consumption data for the one or more assets associated with the one of more BIM objects.

Yet another implementation of the present disclosure is a method including receiving a building information model (BIM) associated with a building including one or more assets, receiving at least one of fault data or diagnostic data associated with the one or more assets, presenting, via a user interface, the BIM, receiving, via the user interface, a selection of a first BIM object associated with one of the one or more assets, and presenting, via the user interface, at least one of the fault data or the diagnostic data associated with the first BIM object responsive to the selection of the first BIM object, where the at least one of the fault data or the diagnostic data is presented as an overlay to the first BIM object. In some embodiments, the one or more assets are represented within the BIM as BIM objects.

Yet another implementation of the present disclosure is a method including identifying a first set of object identifiers within an analytics platform, identifying a second set of object identifiers within a building information model (BIM) associated with a building that includes one or more building assets, generating an interface that links the first set of object identifiers with the second set of object identifiers, and generating a 3D model of the BIM. In some embodiments, the analytics platform includes analytical data associated with one or more assets managed by the analytics platform and the first set of object identifiers are associated with the one or more assets. In some embodiments, the second set of object identifiers are associated with the one or more building assets. In some embodiments, the analytical data associated with the first set of object identifiers is presented within the 3D model.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIGS. 21A-21C are example navigation interfaces that may be presented within the BIM viewer, according to various embodiments.

DETAILED DESCRIPTION

Referring generally to the FIGURES, a building automation system (BAS) with a building information model (BIM) management system is shown, according to some embodiments. A BAS is, in general, a system of devices configured to control, monitor, and manage equipment in or around a building or building area. A BAS can include, for example, a HVAC system, a security system, a lighting system, a fire safety system, any other system that is capable of managing building functions or devices, or any combination thereof. The BIM management system may operate to receive and configure BIMs, and may generate 3D graphical models of a facility or building represented by the BIMs.

In general, a BIM represents physical and/or functional characteristics of a building. For example, a BIM may represent structural characteristics of the building such as walls, floors, ceilings, doors, windows, etc., and/or subsystems of the building such as electrical, mechanical, HVAC, or other subsystems. In some embodiments, a BIM may represent a plurality of physical building assets including spaces and/or equipment of a building represented by the BIM. In some embodiments, a BIM is a 3D graphical model of the building or BIM data may be used to generate a 3D graphical model. A BIM may be used by any of a plurality of entities that provide building-related services.

In some embodiments, a BIM represents building components as objects (e.g., software objects). For example, a BIM may include a plurality of objects that represent physical components within the building as well as building spaces. Each object may include a collection of attributes that define the physical geometry of the object, the type of object, and/or other properties of the object. For example, objects representing building spaces may define the size and location of the building space. Objects representing physical components may define the geometry of the physical component, the type of component (e.g., lighting fixture, air handling unit, wall, etc.), the location of the physical component, a material from which the physical component is constructed, and/or other attributes of the physical component.

The systems and methods described herein may be used to automatically configure a BIM for integration with a BAS. Advantageously, the systems and methods provided by the present disclosure may increase the ease-of-use and efficiency of a BIM configuration process. Such systems and methods may also describe an improved BIM viewer with increased usability and functionality for a wide range of users. Additional features and advantages of the present disclosure are described in greater detail below.

Building with Building Systems

Figure 1:
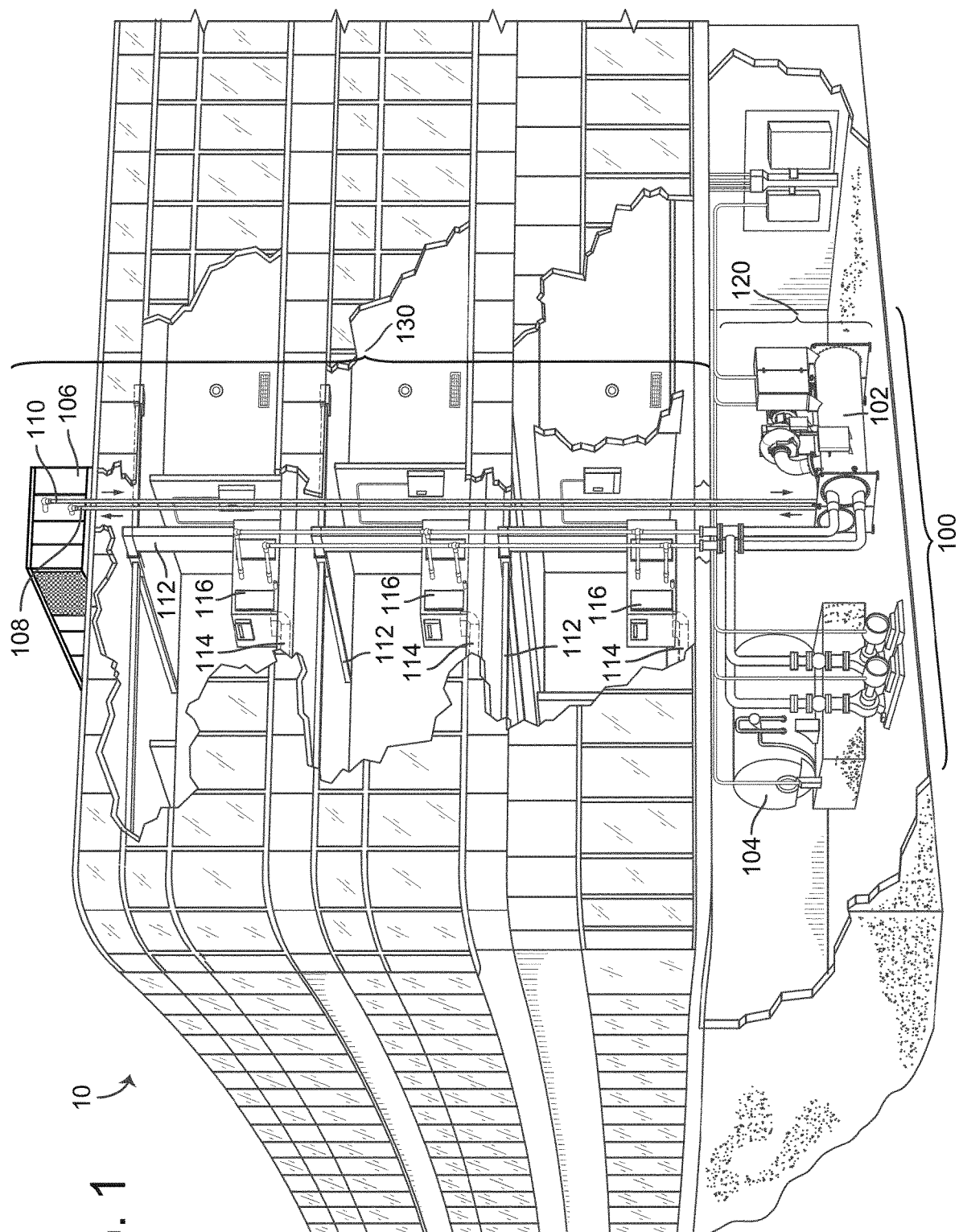
FIG. 1 is a drawing of a building equipped with a HVAC system, according to some embodiments.

Referring now to FIGS. 1-4, an exemplary building automation system (BAS) and HVAC system in which the systems and methods of the present disclosure can be implemented are shown, according to some embodiments. Referring particularly to FIG. 1, a perspective view of a building 10 is shown. Building 10 is served by a BAS. A BAS is, in general, a system of devices configured to control, monitor, and manage equipment in or around a building or building area. A BAS can include, for example, a HVAC system, a security system, a lighting system, a fire safety system, any other system that is capable of managing building functions or devices, or any combination thereof.

The BAS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
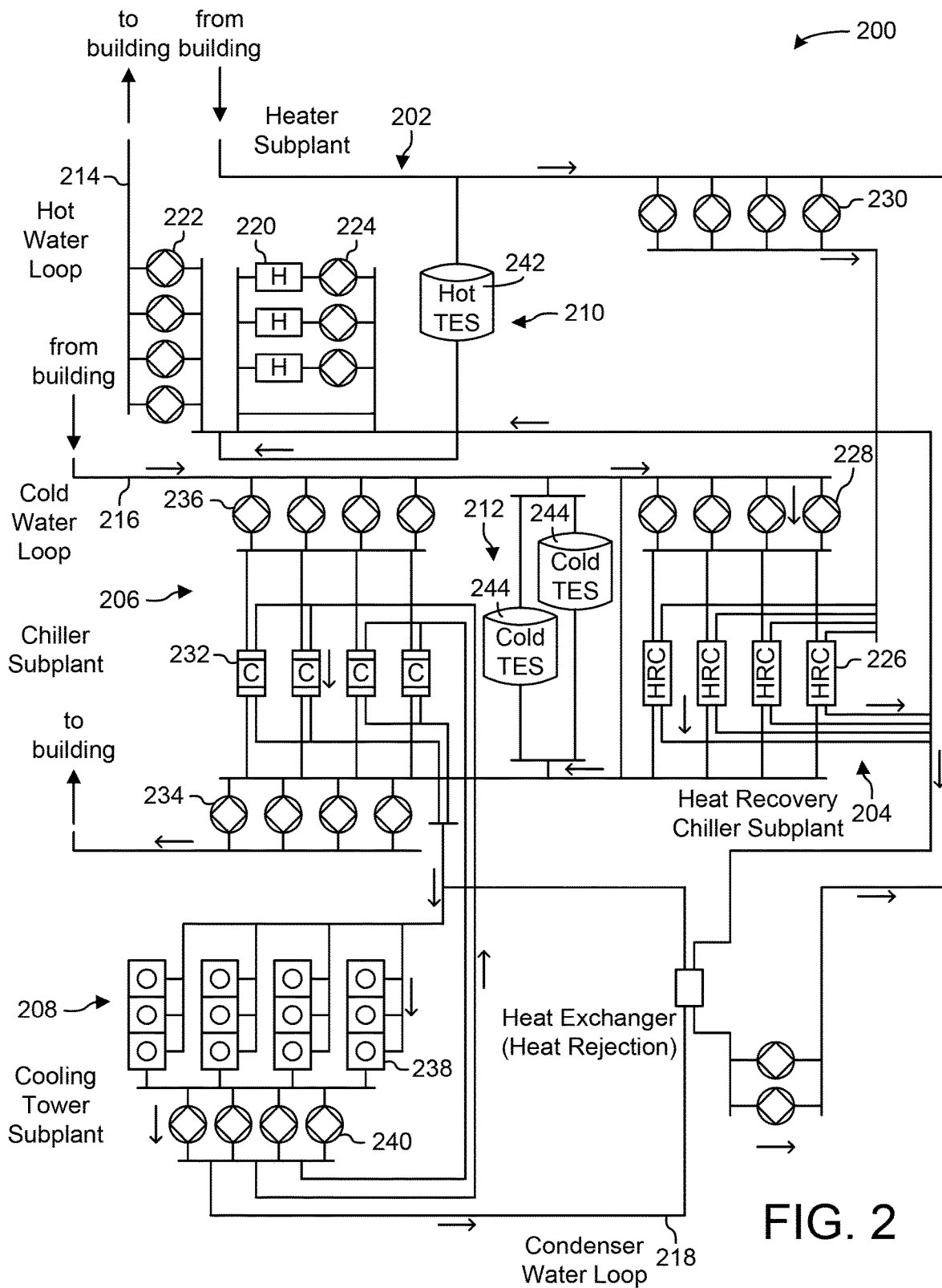
FIG. 2 is a block diagram of a waterside system that may be used in conjunction with the building of FIG. 1, according to some embodiments.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
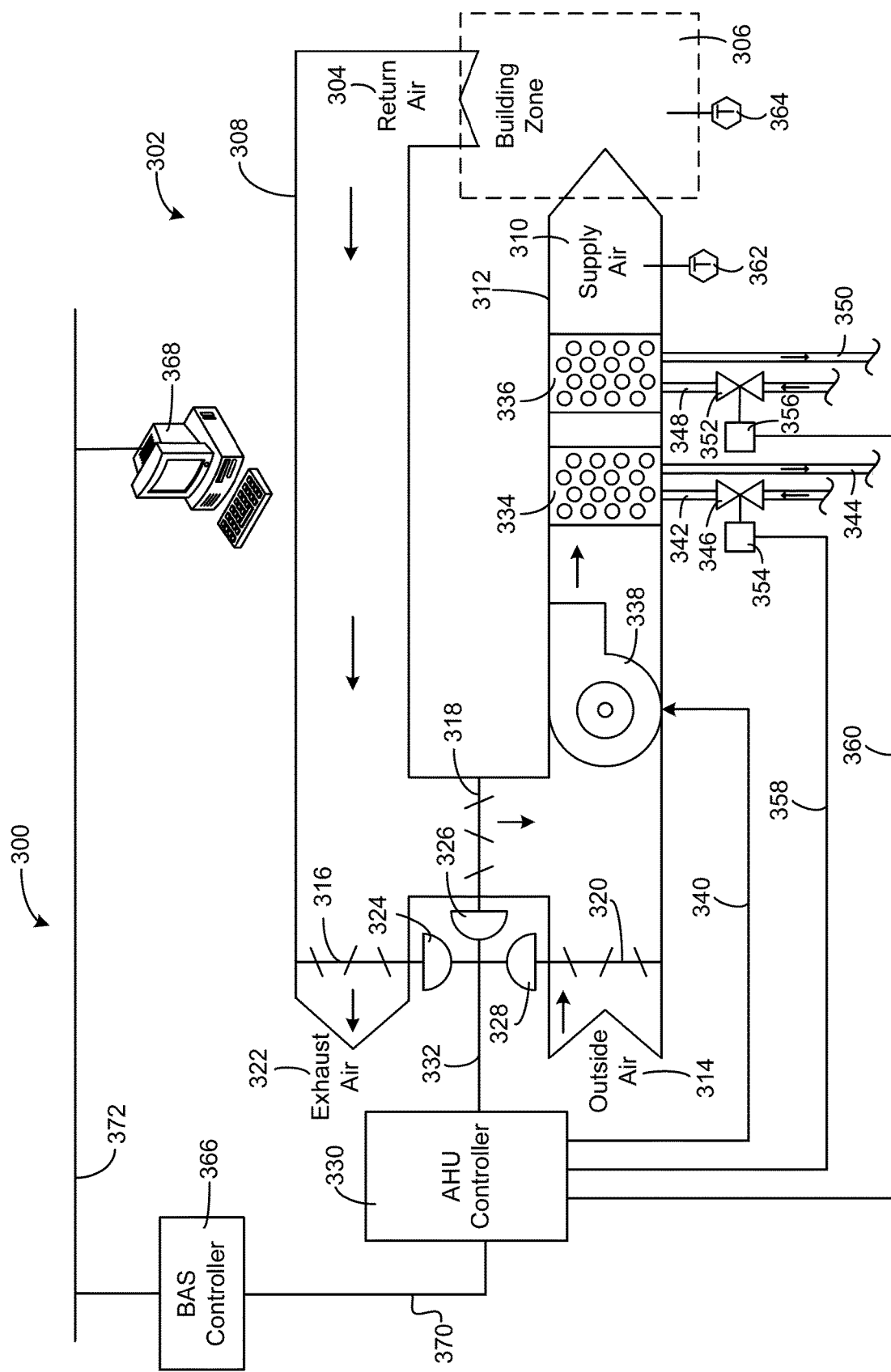
FIG. 3 is a block diagram of an airside system that may be used in conjunction with the building of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BAS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BAS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building automation system (BAS) controller 366 and a client device 368. BAS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BAS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BAS controller 366 may be separate (as shown in FIG. 3) or integrated. In an integrated implementation, AHU controller 330 may be a software module configured for execution by a processor of BAS controller 366.

In some embodiments, AHU controller 330 receives information from BAS controller 366 (e.g., commands, setpoints, operating boundaries, etc.) and provides information to BAS controller 366 (e.g., temperature measurements, valve or actuator positions, operating statuses, diagnostics, etc.). For example, AHU controller 330 may provide BAS controller 366 with temperature measurements from temperature sensors 362-364, equipment on/off states, equipment operating capacities, and/or any other information that can be used by BAS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BAS controller 366 and/or AHU controller 330 via communications link 372.

Figure 4:
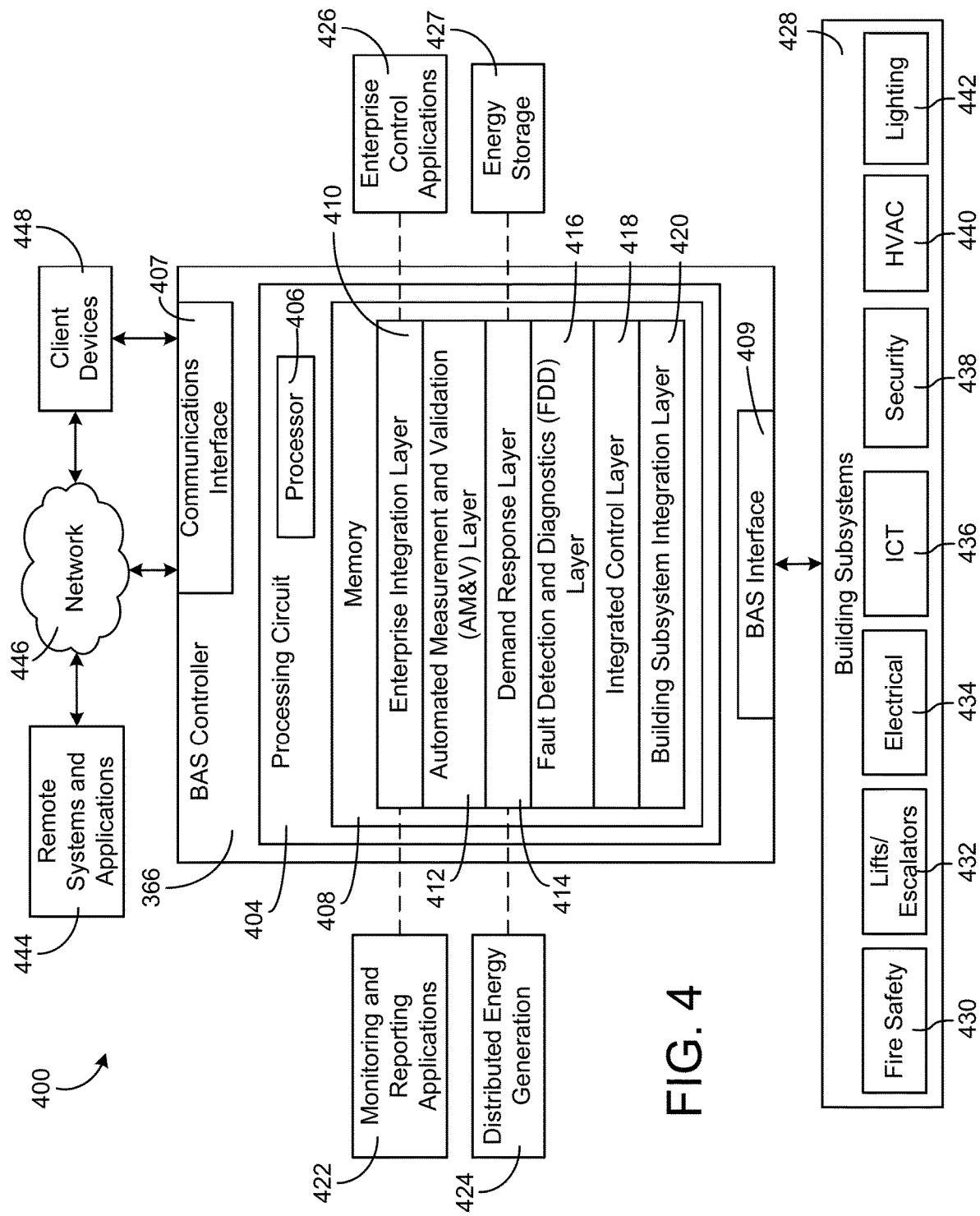
FIG. 4 is a block diagram of a building automation system (BAS) that may be used to monitor and/or control the building of FIG. 1, according to some embodiments.

Referring now to FIG. 4, a block diagram of a building automation system (BAS) 400 is shown, according to some embodiments. BAS 400 may be implemented in building 10 to automatically monitor and control various building functions. BAS 400 is shown to include BAS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BAS controller 366 is shown to include a communications interface 407 and a BAS interface 409. Interface 407 may facilitate communications between BAS controller 366 and external applications (e.g., monitoring and reporting applications 422, enterprise control applications 426, remote systems and applications 444, applications residing on client devices 448, etc.) for allowing user control, monitoring, and adjustment to BAS controller 366 and/or subsystems 428. Interface 407 may also facilitate communications between BAS controller 366 and client devices 448. BAS interface 409 may facilitate communications between BAS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BAS interface 409 is an Ethernet interface. In other embodiments, both communications interface 407 and BAS interface 409 are Ethernet interfaces or are the same Ethernet interface.

Still referring to FIG. 4, BAS controller 366 is shown to include a processing circuit 404 including a processor 406 and memory 408. Processing circuit 404 may be communicably connected to BAS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BAS controller 366 is implemented within a single computer (e.g., one server, one housing, etc.). In various other embodiments BAS controller 366 may be distributed across multiple servers or computers (e.g., that can exist in distributed locations). Further, while FIG. 4 shows applications 422 and 426 as existing outside of BAS controller 366, in some embodiments, applications 422 and 426 may be hosted within BAS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BAS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BAS controller 366. In yet other embodiments, enterprise control applications 426 can work with layers 410-420 to optimize building performance (e.g., efficiency, energy use, comfort, or safety) based on inputs received at interface 407 and/or BAS interface 409.

Building subsystem integration layer 420 may be configured to manage communications between BAS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BAS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated super-system. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BAS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BAS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

BIM Manager

Figure 5:
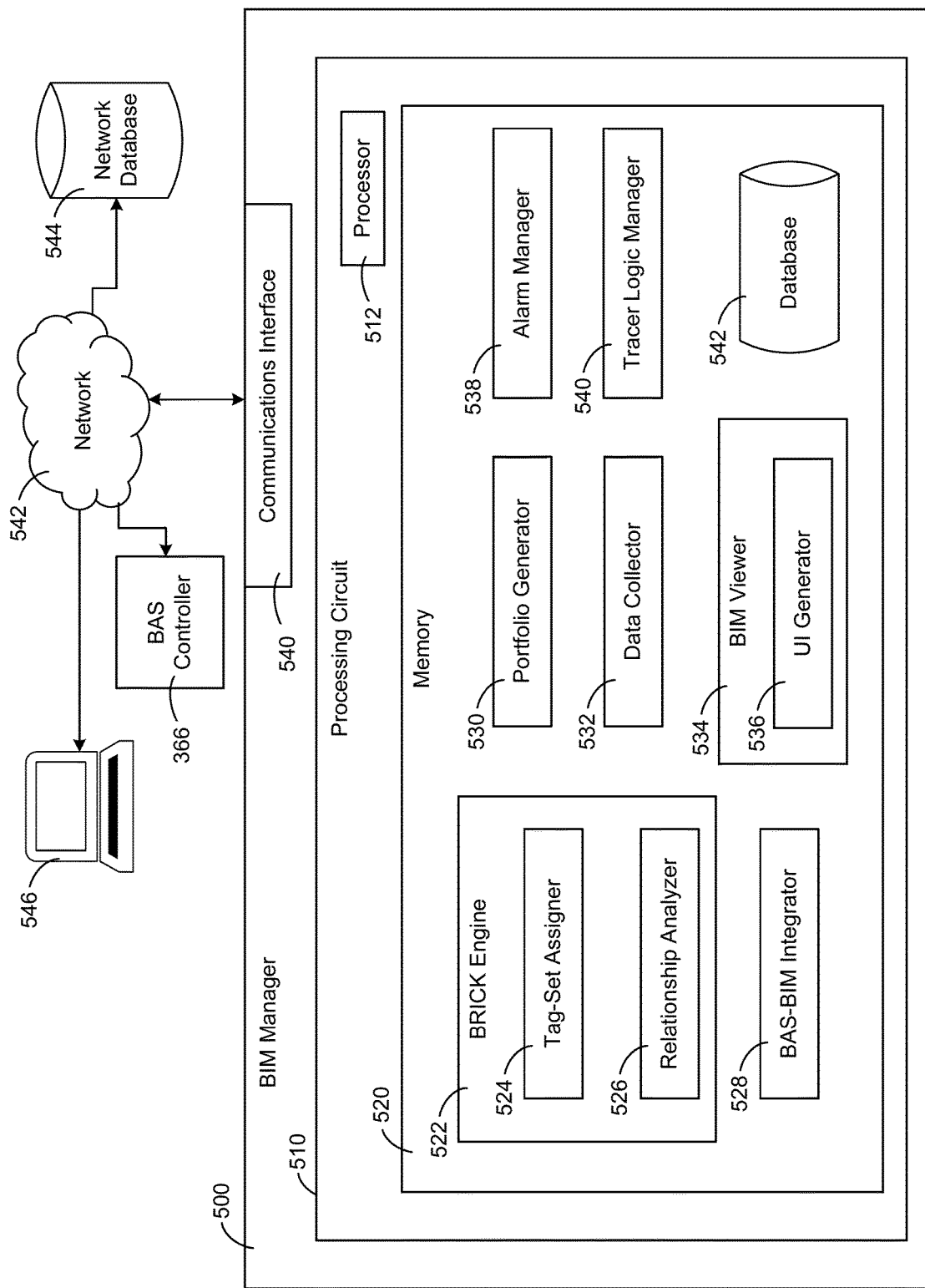
FIG. 5 is a block diagram of a building information model (BIM) management system, according to some embodiments.

Referring now to FIG. 5, a BIM management system including a BIM manager 500 for manipulating and displaying building information models (BIMs) is shown, according to some embodiments. As mentioned above, a BIM is a representation of the physical and/or functional characteristics of a building. A BIM may represent structural characteristics of the building (e.g., walls, floors, ceilings, doors, windows, etc.) as well as the systems or components contained within the building (e.g., lighting components, electrical systems, mechanical systems, HVAC components, furniture, plumbing systems or fixtures, etc.). It will be appreciated that BIMs may be used to represent a variety of facilities including campuses, sites, building, etc., and that the term "building", as denoted herein, is not intended to be limiting.

In some embodiments, a BIM is a 3D graphical model of the building. A BIM may be created using computer modeling software or other computer-aided design (CAD) tools and may be used by any of a plurality of entities that provide building-related services. For example, a BIM may be used by architects, contractors, landscape architects, surveyors, civil engineers, structural engineers, building services engineers, building owners/operators, or any other entity to obtain information about the building and/or the components contained therein. A BIM may replace 2D technical drawings (e.g., plans, elevations, sections, etc.) and may provide significantly more information than traditional 2D drawings. For example, a BIM may include spatial relationships, light information, geographic information, and/or qualities or properties of building components (e.g., manufacturer details).

In some embodiments, a BIM represents building components as objects (e.g., software objects). For example, a BIM may include a plurality of objects that represent physical components within the building as well as building spaces. Each object may include a collection of attributes that define the physical geometry of the object, the type of object, and/or other properties of the object. For example, objects representing building spaces may define the size and location of the building space. Objects representing physical components may define the geometry of the physical component, the type of component (e.g., lighting fixture, air handling unit, wall, etc.), the location of the physical component, a material from which the physical component is constructed, one or more functional characteristics/capabilities of the physical component, and/or other attributes of the physical component.

In some embodiments, a BIM includes an industry foundation classes (IFC) data model that describes building and/or construction industry data. An IFC data model is an object-based file format that facilitates interoperability in the architecture, engineering, and construction industry. An IFC model may store and represent building components in terms of a data schema. An IFC model may include multiple layers and may include object definitions (e.g., IfcObjectDefinition), relationships (e.g., IfcRelationship), and property definitions (e.g., IfcPropertyDefinition). Object definitions may identify various objects in the IFC model and may include information such as physical placement, controls, and groupings. Relationships may capture relationships between objects such as composition, assignment, connectivity, association, and definition. Property definitions may capture dynamically extensible properties about objects. Any type of property may be defined as an enumeration, a list of values, a table of values, or a data structure.

A BIM can be viewed and manipulated using a 3D modeling program (e.g., CAD software), a model viewer, a web browser, and/or any other software capable of interpreting and rendering the information contained within the BIM. Appropriate viewing software may allow a user to view the representation of the building from any of a variety of perspectives and/or locations. For example, a user can view the BIM from a perspective within the building to see how the building would look from that location. In other words, a user can simulate the perspective of a person within the building.

Still referring to FIG. 5, BIM manager 500 can be implemented in a server, multiple servers (e.g. via a distributed computing architecture), a cloud computing platform (e.g., MICROSOFT AZURE, AMAZON WEB SERVICES, etc.), a controller, via microservices located across multiple computing devices, and/or on (or distributed across) any other computing device or system. In some embodiments, BIM manager 500 is implemented via a processing circuit 510 (e.g., a memory and/or a processor) and/or implemented across multiple processing circuits (e.g., multiple memories and/or processors).

Processing circuit 510 is shown to include a processor 512 and a memory 520. Processor 512 can be a general purpose processor, an application specific integrated circuit (ASIC), one or more field programmable gate arrays (FPGAs), a group of processing components, or other suitable electronic processing components. Processor 512 can be communicatively coupled to memory 520. Memory 520 can include one or more devices (e.g., memory units, memory devices, storage devices, etc.) for storing data and/or computer code for completing and/or facilitating the various processes described in the present disclosure. While processing circuit 510 is shown as including one processor 512 and one memory 520, it should be understood that, as discussed herein, a processing circuit and/or memory may be implemented using multiple processors and/or memories in various embodiments. All such implementations are contemplated within the scope of the present disclosure.

Memory 520 can include random access memory (RAM), read-only memory (ROM), hard drive storage, temporary storage, non-volatile memory, flash memory, optical memory, or any other suitable memory for storing software objects and/or computer instructions. Memory 520 can include database components, object code components, script components, or any other type of information structure for supporting the various activities and information structures described in the present disclosure. Memory 520 can be communicably connected to processor 512 via processing circuit 510 and can include computer code for executing (e.g., by processor 512 one or more processes described herein.

Memory 520 is shown to include an ontology engine 522 that identifies objects represented in a BIM and applies a semantic description to the objects. In some embodiments, the objects represent spaces or equipment within a building associated with the BIM. For example, a BIM may include a plurality objects representing spaces such as rooms, wings, floors, levels, zones, etc., and a plurality of objects representing equipment such as HVAC equipment (e.g., ducts, VAVs, AHUs, etc.), security equipment (e.g., cameras, card readers, etc.), fire safety equipment (e.g., alarms, sprinklers, etc.), or anything other equipment that may be included in a campus or building. As denoted herein, such spaces and equipment within a building, campus, or site may generally be referred to as physical building assets or building assets.

In some embodiments, a BIM is received by BIM manager 500 from a network 542 after being uploaded by a user and/or retrieved from a network database 544. Ontology engine 522 may analyze a received BIM by identifying a plurality of objects (e.g., BIM objects that represent physical building assets) within the BIM. For example, ontology engine 522 may identify a first object representing a room (e.g., a space object) and a second object representing HVAC equipment (e.g., an equipment object). Ontology engine 522 may then apply a semantic description schema to each object identified in the BIM, such that the objects are described (i.e., identified, named) according to a schema other than a native BIM schema. In some embodiments, ontology engine 522 applies a semantic description schema that more closely relates to a natural language.

In some embodiments, ontology engine 522 may apply the semantic description schema by parsing a received BIM into sequences of characters (i.e., strings) to be manipulated by a tag-set assigner 524. In an example where ontology engine 522 receives a BIM that includes a plurality of space or equipment objects, ontology engine 522 may parse the BIM to determine strings that represent or describe each of the BIM objects. Based on an input string, tag-set assigner 524 can assign tags to groups of characters within said string. Tags may be a semantic descriptor for a BIM object such as zone, equipment, building, point, temperature, humidity, server, controller, etc. Tags, when analyzed together, can represent a tag-set, for example, "Zone Temperature Sensor," "Controller Airflow Setpoint," etc. The tags and the tag-sets identified by tag-set assigner 524 may be predefined tags and tag-sets. For example, the tags and tag-sets can be predefined tag-sets of a particular schema, e.g., the Brick schema or schema otherwise related to and/or derived from the Brick ontology. As utilized herein, it should be understood that references to Brick include modifications thereof, such as ontologies related to and/or derived from Brick.

The tag-set assigner 524 can be configured to generate tag-sets based on the assigned tags. For example, a particular set of tags may correspond to a particular tag-set. Furthermore, one or more logical rule-sets can define which groups of tags, or which order tags are identified in the string, correspond to particular tag-sets. The result of the entity labeling of the tag-set assigner 524 may be tag-sets and identifiers (IDs). The IDs can be identifying information that the tag-set assigner 524 identifies does not correspond to a tag but rather identifies a particular tag. For example, "FEC-31" may correspond to a "controller" tag where the particular controller represented by the tag is the number 31 controller. The tag-set assigner 524 can provide the tag-sets and IDs to portfolio generator 530 for generation of a hierarchy structure.

In some embodiments, ontology engine 522 further analyzes the BIM after applying a semantic description schema by identifying relationships between objects within the BIM via a relationship analyzer 526. For example, ontology engine 522 may identify a first object representing a space ("Room") and a second object representing equipment (e.g., "AHU"), and relationship analyzer 526 may further identify one or more relationships between the objects (e.g., the first object contains the second object, the second object serves the first object, etc.).

Similar to tag-set assigner 524, relationship analyzer 526 can analyze strings representing various elements to identify relationships between the elements, in some embodiments. For example, relationship analyzer 526 may receive relational rules from a database 542, such as a rule indicating that a string representing a control point subsequently following a string representing a controller may indicate an "isAPointOf" relationship should be assigned between the string representing the controller and the string representing the control point. Similar other rules can be implemented to identify the relationships.

In some embodiments, database 542 can include predefined relationships between various tag-sets, based on known or common relationships. Examples of the relationships can be a "VAV" tag-set "feeds" (the relationship) air into a room or space (a tag-set of a space type) or a temperature sensor "is located in" a room or space. In some embodiments, relationship analyzer 526 implements various statistical methods (e.g., hidden Markov models), neural networks, Bayesian networks, latent semantic analysis, or other machine learning algorithms to implement the identification of relationships between the BIM objects. Furthermore, in some embodiments, relationship analyzer 526 operates on the tag-sets generated by the tag-set assigner 524 to determine the relationships.

In some embodiments, prior or subsequently to the application of a semantic description schema, BIM data may be ingested by a space graph and stored in a graph database (e.g., part of network database 544), as described in U.S. patent application Ser. No. 16/260,078, incorporated herein by reference in its entirety. Objects in the BIM may be stored as digital twins of physical building assets, for example. The space graph can be a dynamic data structure allowing entities (e.g., building assets), relationships, and/or information to be stored for operating a building. The space graph can be a data structure including nodes and edges, the nodes representing particular entities and the edges between the nodes representing a relationship between the entities. The space graph can be a total representation, a digital twin, of an entire space since the space graph can represent the entities of the space, relationships between the entities, and data for the entities.

Still referring to FIG. 5, memory 520 is further shown to include a BAS-BIM integrator 528 that can integrate BAS data with a BIM by mapping BAS points to corresponding objects within the BIM. For example, a BAS point associated with an output air temperature sensor for an AHU may be mapped to a BIM object that represents the AHU. In general, the mapping of a BIM includes integrating BAS points with a BIM, as described in U.S. patent application Ser. No. 14/919,516, incorporated herein by reference in its entirety. BAS points may be measured data points, calculated data points, setpoints, or other types of data points used, generated, or stored by a BAS (e.g., BAS 400). Advantageously, integrating BAS points with the BIM may allow dynamic BAS data to be presented within a 3D model via a BIM viewer. For example, a user may view real-time data from the BAS and/or trend data for objects represented in the BIM by viewing the integrated BIM with integrated BAS data.

Memory 520 is further shown to include a portfolio generator 530 that can generate a hierarchy of building assets (e.g., spaces, equipment, etc.) based on a BIM, without manual (i.e., user) intervention. In some embodiments, portfolio generator 530 may generate a single hierarchy based on multiple BIMs, herein referred to as a site portfolio and discussed in greater details below, with respect to FIG. 13. In general, the hierarchy generated by portfolio generator 530 describes a physical or spatial relationship between one or more building assets (e.g., represented by BIM objects). For example, a campus may contain a building and the building may contain a plurality of floors. In this case, the campus may be identified as a top level (i.e., tier) of a hierarchy, followed by the building at a lower level, and the plurality of floors at yet a lower level from the building.

In some embodiments, portfolio generator 530 can also generate a hierarchy of building assets based on information from a BAS (e.g., BAS 400) or an analytical engine. For example, portfolio generator 530 may generate multiple hierarchies, including a hierarchy for each of the BIM, the BAS, and/or the analytical engine, as illustrated in FIGS. 21A and 21B. In this regard, portfolio generator 530 can generate hierarchies for a BAS and/or analytical engine in a similar manner to the generation of hierarchy based on a BIM.

Following the initial configuration and analysis of a BIM, a data collector 532 may collect, aggregate, or otherwise manipulate data from mapped BAS points. In some embodiments, data collector 532 may receive or request sensor data from a plurality of sensors, represented by BAS points. For example, an AHU (e.g., AHU 106), represented as an object within a BIM, can include various sensors, such as temperature sensors, pressure sensors, etc. Sensor data can be collected by data collector 532 to be presented within a 3D model generated from the BIM, where the sensor data is presented with the BIM object that represents the AHU.

In some embodiments, data collector 532 receives or collects data from an analytical engine associated with the BAS. In various embodiments, the analytical engine is a component of BAS 400 and/or a network component. The analytical engine may handle the monitoring and manipulation of sensor or other data, thereby reducing the resources (e.g., RAM, ROM, etc.) required by data collector 532. The analytical engine may also monitor and/or manipulate other building data such as thermal or energy consumption data. In some embodiments, data collector 532 may receive data from the analytical engine and aggregate the data into larger data sets. For example, data collector 532 may receive a plurality of thermal data from the analytical engine, corresponding to zones of a building, and aggregate the thermal data to generate thermal data for a larger zone (e.g., a room or floor of the building, the entire building).

Still referring to FIG. 5, a BIM viewer 534 is shown that may process BIM data to generate a 3D model. BIM viewer 534 generally generates 3D models from BIM data. For example, BIM viewer 534 may generate a 3D model of a building from one or more BIMs associated with the building. In some embodiments, BIM viewer 534 may include a 3D modeling program (e.g., CAD) for generating and displaying 3D models from BIM data. In other embodiments, BIM viewer 534 may be wholly or partially implemented by processing circuit 510 or by a remote server (e.g., a dedicated modeling server or processor).

BIM viewer 534 is shown to further include a user interface (UI) generator 536. UI generator 536 may be implemented as a webserver that can store, process, and deliver web pages (e.g., HTML documents) to a web browser of a user device 546, or as an application on a user device 546 (e.g., desktop application, mobile application), for example. UI generator 536 may be configured to format and present the 3D models generated by BIM viewer 534, as well as a plurality of user interfaces for configuring BIMs. UI generator 536 may generally receive inputs (e.g., HTTP requests) from user device 546.

User device 546 may be any electronic device that allows a user to interact with BAS 400 and/or BIM manager 500 through a user interface. Examples of user devices include, but are not limited to, mobile phones, electronic tablets, laptops, desktop computers, workstations, and other types of electronic devices. User device 546 may be similar to client device 368 as described above. In various embodiments, user device 546 is communicates directly with BIM manager 500 or communicates via network 542.

Memory 520 is shown to further include an alarm manager 538 that can monitor alarm and/or fault data for one or more physical building assets. Alarm manager 538 may act as an interface between an analytical engine or a BAS (e.g., BAS 400) and BIM manager 500, by receiving data from the analytical engine or BAS associated with the building assets. For example, alarm manager 538 may receive sensor data and analyze the sensor data to determine if a building asset associated with the sensor is experiencing an alarm or fault. In some embodiments, alarm manager receives alarm and/or fault data from BAS 400 via network 542.

In some embodiments, the analytical engine processes sensor data and identifies alarm or faults. The analytical engine may notify or otherwise communicate with alarm manager 538 regarding the alarm or fault. Upon identifying an alarm or a fault, alarm manager 538 may present the alarm or fault within a 3D model generated from a BIM, as described in further detail with respect to FIG. 27. Alarm manager 538 may also record or otherwise annotate the alarm or fault by associating the alarm or fault with an object in the BIM that represents the faulty building asset, and/or by storing alarm or fault data within network database 544.

Memory 520 is shown to further include a tracer logic manager 540 that can generate and manage fault tracer logic. Fault tracer logic, as described in detail with respect to FIGS. 28 and 29, may be configured for one or more objects within a BIM that represent one or more building assets. Fault tracer logic may provide a visual indication of how building assets affect one another, thereby indicating how a fault or alarm might affect upstream or downstream assets of the faulty asset. For example, a faulty AHU may subsequently affect terminal units fed by the AHU. If fault tracer logic is configured for the AHU, terminal units, and intermediary ductwork, the tracer logic manager 540 may provide an indication, within a 3D model, of the relationship between the assets.

Figure 6:
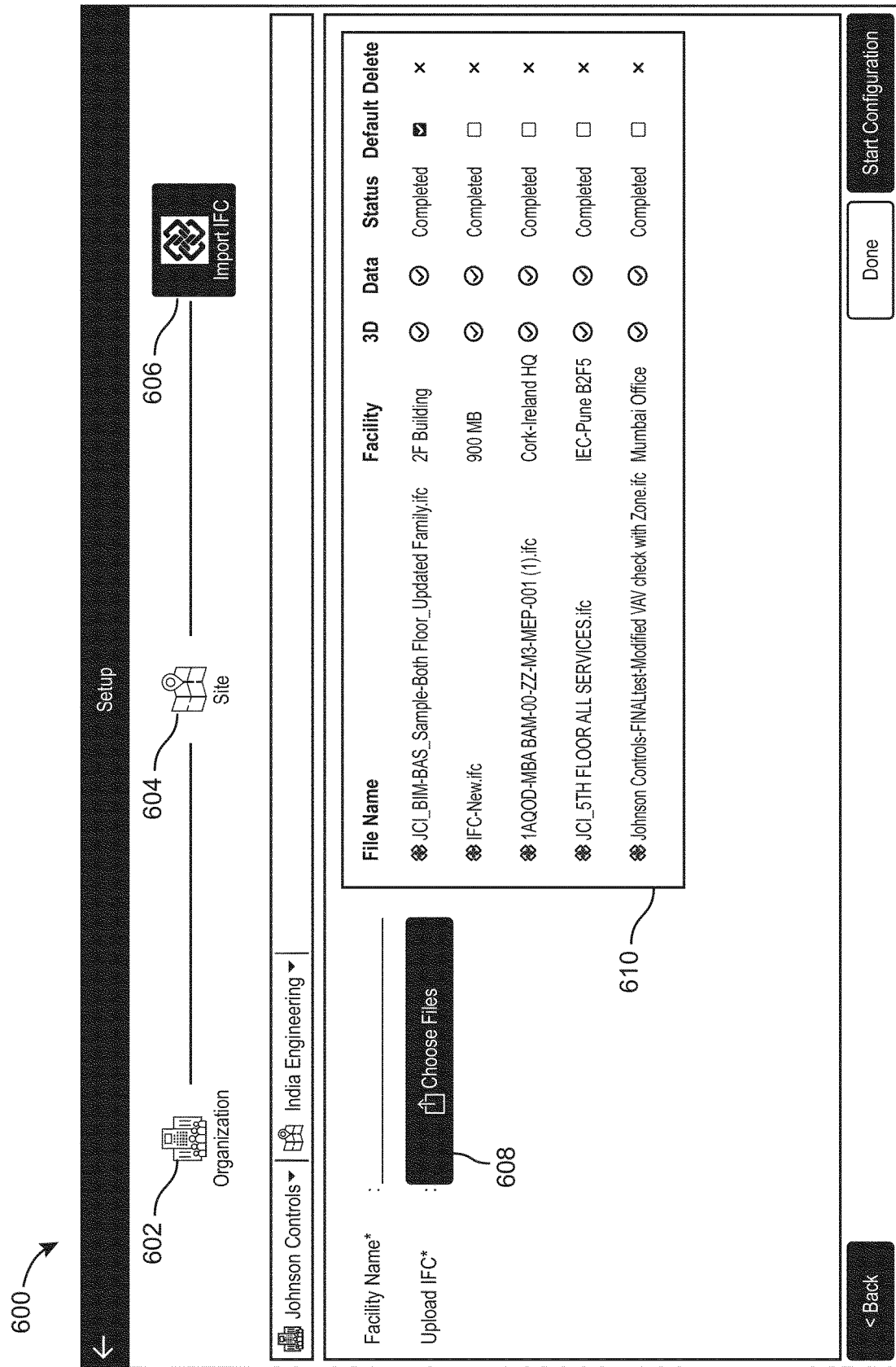
FIG. 6 is an example interface for uploading BIMs, according to some embodiments.

Referring now to FIG. 6, an example interface 600 for uploading BIMs is shown, according to some embodiments. In some embodiments, interface 600 is generated by UI generator 536 and presented to a user of user device 546. Interface 600 may allow a user to identify an organization and/or site and upload one or more BIMs associated with the organization and/or site simultaneously. A user may be a user of a BAS (e.g., BAS 400), a user of BIM manager 500, a site facilitator, a site or building manager, a service technician, or any other user that may interact with the systems and interfaces described herein.

As shown, interface 600 may include a number of icons for navigating between pages, such as an organization page 602, a site page 604, and an import page 606. For example, the user may navigate to organization page 602 to add information about an organization, such as the organization's name and address, a building owner's name and contact information, a facility manager's name and contact information, etc. In some embodiments, the user may select previously defined organizations from a list. The user may then navigate to site page 604 to add information about a site, such as a site name, address, geographic coordinates, a building managers contact name and contact information, etc. Similar to organization page 602, in some embodiments, the user may select site information from a list of previously defined sites. In general, an organization is a company or other organization that may own and/or operate one or more sites (e.g., campuses, buildings, etc.).

After defining an organization and a site, a user may navigate to import page 606 to upload BIM or IFC files. Here, the user may enter a facility name and select a choose files button 608 to choose one or more BIMs to upload. The facility name may be an identifier for a particular building associated with a campus or site, for example. Once the BIMs have been uploaded, information about the uploaded files may be populated in a data table 610. Data table 610 may present a file name, a facility, status icons, and other options for the uploaded BIMs. For example, the status icons may indicate whether 3D model information and/or metadata has been processed for the uploaded BIM. In some embodiments, the status of the uploaded BIM may be associated with one or more processes performed by BIM manager 500. Additionally, the other options may allow a user to select a default BIM and/or delete a particular BIM. The default BIM may be a first BIM that is presented to the user for viewing and/or configuration, for example.

In some embodiments, once a user has uploaded a BIM using interface 600, the BIM may be subject to one or more automatic configuration processes. In some embodiments, the automatic configuration processes may be performed by BIM manager 500, and completion of the automatic configuration processes may be indicated by the status icons of data table 610. For example, a graphical model may be generated for the newly uploaded BIM and/or metadata associated with the BIM may be processed before the status icons show that the BIM upload is completed.

One such automatic configuration process may be the translation of an uploaded BIM to a semantic description schema (i.e., naming schema). In some embodiments, the translation may be performed by ontology engine 522, described above with respect to FIG. 5. By defining objects within the BIM that represent building or campus assets (e.g., spaces, equipment, etc.) according to a semantic description schema, a user may more easily understand and/or navigate the BIM. The semantic description schema is generally a schema that promotes consistency and interpretability in the definitions of objects within the BIM by defining the BIM objects in a machine-readable format that approximates a natural language.

Semantic Description Schema

Figure 7:
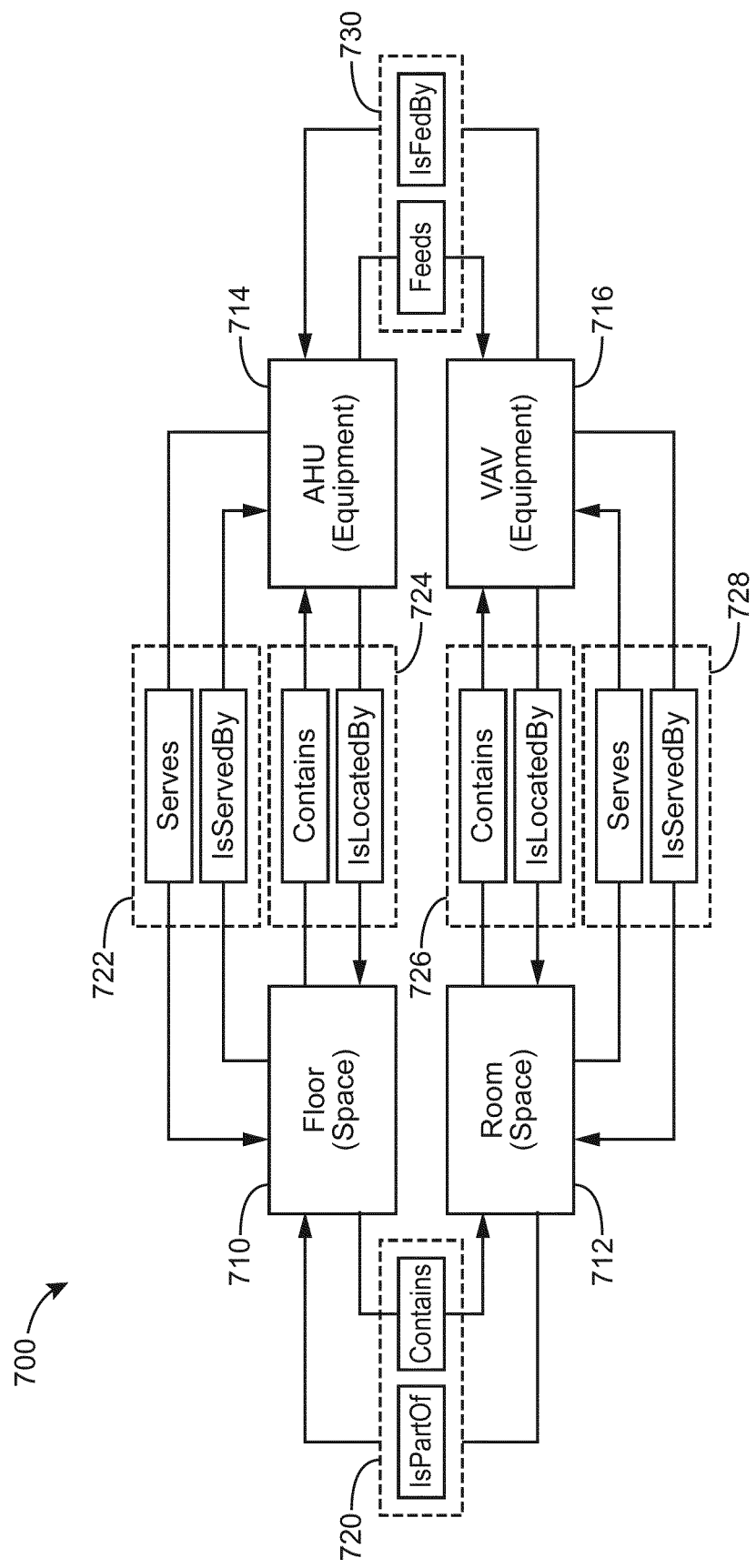
FIG. 7 is a diagram illustrating the translation of a BIM to a semantic description schema, according to some embodiments.

Referring now to FIG. 7, a diagram 700 illustrating a structure for the translation of a BIM to a semantic description schema is shown, according to some embodiments. Diagram 700 may be an example visual representation showing how objects in the BIM and their relationships to other objects can be redefined according to the semantic description schema. In some embodiments, diagram 700 illustrates the translation performed by ontology engine 522.

In some embodiments, the semantic description schema is a Brick schema, and ontology engine 522 translates a BIM into the Brick schema as described in U.S. patent application Ser. No. 16/663,623, incorporated herein by reference in its entirety. The Brick specification defines how entities in a building are be named, defines relationships between entities, and defines how the entities and relationships can be visualized as a graph. Details of Brick, according to one implementation, can be found in *Brick: Towards a Unified Metadata Schema for Buildings* by Balaji, Bharathan, et al. published Nov. 16, 2016, *Scrabble: Transferrable Semi-Automated Semantic Metadata Normalization Using Intermediate Representation* by Jason Koh, et. al. published in November of 2018, and *Poster: Scrabble: Converting Unstructured Metadata into Brick for Many Buildings* by Jason Koh, et. al. published in November of 2017, the entirety of each of which is incorporated by reference herein.

In the Brick schema, every entity in a building is represented by a tag-set, which is decomposed to multiple tags. Brick can model points, equipment, locations, measurement properties, etc. as entities via a tag-set. Tag-sets can be ordered as a hierarchy, for example, an equipment tag-set can be a high level class for an HVAC tag-set which in turn can be a high level class for an AHU tag-set.

As an example, "Room Temperature Sensor" may be a particular tag-set made up of multiple tags, e.g., Room, Temperature, and Sensor. The Room Temperature Sensor tag-set can be a subclass of a Temperature Sensor tag-set, which itself may be a subclass of a Sensor tag-set. With such a hierarchy, a system can find a collection of temperature sensors easily using tag searching or other methods. In some embodiments, in the Brick schema, new custom tag-sets with tags can be added to make the schema comprehensive.

In Brick, tags can represent a unit concept in buildings and are decomposed from tag-sets. Tags can be used to infer a tag-sets meaning and allow a system to search a Brick model without using a query language. For example, a system can easily identify that the tag-set "Room Temperature Sensor" is related to the tags "Room," "Temperature," and "Sensor" programmatically. This moderates tag-based representation mechanisms to have more coverage.

Still referring to FIG. 7, diagram 700 is shown to include multiple BIM objects, such as spaces 710 and 712, and equipment 714 and 716. Generally, a space is an area, floor, wing, zone, room, etc. of a building and equipment is any asset within the building represented by an object within the BIM. When the Brick schema is applied, for example, by ontology engine 522, the spaces, equipment, and/or other assets represented by objects in the BIM may be redefined (e.g., by applying a tag or tag-set) according the Brick schema. For example, in the Brick schema, space 710 is shown to be defined as a "Floor" and space 712 is shown to be defined as a "Room". Likewise, equipment 714 is defined as an "AHU" and equipment 416 is defined as a "VAV."

Diagram 700 is also shown to include a plurality of relationships 720-730. As described above, the Brick schema may also define how relationships between BIM objects are defined. Relationships 720-730 may describe how two BIM objects relate to each other. For example, relationship 720 may represent a relationship between space 710 and space 712. In this example, space 710 ("Floor") "contains" space 712 ("Room"). Likewise, space 712 ("Room") "isPartof" space 710 ("Floor"). In this regard, applying a semantic description schema, such as Brick, to a BIM may increase usability of a BAS-BIM integrated system by providing a more natural description (i.e., naming) schema while maintaining machine readability. Applying a more natural description schema may increase a user's ability to navigate and understand the system while also providing more consistent and complete definitions.

Figure 8:
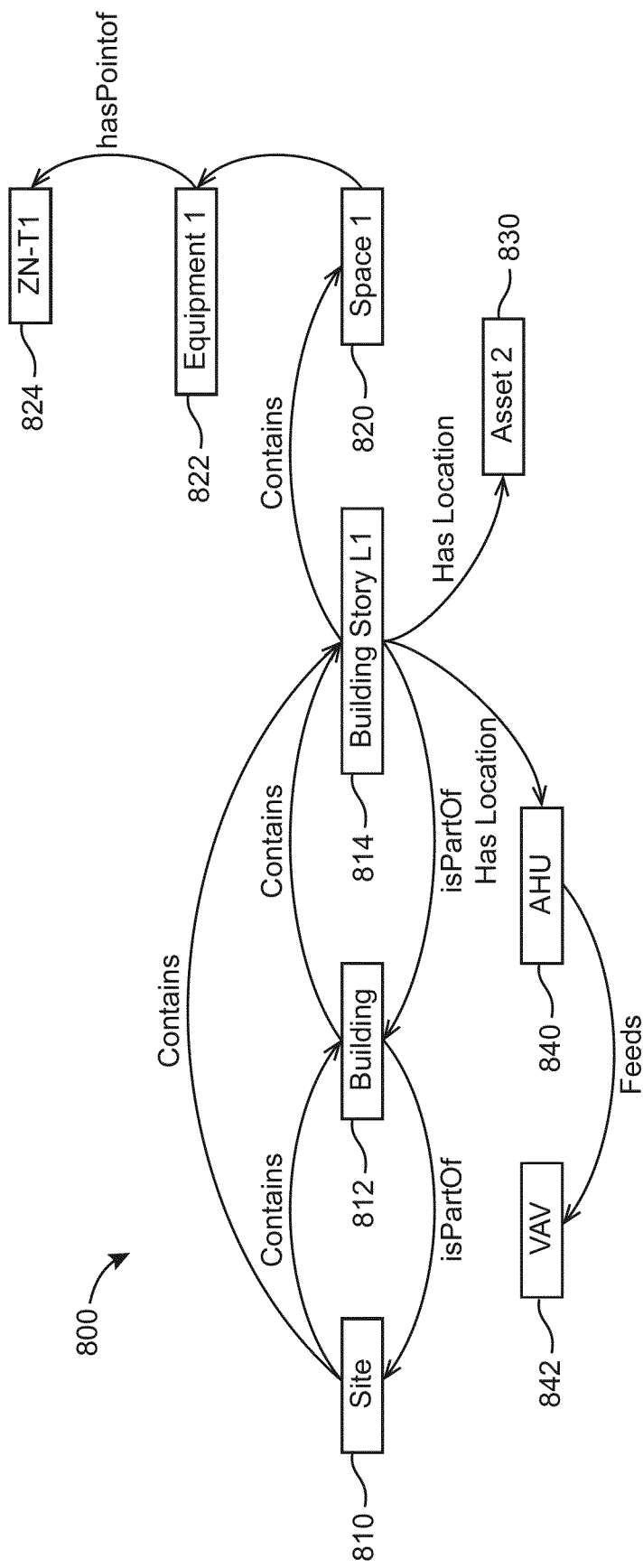
FIG. 8 is a diagram of a data structure that illustrates the Brick schema applied to an example BIM, according to some embodiments.

Referring now to FIG. 8, a diagram 800 of a data structure that illustrates Brick schema applied to an example BIM is shown, according to some embodiments. Diagram 800 may illustrate the generation of a hierarchy structure based for a BIM, as described above, for example. Diagram 800 is shown to include a number of objects and relationships between the objects. For example, an object representing a site 810 "contains" an object representing a building 812. Likewise, building 812 "isPartOf" site 812. In this example, building 812 may be a child (i.e., subordinate) object of site 810. Diagram 800 shows how the application of Brick schema to a BIM can aid in the generation and subsequent understanding of a hierarchy structure, by describing BIM objects and object relationships in a more natural manner.

As shown in diagram 800, building 812 "contains" a building story 814. Building story 814 is shown to include a number of assets, including a space 820, an asset 830, and an AHU 840. Space 820 further includes equipment 822 that "hasPointof" a sensor 824 ("ZN-T1"). For example, a building story may include a damper (e.g., damper 316) that further includes a temperature sensors for monitoring air temperature as it passes through the damper. Asset 830, and likewise, AHU 840, "HasLocation" building story 814. AHU 840 further "Feeds" a VAV 842. To continue the previous example, the building story may further contain a room and an AHU, where the AHU may supply one or more VAVs to control an environmental condition of the building story and, thereby, the room.

Site Portfolio

Another automatic configuration process includes the generation of a hierarchy structure based on a BIM. In some embodiments, portfolio generator 530 generates a hierarchy structure after the application of the semantic description schema by ontology engine 522. The hierarchy structure may identify a hierarchy of building assets, represented by objects within the BIM. For example, a hierarchy structure generated based on a building including a plurality of spaces and equipment may define a hierarchy of the spaces and equipment (e.g., the building includes a floor, that includes a room, that further includes an AHU). Generating a hierarchy structure based on a BIM may provide a user with an easy-to-navigate overview of a physical relationship between building assets.

Figure 9:
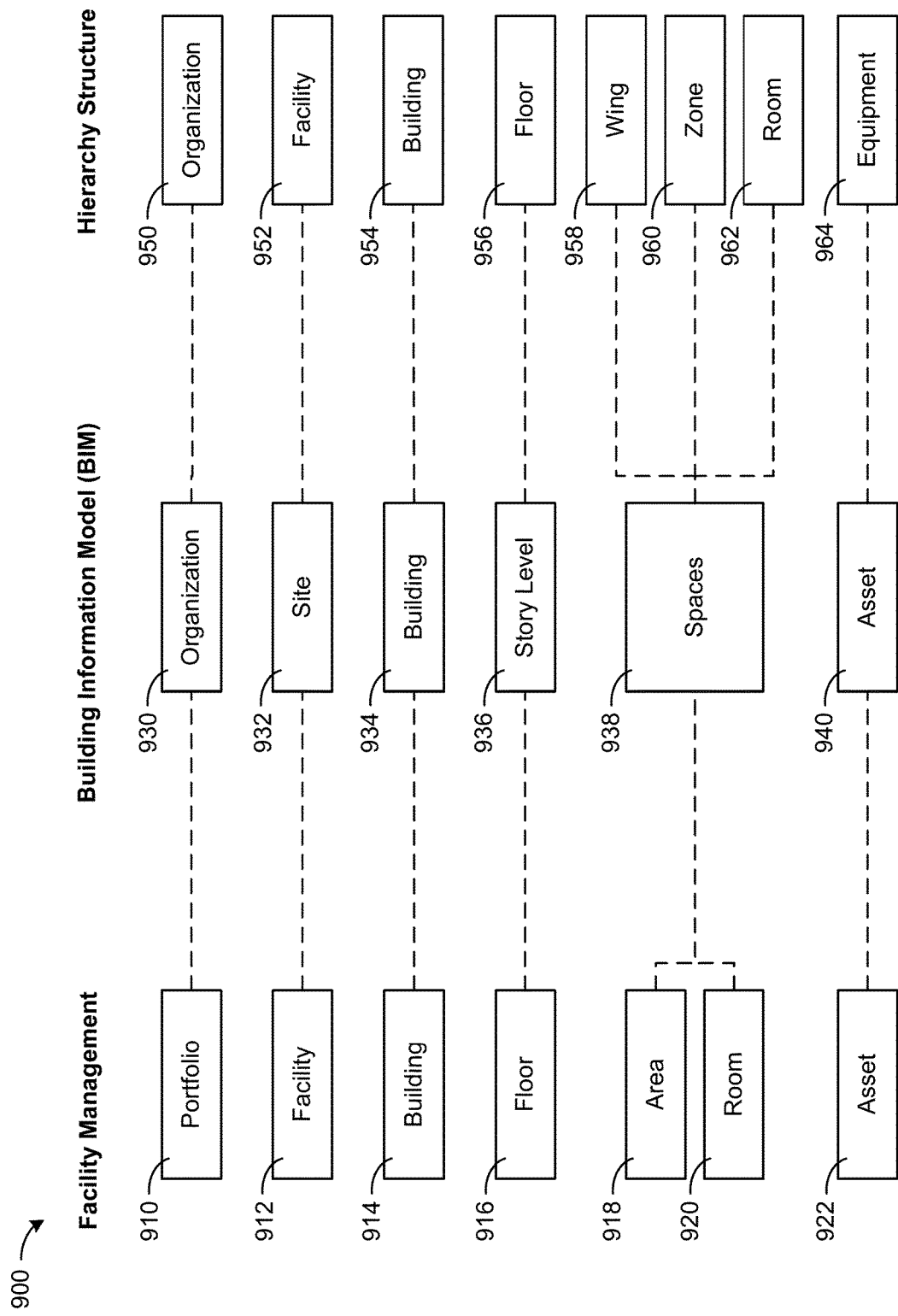
FIG. 9 is a diagram illustrating the generation of a hierarchy structure, according to some embodiments.

Referring now to FIG. 9, a diagram 900 illustrating how a hierarchy structure may be generated is shown, according to some embodiments. Diagram 900 may illustrate the generation of a hierarchy structure from a facility management portfolio and a BIM. In some embodiments, the facility management portfolio may be compiled based on BAS data and/or BAS point, as described above. As shown, diagram 900 may demonstrate how facility management portfolio objects may be represented in a BIM, and how objects in the BIM may be translated into a hierarchy structure. In some embodiments, the hierarchy structure is generated from the BIM after the Brick schema has been applied.

In some embodiments, a facility management portfolio may first be represented within a BIM. A first object, a portfolio 910, may be represented as an organization 930 within a BIM. Subsequent (i.e., child) objects of the first object including facilities 912 and buildings 914 are represented as sites 932 and buildings 934 within the BIM, respectively. Buildings 914 may contain floors 916 represented by levels 936 in the BIM. Floors 916 are shown to include areas 918 and rooms 920, both of which may be represented as spaces 938 in the BIM.

In some embodiments, the BIM may be used to generate a hierarchy structure according to the Brick schema. For example, the hierarchy structure may be generated based on the relationships between objects in the BIM, as described above. A first object, organization 930, may be represented as an organization 950 in the hierarchy structure. Subsequent (i.e., child) objects of the first object including sites 932 and buildings 934 are represented as facilities 952 and buildings 954 in the hierarchy structure, respectively. Buildings 934 may contain levels 936, represented by floors 956 in the hierarchy structure, and levels 936 may include spaces 938. When generating the hierarchy structure, spaces 938 and assets 940 may be further defined as wings 958, zone 860, and/or rooms 962, each potentially including equipment 964.

Figure 10:
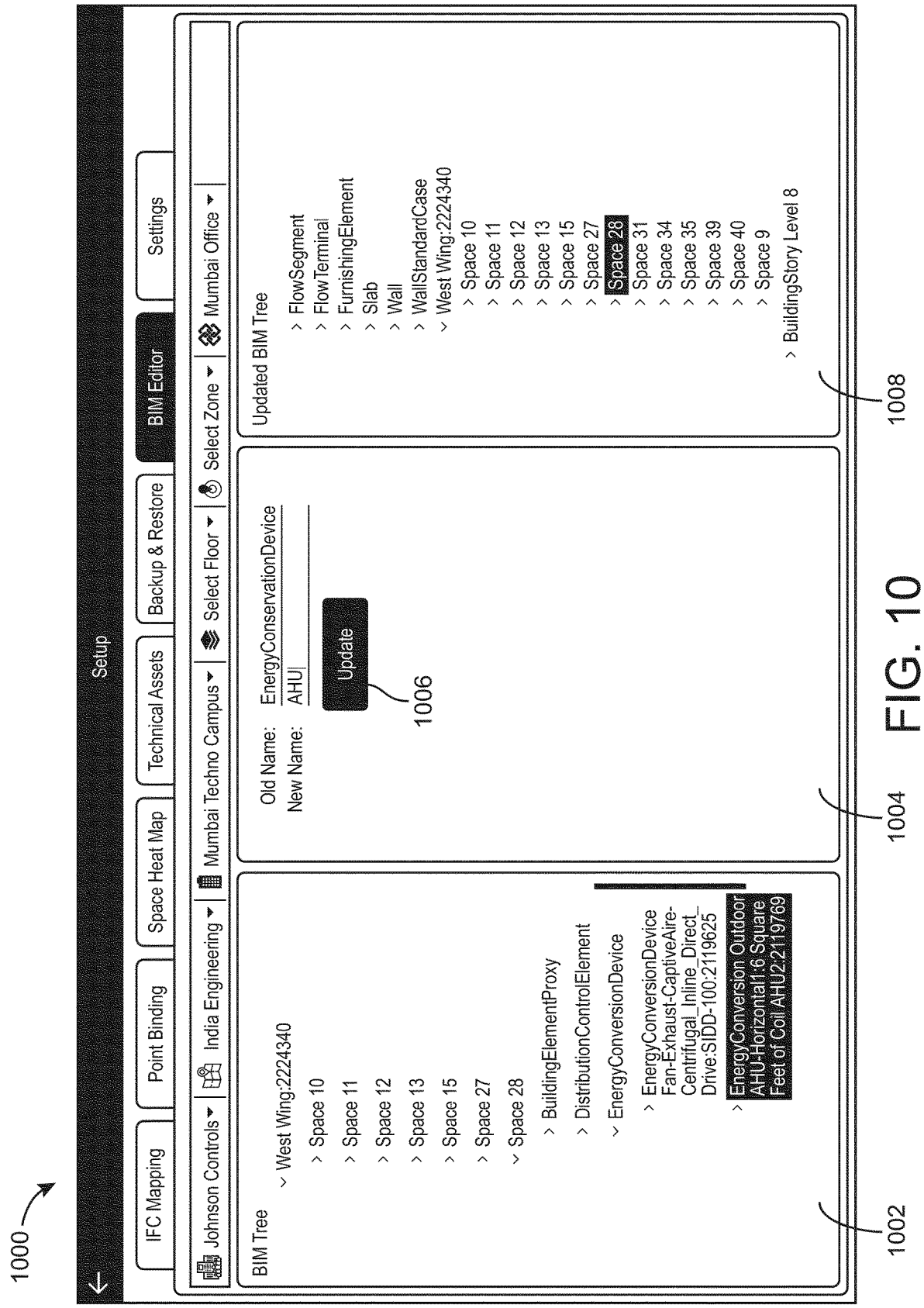
FIG. 10 is an example interface for redefining assets within the hierarchy structure, according to some embodiments.

Referring now to FIG. 10, an example interface 1000 for redefining assets within the hierarchy structure is shown, according to some embodiments. Once a hierarchy structure is generated, as described with respect to FIG. 9, a user may choose to manually manipulate the hierarchy structure, for example, to redefine (i.e., rename) one or more BIM objects. Interface 1000 may give a user manual control over the BIM and/or hierarchy structure, allowing the user to configure the BIM and/or hierarchy structure in a more desirable or intuitive manner, based on the user's preferences. In some embodiments, interface 1000 may be generated by UI generator 536 and presented to a user via user device 546.

Interface 1000 is shown to a BIM tree 1002. In some embodiments, BIM tree 1002 is a textual representation of the hierarchy structure generated by portfolio generator 530. BIM tree 1002 may be a nested hierarchy, where subordinated objects of a selected object are populated in a drop-down menu responsive to a user selection of the selected object. As shown in FIG. 10, for example, a user may select a first object, "Space 28," and responsive to the selection, a list of objects subordinate to the first object may populate (e.g., "BuildingElementProxy", "EnergyConversionDevice", etc.). The user may then select a second object from the list of subordinate objects and again, responsive to the selection, a list of objects subordinate to the second object may populate (e.g., "EnergyConversionDevice Outdoor AHU . . . ").

In some embodiments, the most recently selected object may populate under a naming menu 1004. For example, when "EnergyConversionDevice Outdoor AHU—Horizontal . . . " is selected from BIM tree 1002, the name of the selected object is populated under an "Old Name" field in naming menu 1004. The user may then enter a new name for the object under a "New Name" field and select an update button 1006 to apply the change. Subsequently, an updated BIM tree 1008 may be presented within interface 1000 that includes the updated name for the object.

Figure 11:
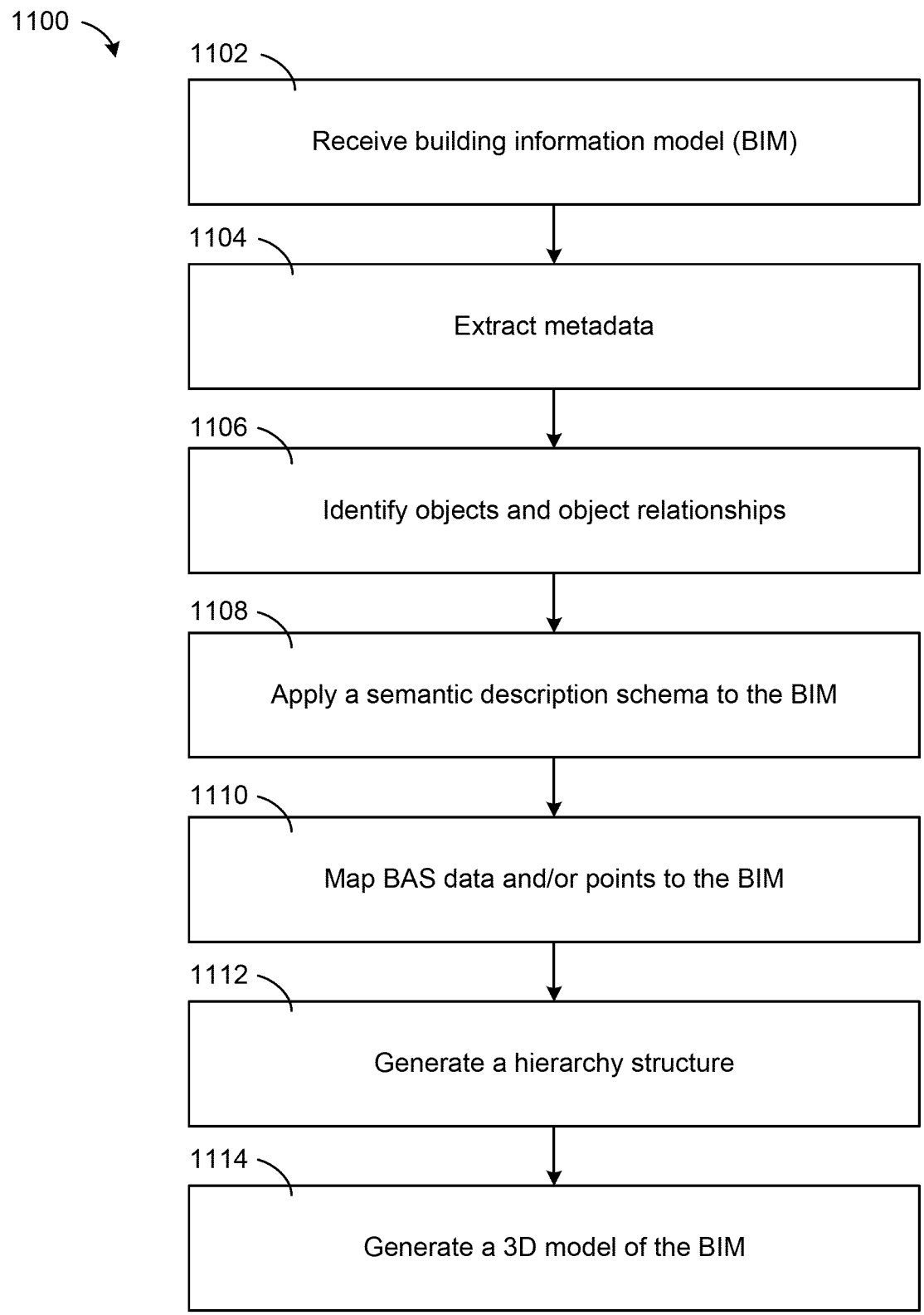
FIG. 11 is a flow diagram of a process for automatically configuring a BIM and generating a hierarchy structure, according to some embodiments.

Referring now to FIG. 11, a flow diagram of a process 1100 for automatically configuring a BIM and generating a hierarchy structure is shown, according to some embodiments. Process 1100 can be performed by BIM manager 500, for example. Process 1100 generally describes the configuration process for a BIM, from when a BIM is uploaded (e.g., as described with reference to FIG. 6) to the generation of a hierarchy structure (e.g., as described with reference to FIG. 9). In this regard, process 1100 may include any of the configuration processes described above.

At step 1102, a BIM is received. The BIM may be received by BIM manager 500, for example, after having been retrieved from network database 544 and/or uploaded by a user of user device 546. The BIM may be generally associated with one or more facilities (e.g., buildings, campuses, sites, etc.) owned by, operated by, or otherwise associated with an organization, and may represent at least a portion of a building or facility.

At step 1104, the configuration of the BIM begins by extracting metadata associated with the BIM. Metadata can be broadly defined as data that describes other data. For example, BIM metadata may include information regarding the BIM as a whole (e.g., file size, file name, creation date, etc.) and/or information about the objects within the BIM. Generally, extracting the BIM metadata includes analyzing the BIM and extracting relevant data for performing subsequent steps of process 1100. For example, the metadata extracted may be data on the objects and structures including in the BIM. In some embodiments, the BIM and/or associated metadata may be stored in a database, such as network database 544.

At step 1106, objects within the BIM and/or object relationships are identified from the extracted metadata. As described above, the received BIM may include a plurality of objects that represent physical assets (e.g., spaces, equipment) within a building (e.g., building assets) or other facility represented by the BIM. For example, a BIM may include a plurality of objects that represent spaces such as rooms, floors, wings, etc., and a plurality of objects that represent equipment such as HVAC equipment, fire safety equipment, security equipment, etc. In some embodiments, the BIM may include objects that represent other physical assets of a building.

As described with reference to FIG. 7, for example, the relationships between objects may describe how objects affect one another, or may describe a physical relationship between the objects. For example, a first object representing a space (e.g., a room) may contain a second object representing equipment (e.g., an AHU). In this case, the physical relationship "contains" may be identified. In some embodiments, the relationships between objects may be identified in a native description schema of the BIM or by analyzing strings that represent the objects (e.g., as described with reference to relationship analyzer 526).

At step 1108, a semantic description schema is applied to the BIM. The semantic description schema may be applied by ontology engine 522, for example. In some embodiments, the semantic description schema may be Brick schema or another schema that redefines objects within the BIM and their relationships. The semantic description schema generally describes objects and object relationships in way that aligns with natural languages. For example, an object may be redefined from a "zone" to a room, or an object representing equipment may be redefined by a class or type of equipment. In some embodiments, at step 1108 or following step 1108, the BIM data (e.g., with the semantic description schema applied) may be ingested by a space graph and stored in a graph database (e.g., part of network database 544), as described above.

At step 1110, BAS points of the facility (e.g., site, campus, building, etc.) associated with the BIM are mapped to corresponding objects in the BIM. Step 1106 may be performed by BAS-BIM integrator 528, for example. Mapping BAS points to corresponding BIM objects may include associating a point (e.g., a sensor) of the BAS to an object within the BIM. For example, a BAS point for an output air temperature sensor of an AHU may be mapped to a BIM object representing the AHU.

At step 1112, a hierarchy structure is generated. The hierarchy structure may be generated by portfolio generator 530, for example. Generating the hierarchy structure may include organizing the previously identified objects within the BIM based on a physical relationship of the objects. For example, a previously identified floor of a build may include one or more rooms that further include one or more devices or equipment. In some embodiments, the hierarchy structure is generated based on the BIM data after the semantic description schema is applied. In this way, the hierarchy structure may provide an easy to understand overview of all building assets within a building represented by the BIM.

At step 1114, a three-dimensional (3D) model is generated from the configured BIM. Step 1114 may be performed by BIM viewer 534, for example. Generating the 3D model may include processing the BIM data via a computer-aided drawing program or another type of 3D modelling engine. The 3D model generally includes a 3D graphical representation of a building or site represented by the BIM. The 3D may also include 3D graphical representations of building assets such as spaces and/or equipment.

In some embodiments, the 3D model is interactive, allowing a user to manipulate and interact with the 3D model. For example, the user may rotate, pan, zoom, or otherwise alter a perspective view of the 3D model. The user may also navigate between spaces within the model (e.g., between floors of a building). In some embodiments, the 3D model may include adequate detail to allow the user to navigate through the model in a first-person perspective.

Configuring Multiple BIMs

In some embodiments, a user may upload more than one BIM at a time. For example, a user interacting with interface 600 may select a plurality of BIMs to upload together. In some embodiments, the plurality BIMs may be linked in order to generate a site portfolio that incorporates hierarchies from multiple BIMs. Additionally, the BIMs may be linked in order to view multiple BIM concurrently within a single interface, or for a variety of other reasons.

As an example, a user may upload a plurality of BIMs corresponding to a single building, where each BIM corresponds to a distinct zone (i.e., space) of the building. In this example, the user may wish to generate a site portfolio, indicating a hierarchy of building assets and/or objects within the BIM that encompass the entirety of the building. Uploading multiple distinct BIMs and linking said files may increase processing, transmitting, and rendering speeds by reducing the size of each BIM and instead incorporating many, small BIMs. In other embodiments, a user may upload multiple BIMs each corresponding to something other than different zones. For example, in some implementations, each BIM may correspond to a different building subsystem, such as HVAC, lighting, fire protection, etc. In some such embodiments, the different BIMs may correspond to the same or overlapping zones or areas.

Figure 12:
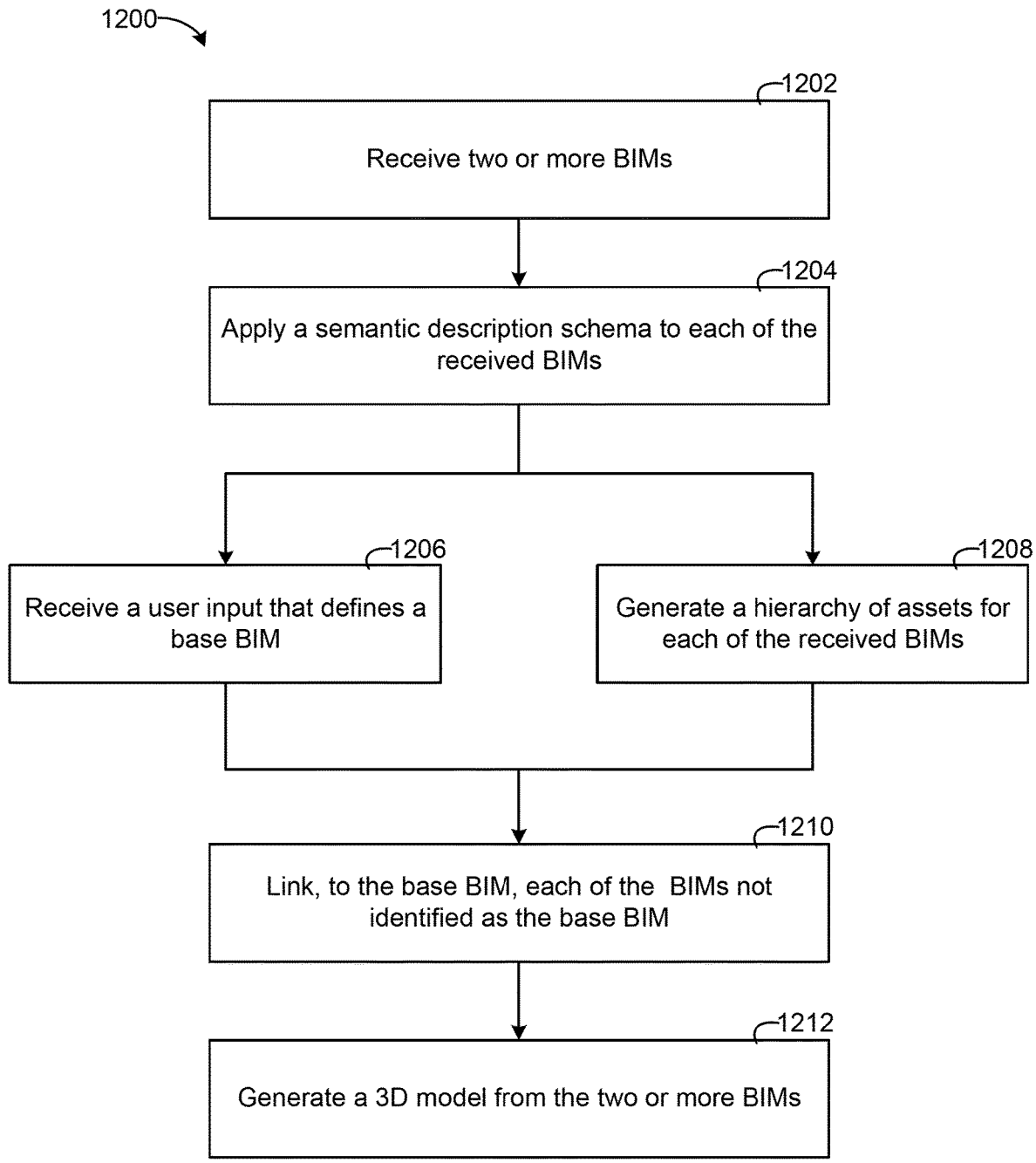
FIG. 12 is a flow diagram of a process for linking a plurality BIMs, according to some embodiments.

Referring now to FIG. 12, a flow diagram of a process 1200 for linking a plurality of BIMs is shown, according to some embodiments. In some embodiments, process 1200 may be performed by BIM manager 500. Process 1200 may generally describe at least a portion of a configuration process for two or more BIMs when the BIMs are linked together. For example, a first BIM representing a building may be linked to a second BIM that represents a floor of the building (e.g., in greater detail). In another example, a site may include four buildings, each represented by a BIM, and the BIMs representing the buildings may be linked to a base BIM that represents the complete site.

Linking BIMs according to process 1200 may beneficially reduce the size of each individual BIM, thereby increasing configuration and rendering speeds when processing BIM data to generate a 3D model. For example, a single BIM that represents an entire building may necessarily be very large in file size (e.g., multiple gigabytes) in order to accurately describe the building and building assets. By linking multiple BIMs, each describing a subset of the building (e.g., a floor, a room, a subsystem, etc.), the file size for each BIM is reduced. In addition to increased processing and rendering speeds, smaller file size may also be easier to transmit (e.g., upload or download) between systems. In some embodiments, the linked BIMs may be presented concurrently within a single interface to provide a complete view of a building or other facility represented by the BIMs.

At step 1202, two or more BIMs are received. The BIMs may be received by BIM manager 500, for example, after having been retrieved from network database 544 and/or uploaded by a user of user device 546. As described above, the received BIMs may each represent at least a portion of a building or facility and/or may be identified by a user to be linked. In some embodiments, BIMs corresponding to a common building may automatically be identified to be linked. In some embodiments, step 1202 may further include extracting metadata and/or identifying objects and object relationships with the BIMs, as described in detail with respect to step 1104 and 1106 of process 1100.

At step 1204, a semantic description schema is applied to each of the received BIMs. Step 1204 may be substantially similar to step 1108, described above. The semantic description schema may be applied by ontology engine 522, for example. In some embodiments, the semantic description schema may be Brick schema or another schema that redefines objects within the BIM and their relationships. The semantic description schema generally describes objects and object relationships in way that aligns with natural languages. For example, an object may be redefined from a "zone" to a room, or an object representing equipment may be redefined by a class or type of equipment.

At step 1206, a user input is received that identifies a base BIM. The user selection may be received via user device 546, for example. The base BIM may be one of the two or more BIMs that represents an entirety or a majority of a facility (e.g., building, site, campus) associated with the two or more BIM. For example, the base BIM may be a first BIM that describes or represents an exterior view of an entire building. Any BIMs not identified as the base BIM but corresponding to a common building may represent small sections of the building. As another example, a second may represent a subsystem of the building (e.g., HVAC system, hot water system, electrical system, etc.), a zone of the building (e.g., a floor or level, a room, etc.), or any other subset of the building as a whole.

At step 1208, a hierarchy structure is generated for each of the BIMs. In some embodiments, step 1208 is performed prior to, concurrently with, or immediately after step 1206. In some embodiments, step 1208 is substantially similar to step 1112, described above. The hierarchy structure for each BIM may indicate a physical relationship between building assets represented within the BIM. In some embodiments, the hierarchy structure may be a hierarchy of objects within the BIM that represent spaces of a building or site associated with the BIM.

At step 1210, each of the two or more BIMs not identified as the base BIM are linked to the base BIM. By linking the BIMs, each non-base BIM is associated with the base BIM, for example, by linking the BIMs within a database (e.g., network database 544). In some embodiments, linking the BIMs may include adding pointers that associate a memory or database address/location of the BIMs and BIM objects. Linking the BIMs, as described above, may reduce the file size of each individual BIM making the BIMs easier to transmit and manipulate.

At step 1212, a 3D model is generated from the data of the two or more BIMs. Step 1212 may be performed by BIM viewer 534, for example, and the generated 3D model may be presented via user device 546. Generating the 3D model may include processing the BIM data via a computer-aided drawing program or another type of 3D modeling engine. The 3D model generally includes a 3D graphical representation of a building or site represented by the BIM. The 3D may also include 3D graphical representations of building assets such as spaces and/or equipment.

In some embodiments, the 3D model is a generated from multiple BIMs such that the multiple BIMs and/or 3D models are generated and presented concurrently. For example, a previously defined base BIM may represent a first floor of a building and subsequent linked BIMs may represent additional floors of the same building. In this example, the base BIM and the other linked BIMs may be presented concurrently, within a single interface or BIM viewer. In some embodiments, the 3D model represents at least a portion of each of the linked BIMs. For example, a 3D model generated from two BIMs may represent at least a portion of each BIM.

Advantageously, presenting multiple BIMs in a single interface may allow the 3D model to include greater detail than a 3D model generated from a single BIM. Additionally, presenting the multiple BIMs within a single interface may also reduce or eliminate loading time when navigating between multiple individual BIMs. In some embodiments, presenting multiple BIMs concurrently, in a single interface, allows a user to view and navigate a 3D building model in a lightweight web browser environment.

Figure 13:
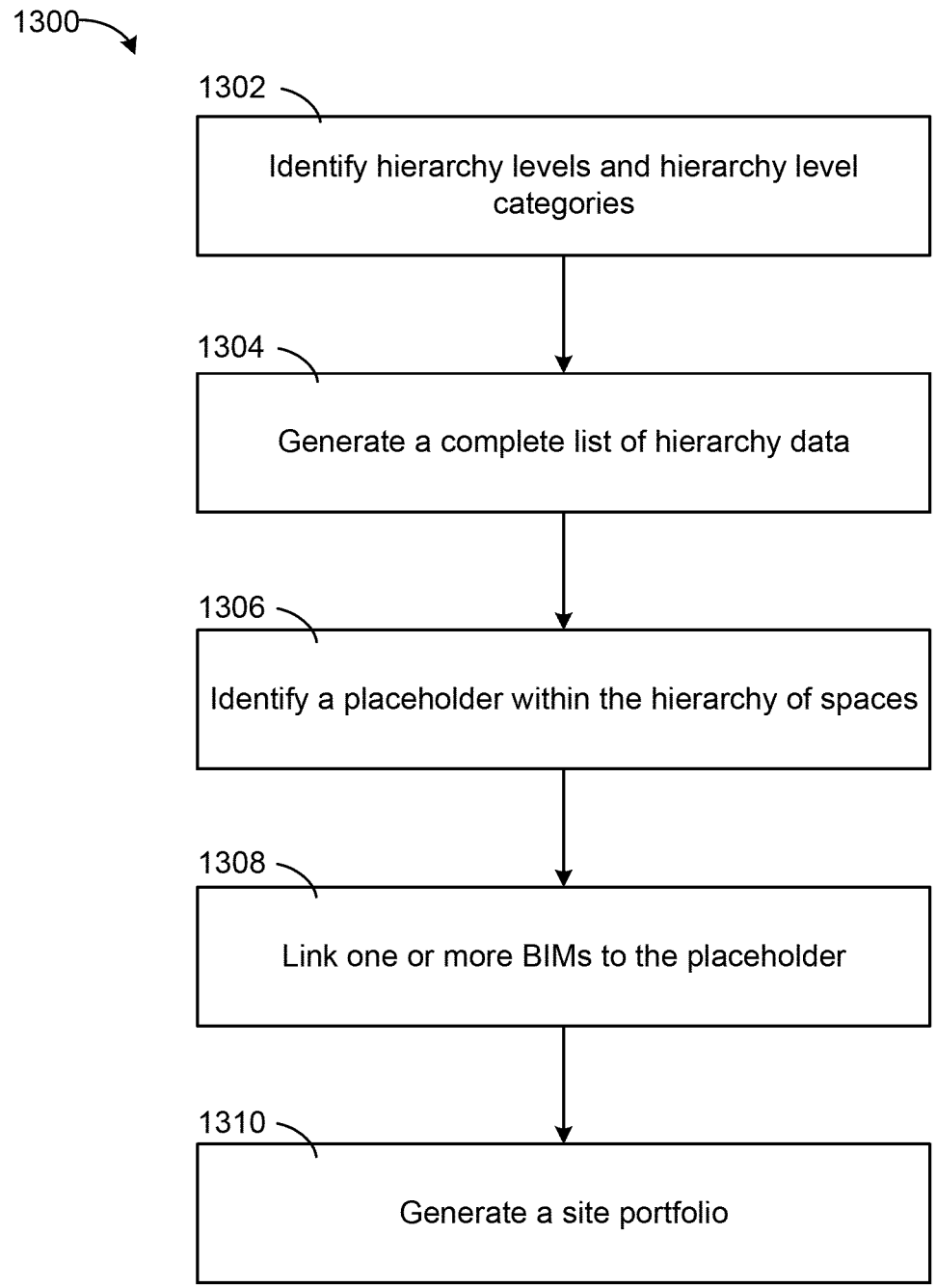
FIG. 13 is a flow diagram of a process for generating a site portfolio from a plurality of linked BIMs, according to some embodiments.

Referring now to FIG. 13, a flow diagram of a process 1300 for generating a site portfolio from a plurality of linked BIMs is shown, according to some embodiments. When two or more BIMs (e.g., representing a common building) are uploaded and linked, it may be beneficial to generate a site portfolio that describes a hierarchy for an entire site or building. The site portfolio may include not only a hierarchy of objects within the BIMs, but also a hierarchy of BIMs when multiple BIMs are linked (e.g., to display in a single interface). The site portfolio may be generated based on a hierarchy of spaces (e.g., represented by objects in the BIMs) for the combined BIMs and/or based on a hierarchy of the BIMs themselves.

At step 1302, a hierarchy level for each of the two or more BIMs is identified. Additionally, categories of hierarchy levels may be identified. In some embodiments, the hierarchy levels may be folders for sorting the plurality of BIMs. For example, based on the two or more BIMs and/or the hierarchy data previously generated for the BIMs, it may be identified that all of the BIMs correspond to a building. In another example, a top level of the hierarchy may be identified as a campus. In some embodiments, other categories (e.g., HVAC subsystems, electrical subsystems, etc.) may also be defined based on the combine hierarchy data.

At step 1304, a complete list of hierarchy data is generated based on combined hierarchy data from the two or more BIMs. Advantageously, the complete list of hierarchy data provides a single, consolidated hierarchy for the two or more BIMS. In some embodiments, the complete list of hierarchy data is generated by merging data from the two or more BIMs into such a single, consolidated hierarchy. The complete list of hierarchy data may include lists of buildings, floors, zones, and other spaces identified in the two or more BIMs. For example, a list of sites may be generated based on a facility represented in the BIMs, or a list of floors may be generated based on a building represented in the BIMs.

At step 1306, a placeholder within the hierarchy of spaces is identified. In various embodiments, the placeholder may be automatically identified (e.g., by portfolio generator 530) or may be selected by a user. The placeholder may be a hierarchy level that a BIM may be linked to. For example, a user may select a BIM representing a building (e.g., "Building A") and indicate that the BIM should be listed under a particular hierarchy level corresponding to a campus. The placeholder may give a user manual control over the organization of a site portfolio, so that the user may more easily navigate between BIMs.

At step 1308, one or more BIMs are linked to the placeholder. In various embodiments, the placeholder may be a particular BIM or an object within a hierarchy or database. Linking BIMs to the placeholder generally includes mapping or otherwise associating the BIMs with the placeholder (e.g., in a database), or may include generating a pointer to a location of the BIM within a database. At step 1308, the placeholder may be further defined, for example, by identifying a name for a facility or building associated with the placeholder.

At step 1310, a site portfolio is generated that defines a hierarchy of BIMs for an entire organization. The site portfolio may be a data structure that describes a hierarchy of building assets, represented by objects in the BIMs. In some embodiments, the site portfolio may be include a plurality of hierarchy levels that each contain a plurality of BIMs. For example, a first level (e.g., an organization) may include a second level (e.g., a site) that may include a plurality tertiary levels (e.g., each representing a building) that further include a plurality of BIMs (e.g., each representing at least a portion of a building). In some embodiments, the site portfolio may be similar to a folder system for organizing files, where folders (e.g., hierarchy levels) are nested within each other.

BAS-BIM Integration

Subsequently or concurrently to the application of a semantic description schema and the generation of a portfolio, a BIM may be integrated with a BAS in order to incorporate live or historical asset data into the BIM, as well as to provide greater functionality or control over the BAS via the BIM. Generally, integrating BAS and BIM data includes mapping a plurality of BAS points to a plurality of objects within the BIM, as described above with reference to FIG. 5. For example, a BAS point associated with a temperature sensor may be mapped to a corresponding object within the BIM that provides a digital representation of a temperature sensor. In this way, temperature data from the temperature sensor may be viewed within a 3D model, generated from the BIM.

Figure 14:
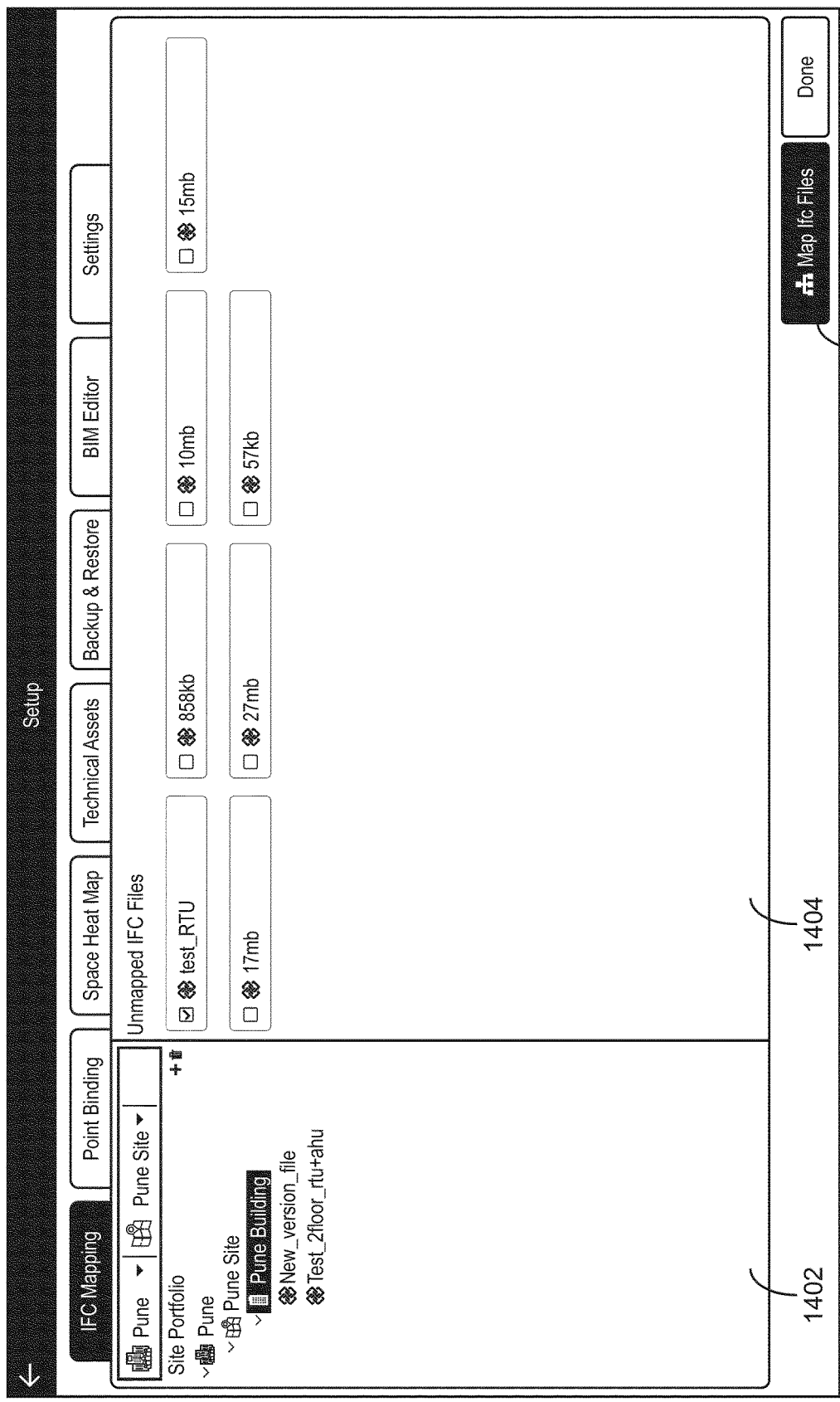
FIG. 14 is an example interface for mapping a plurality of BIMs, according to some embodiments.

Referring now to FIG. 14, an example interface 1400 for mapping a plurality of BIMs is shown, according to some embodiments. Interface 1400 may be generated by UI generator 536 and presented to a user via user device 546, for example. In some embodiments, the plurality of BIMs may be mapped by BAS-BIM integrator 528. Interface 1400 may allow a user to select one or more BIMs to map simultaneously. A user may choose to map a subset of uploaded BIMs, for example.

Interface 1400 is shown to include a site portfolio 1402. In some embodiments, site portfolio 1402 is a textual representation of the site portfolio generated from process 1300, described above. Site portfolio 1402 may present a plurality of drop down menus that allow a user to select an organization, a site, a building, and/or an individual BIM. As shown in FIG. 14, for example, a user may select an organization ("Pune"), a site ("Pune Site"), and a building ("Pune Building"). After selecting the organization, site, and/or building, the user may select one or more unmapped BIMs from an unmapped file menu 1404, to be mapped to the selected organization, site, and/or building. For example, the user may select BIM "test_RTU" by marking the check box within unmapped file menu 1404 and, by selecting a map files button 1406, map the selected BIM to building "Pune Building."

Figure 15:
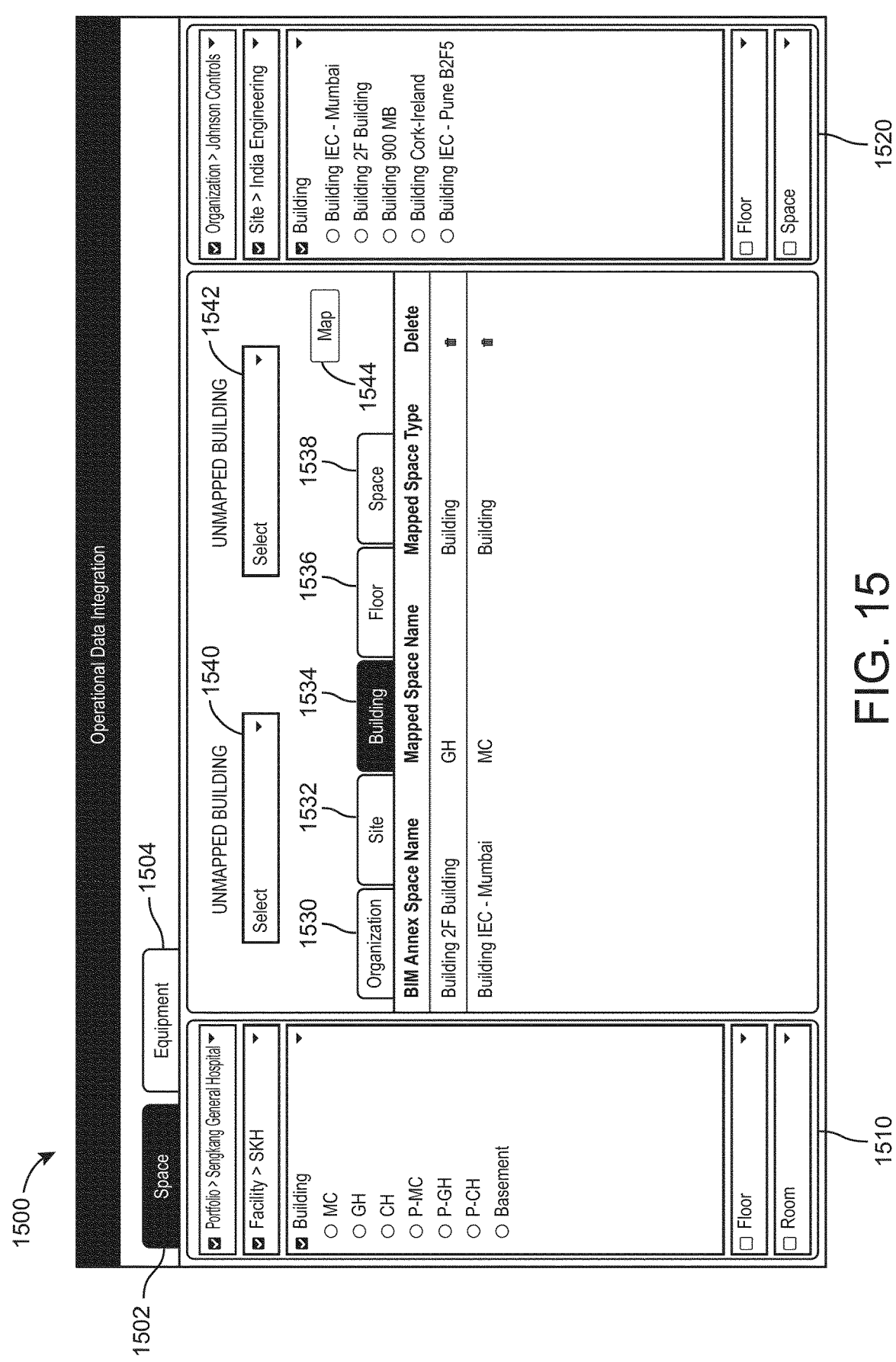
FIGS. 15 and 16 are example interfaces for integrating BAS points associated with spaces of the site or building with a BIM, according to some embodiments.
Figure 16:
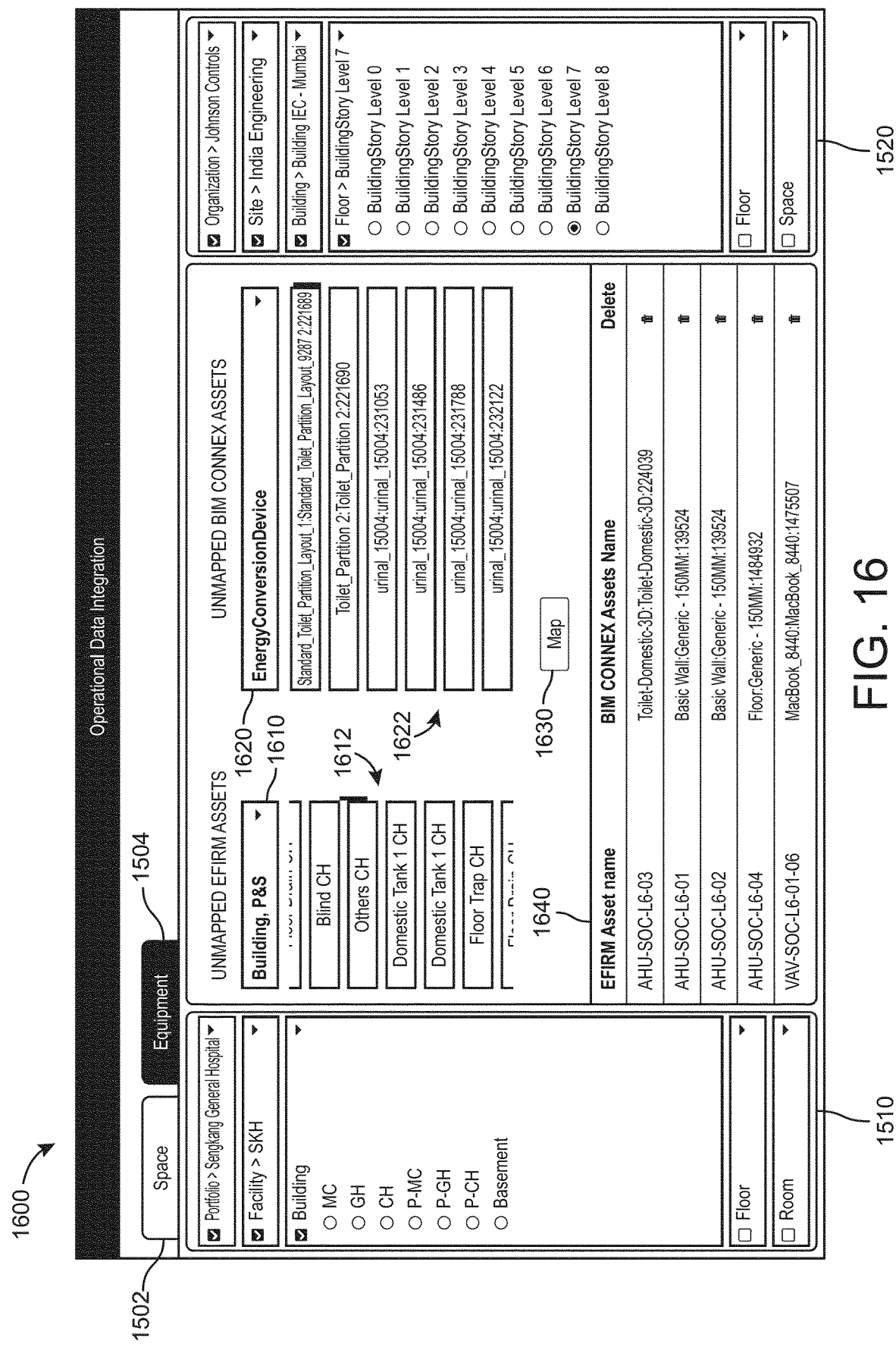

Referring now to FIGS. 15 and 16, example interfaces 1500 and 1600 for integrating BAS points associated with spaces of the site or building with a BIM are shown, according to various embodiments. Interfaces 1500 and 1600 may be generated by UI generator 536 and presented to a user via user device 546, for example. In some embodiments, interfaces 1500 and 1600 may provide a user with a method of mapping a plurality of BAS points to a plurality of objects within the BIM. For example, interfaces 1500 and 1600 may allow the user to map BAS points that could not be automatically mapped (e.g., due to a mismatch in a description schema). Interfaces 1500 and 1600 may also provide a user additional control over the configuration of a BIM by allowing the user to view, modify, and/or delete currently mapped spaces and/or equipment.

As shown in FIG. 15, interface 1500 may be presented responsive to a user selection of a first navigation tab 1502 ("Space"). Interface 1500 may allow a user to map previously unmapped spaces associated with points from a BAS or facility management system to objects within a BIM. Interface 1500 is shown to include a first navigation menu 1510 that allows a user to select a space associated with the BAS or facility management system, and a second navigation menu 1520 that allows the user to select a particular BIM or a space from a BIM.

Interface 1500 is further shown to include a plurality of navigation tabs 1530-1538 that a user may select to view currently mapped organizations, sites, buildings, floors, or spaces. Within the navigation tabs, the user may delete one or more of the mapped spaces. The user may select a first unmapped space via a first dropdown menu 1540 and a second unmapped space via a second dropdown menu 1542. Once the unmapped spaces are selected, the user may select a map button 1544 to integrate the spaces.

As shown in FIG. 16, interface 1600 may be presented responsive to a user selection of a second navigation tab 1504 ("Equipment"). Interface 1500 may allow a user to map previously unmapped equipment from a BAS or facility management system to objects within a BIM. For example, a user may select spaces from first navigation menu 1510 (e.g., building "CH") and 1520 (e.g., floor "Building Storey Level 7"). Subsequently, the user may make a selection from dropdown menus 1610 and/or 1620 to view a plurality of currently unmapped equipment points and objects within menus 1612 and 1622. The user may then select a particular equipment point and object from each of menus 1612 and 1622, respectively, and by selecting a map button 1630, integrate the selected point and object. The user may also be presented with a mapped equipment table 1640 to view and delete currently mapped equipment.

Backup and Restore

In some embodiments, the configuration of a BIM or multiple BIMs, as described above, may be saved in as a backup. In an example where a BIM has been configured by applying a semantic description schema and mapping a plurality of BAS points to objects within the BIM, the configuration of the BIM (e.g., including the semantic description schema and the mapping) may be backed-up to a database (e.g., network database 544). Subsequently, a new BIM (e.g., an updated version of the original BIM) may be uploaded and the backed-up configuration may be applied to the new BIM via a restore process.

Backup and restore functionality may be desirable, as BIMs may change regularly. For example, a BIM representing a building may change each time the building undergoes construction or renovation, or when building assets such as equipment (e.g., HVAC equipment, fire safety equipment, etc.) is added, removed, or moved. In some embodiments, the backup and restore functionality may decrease the amount of time required to configure a BIM. In the example above, applying the configuration of a BIM to an updated version of said BIM may save a user time in manually mapping BAS points to BIM objects.

Figure 17:
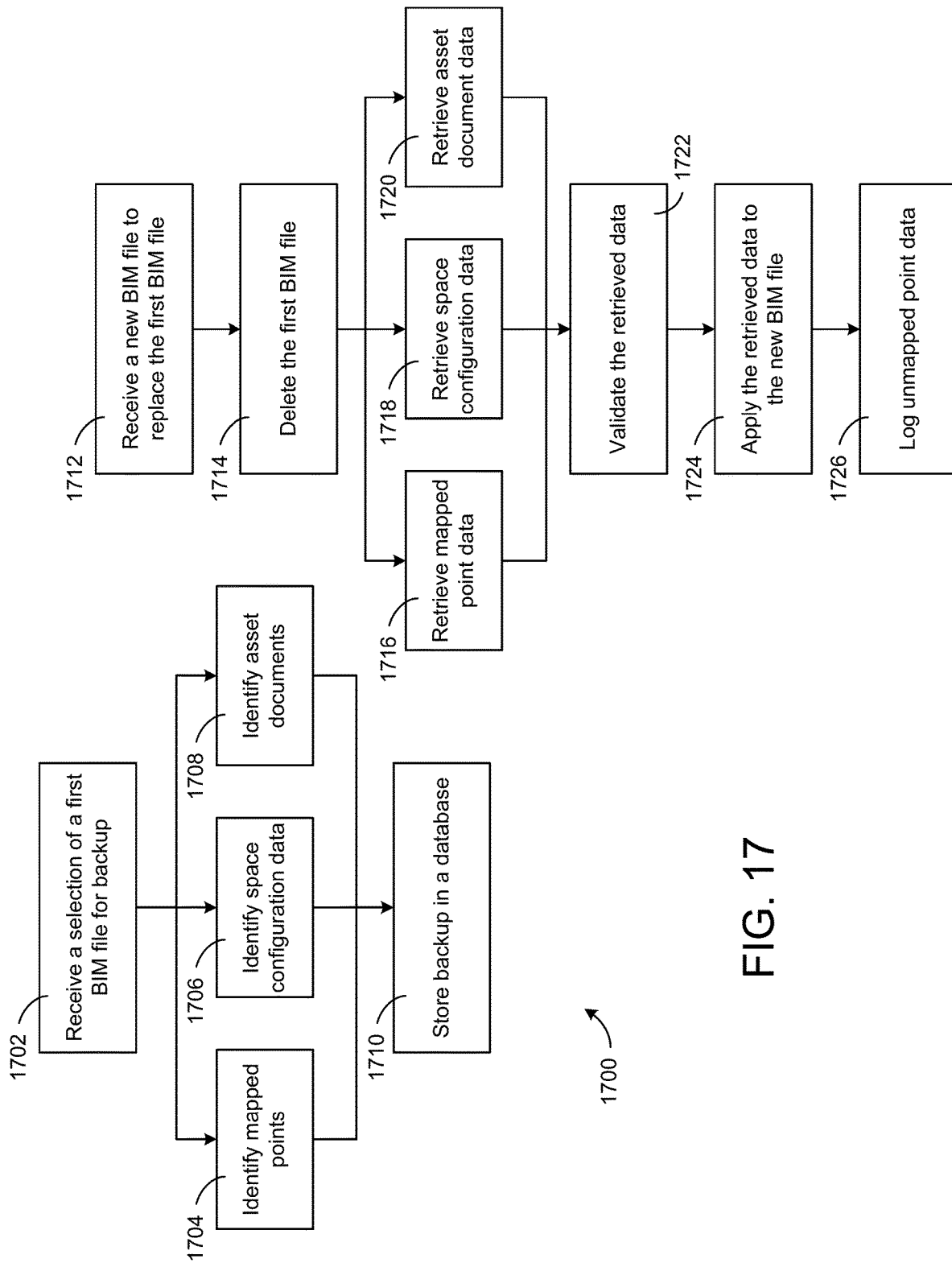
FIG. 17 is a flow diagram of a process for backing-up and restoring a BIM configuration, according to some embodiments.

Referring now to FIG. 17, a flow diagram of a process 1700 for backing-up and restoring a BIM configuration is shown, according to some embodiments. In some embodiments, process 1700 may be separated into two distinct sub-processes including a backup process and a restore process. As shown, for example, steps 1702 through 1710 may be associated with the backup process and steps 1712 through 1726 may be associated with the restore process. In some embodiments, the backup and restore process may be performed sequentially. In other embodiments, the backup process may be performed any time prior to the restore process.

At step 1702, a selection of a first, previously configured BIM is received for backup. The BIM may be a previously configured BIM stored in network database 544, for example. The BIM may be selected by a user (e.g., of user device 546) at any time following the configuration of the BIM, as described above. In some embodiments, a BIM manager (e.g., BIM manager 500) may be configured to automatically backup a BIM following configuration.

At steps 1704-1708, at least one of mapped points (e.g., BAS points mapped to BIM objects), space configuration data (e.g., zone heat maps), or asset documents are identified. In various embodiments, steps 1704-1708 may be performed concurrently or sequentially. In various embodiments, the mapped point, space configuration, and/or asset document data may be retrieved from a database such as network database 544 or identified from the retrieved BIM configuration. Steps 1704-1708 may further include generating a list from the identified mapped points, space configuration data, or asset documents for a selected BIM.

At step 1710, the backup file is stored in a database, such as network database 544. The mapped points, space configuration data, and asset data may be aggregated into a single backup file, for example. In various embodiments, the backup file may be stored with the BIM in the database or a link or pointer to the backup file may be generated so that the backup file might be stored in another part of the database.

At step 1712, a new BIM is received. The new BIM may be received from a user device (e.g., user device 546) or retrieved from network database 544, for example. The new BIM is generally an updated version of a previously backed-up BIM. As described above, for example, the new BIM may represent the same building or facility as the original BIM after construction, renovation, building asset relocation, etc. In some embodiments, one or more of the automatic configuration processes described above may be performed on the new BIM prior to the restoration of the original BIM configuration. For example, a semantic description schema may be automatically applied to the new BIM, and/or a hierarchy may be generated.

At step 1714, the original BIM and its configuration is deleted. In some embodiments, the original BIM is deleted responsive to a user selection to replace the original BIM with the new BIM. Deleting the original BIM may include removing the BIM from a database (e.g., network database 544) and may further include removing pointers or links to the original BIM within the database. In some embodiments, the new BIM may be uploaded to the same database location as the original BIM, in which case the pointers or links may not be removed.

At steps 1716-1720, at least one of previously backed-up mapped points, space configuration data, and asset documents is received. In various embodiments, steps 1716-1720 may be performed concurrently or sequentially. In various embodiments, the mapped point, space configuration, and/or asset document data may be retrieved from a database such as network database 544 or identified from the retrieved BIM configuration.

At step 1722, the received data is validated. Validating the received data may include comparing the received data with a hierarchy generated for the new BIM, for example. In some embodiments, the data may be validated by identifying whether the received data corresponds to an object within the new BIM. For example, identified objects within the new BIM may be compared to received mapped point backup to identify objects within the BIM that do not correspond to previously mapped point.

At steps 1724-1726, the retrieved data is applied to the new BIM and any unmapped points or other data are logged. In some embodiments, once the data is validated, it may be applied to the new BIM or stored in a database (e.g., network database 544). Any backup data not associated with the new BIM may be identified so that a list may be generated for manual configuration by a user. For example, an object that is present in the new BIM may not correspond to a previously mapped BAS point, if the object was not included in the original BIM (e.g., a new HVAC asset or new structural assets due to a renovation). In this example, the new object may be identified so that the user may manually map a BAS point or multiple BAS points to the identified object.

Figure 18:
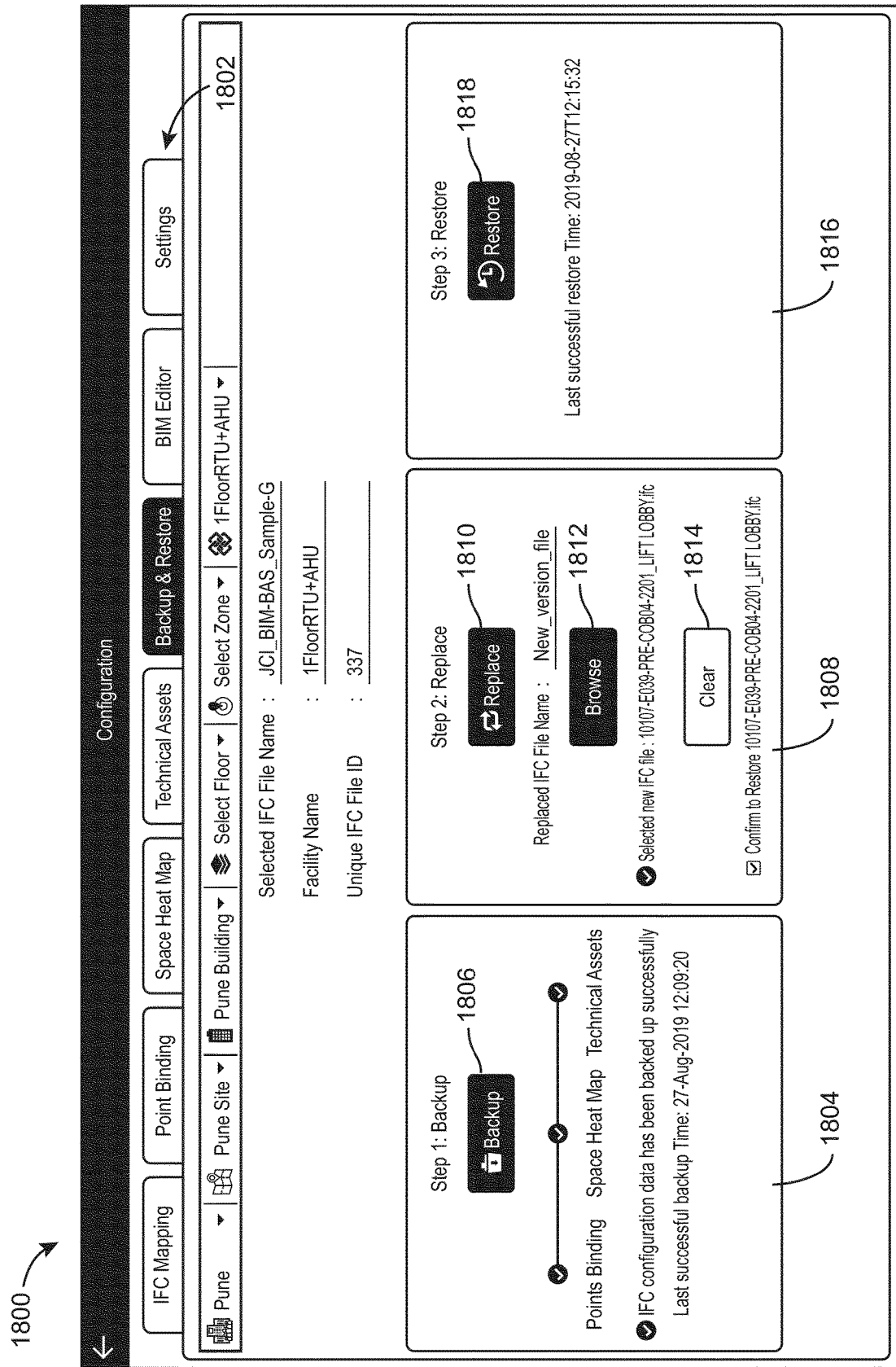
FIG. 18 is an example interface for performing the backup and restore functionality of FIG. 17, according to some embodiments.

Referring now to FIG. 18, an example interface 1800 for performing the backup and restore functionality of FIG. 17 is shown, according to some embodiments. In some embodiments, interface 1800 may be generated by UI generator 536 and presented via user device 546. As described above, the backup and restore functionality may allow a user to apply a configuration from a plurality of current or previously configured BIMs to a new BIM, thereby reducing or eliminating the need for the user to manually configure each new BIM that is uploaded. A user may select a particular organization, site, building, floor, zone, and/or BIM via a navigation bar 1802. Once selected, the user may select a backup button 1806 within a backup menu 1804 to initiate a backup process, as described above with respect to FIG. 17. Backup menu 1804 may provide a user with feedback with visual or textual feedback indicating a status of the backup process. As shown in FIG. 18, for example, backup menu 1804 may indicate when the points binding (e.g., mapped points), space heat map, and technical assets are successfully saved. Backup menu 1804 is also shown to include a time stamp indicating the last successful backup.

Once the BIM has been successfully backed up, the user may browse for a new, replacement BIM by selecting a browse button 1812, included in a replacement menu 1808. Subsequently, the user may select a replace button 1810 or a clear button 1814. Selecting replace button 1810 may initiate a process that include uploading the new BIM and replacing the original BIM with the new, replacement BIM. Selecting clear button 1814 may clear the selected replacement BIM, thereby allowing the user to select another replacement BIM. In some embodiments, replacement menu 1808 may include a radio button, check box, or other graphical object that prompts the user to confirm the replacement of the original BIM with the new BIM, providing protection against unintentionally replacing the original BIM.

Finally, once the original BIM configurations have been backed up and the original BIM has been replaced by the new replacement BIM, the user may select a restore button 1818 including in a restore menu 1816. Restore button 1818 may initiate the restore process, as described above with respect to steps 1712 through 1726 of FIG. 17. The restore process may apply the configuration of the original BIM to the new replacement BIM. As shown, restore menu 1816 may also include a timestamp of the last successful restore.

3D Building Model

Following one or more of the configuration processes described above, a three-dimensional (3D) model may be generated from the BIM data. In some embodiments, the 3D model is a 3D building model generated by BIM viewer 534 and presented to a user of user device 546 via UI generator 536. In some embodiments, the 3D model may be a digital representation (i.e., digital twin) of a facility (e.g., site, campus, building, or other facility). For example, the 3D model may be a digital representation of a building that includes a plurality of building assets, such as spaces and/or equipment. The 3D model may provide an interactive, graphical representation of the building and building assets.

In some embodiments, the 3D model is generated from multiple BIM files and may include multiple BIMs presented concurrently. For example, a 3D model of a building may be generated from multiple BIMs, including a first BIM (e.g., a base BIM) that represents a majority of the building (e.g., an exterior view of the whole building) and a plurality of additional BIMs that each represent a subsection of the building (e.g., each BIM defines a floor or subsystem of the building). Advantageously, presenting multiple BIMs concurrently may reduce the file size for each BIM, thereby increasing computing or rendering speed, by allowing sublevels or subsystems of a facility to be broken out into separate BIMs.

Figure 19:
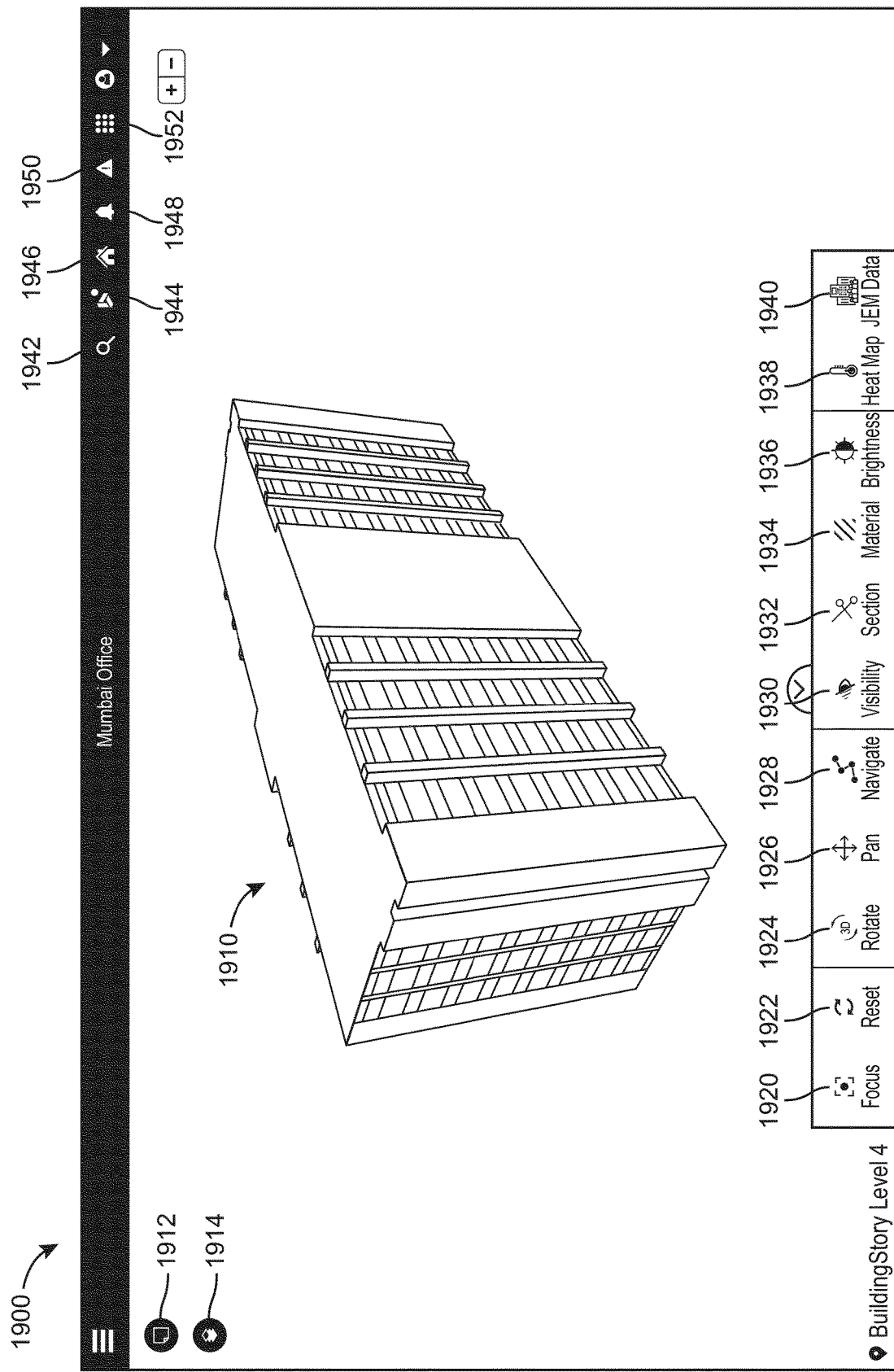
FIG. 19 is an example interface of a BIM viewer that can concurrently present multiple BIMs as 3D models, according to some embodiments.

Referring now to FIG. 19, an example interface 1900 of a BIM viewer that can concurrently present multiple BIMs as 3D models is shown, according to some embodiments. Interface 1900 is shown to include a 3D model 1910 that may be a digital representation of a building. Generally, 3D model 1910 represents an entirety or a majority of a facility (e.g., a campus, a site, a building, etc.) In some embodiments, 3D model 1910 may be generated from a single BIM or from multiple BIMs. In some embodiments, 3D model 1910 is generated from a base BIM and may contain data from a plurality of additional BIMs. In some embodiments, 3D model 1910 is generated from multiple 3D models, each associated with a single BIM.

Interface 1900 is shown to include a variety of graphical objects for manipulating and navigating the 3D model. For example, interface 1900 is shown to include a subsystem navigation icon 1914 and a level navigation icon 1912, described in detail below with respect to FIGS. 20 and 21C, respectively. Interface 1900 is also shown to include a focus icon 1920 and a reset icon 1922 that may be selected by a user to adjust the perspective of 3D model 1910 or reset interface 1900 to a default view. Additionally, a rotate icon 1924, a pan icon 1926, and/or a navigate icon 1928 may be selected to further adjust the view of 3D model 1910, by rotating the model, panning across the model (e.g., within a single plane), or navigating to different areas of the building.

Interface 1900 is further shown to include a visibility icon 1930, a section icon 1932, a material icon 1934, and a brightness icon 1936. Visibility may be selected to show or hide components of 3D model 1910, such as walls, beams, doors, windows, etc. Section icon 1932 may be selected to view either a vertical or horizontal cross-section of 3D model 1910. Material icon 1934 may be selected to adjust the materials that are illustrated in 3D model 1910. Brightness icon 1936 may be selected to adjust the brightness of 3D model 1910. Also shown are a heat map icon 1938 and a data icon 1940, described in detail below with respect to FIGS. 25-28. In some embodiments, selecting data icon 1940 may present a data menu, allowing the user to choose a type of data to view.

In addition to the graphical objects for manipulating and navigating 3D model 1910, interface 1900 also includes a number of graphical objects for navigating between different interfaces. For example, interface 1900 is shown to include a search icon 1942 that may be selected in order to search for objects (e.g., spaces, equipment) within the BIM. Interface 1900 also includes an analytics icon 1944 for viewing a variety of live data on physical building assets represented by objects within the BIM, such as current values, alarms, etc. A home icon 1946 may be selected to return from any interface to interface 1900. More generally, home icon 1946 resets the interface to that shown in interface 1900. A notification icon 1948 and/or a fault icon 1950 may be selected to view a variety of information on general notifications and/or faults for building assets represented by objects within the BIM. Finally, a menu icon 1952 may be selected to populate a menu for navigating between other interfaces such as a configuration interface (e.g., one of interface 600, interface 1000, interface 1400, etc.), a settings interface, or other interfaces.

Figure 20:
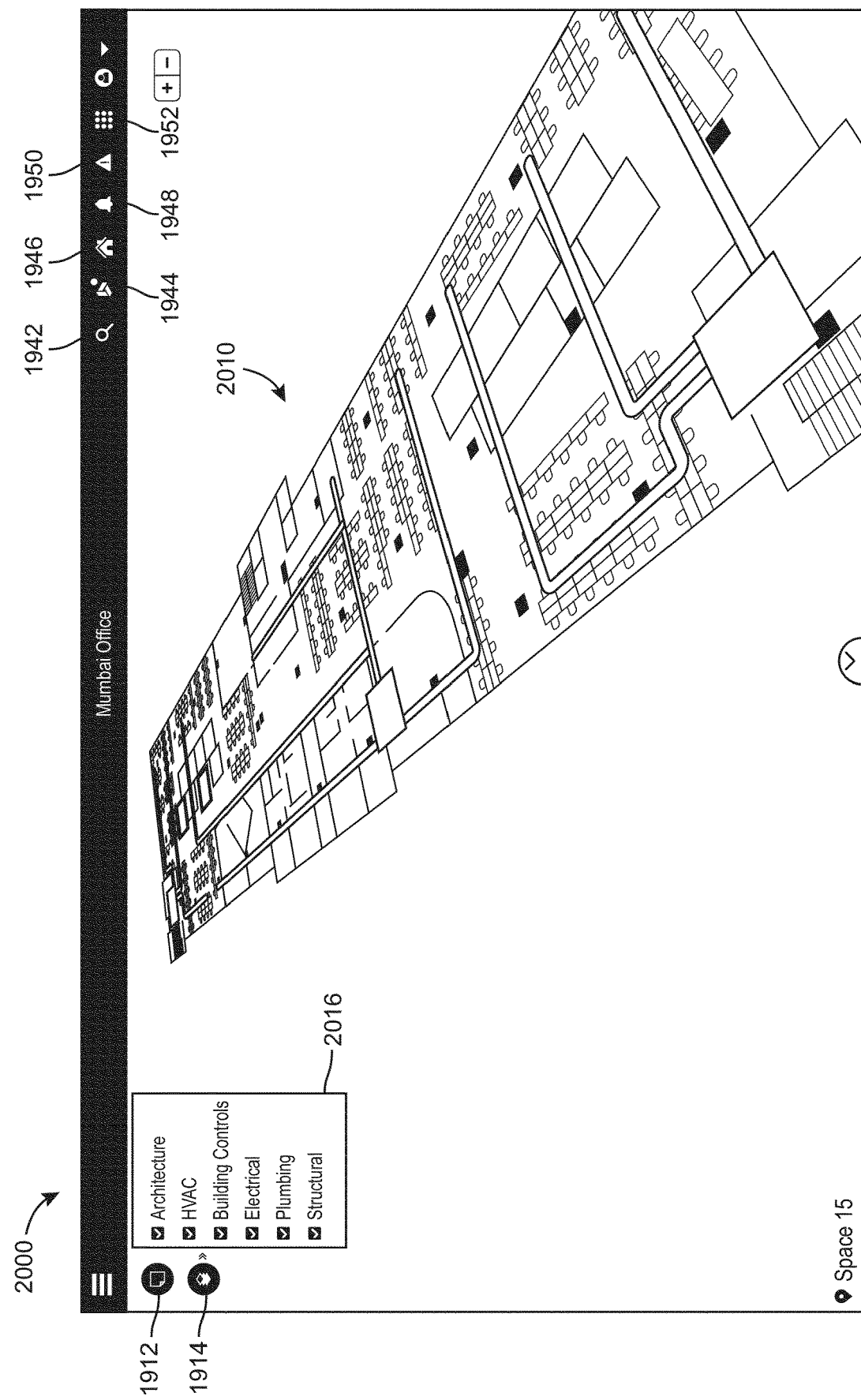
FIG. 20 is an example interface of filtering within the BIM viewer, according to some embodiments.

Referring now to FIG. 20, an example interface 2000 for filtering within the BIM viewer is shown, according to some embodiments. As described above, responsive to a user may selection of subsystem navigation icon 1914, the user may be presented with a subsystem menu 2016. By selecting one or more subsystems to view (e.g., by selecting a checkbox corresponding to each subsystem), the user may limit the number of subsystems shown with the interface. As shown in FIG. 20, for example, a user may select all the available subsystems, except for an architecture subsystem, to be viewed. In this example, the user is present with a filtered 3D model 2010. Filtered 3D model 2010 may be a 3D model of only the selected subsystems, such as HVAC, electrical, plumbing, etc. In some embodiments, a separate BIM is associated with each of the subsystems, such that filtered 3D model 2010 is a compilation of multiple BIMs, being presented concurrently. In some embodiments, each of the subsystems is included in a single BIM that represents a single floor (i.e., story, level, etc.) or a single building. Much like interface 1900, for example, interface 2000 includes functionality that allows a user to focus, reset, rotate, pan, etc., filtered 3D model 2010.

Referring now to FIGS. 21A-21C, example navigation interfaces that may be presented within the BIM viewer are shown, according to various embodiments. Specifically, FIG. 21A is shown to include a first configuration of a navigation interface 2100 that illustrates a site portfolio menu 2110, a building structure menu 2120, and a space hierarchy menu 2130. In some embodiments, a user may select one of the menus, thereby causing a list of associated BIM objects to populate. For example, the first configuration of navigation interface 2100 show in FIG. 21A is shown with site portfolio menu 2110 selected and a hierarchy of previously defined sites and/or building populated. In some embodiments, the hierarchy presented under site portfolio menu 2110 is based on the site portfolio generated by portfolio generator 530. As shown, for example, site portfolio menu includes a hierarchy of organizations, sites, and facilities or campuses. Each of the facilities or campuses is shown to include a number of BIMs, generally representing a building.

FIG. 21B is shown to include an alternate configuration of navigation interface 2100, where building structure menu 2120 has been selected. Similar to the example above, when building structure menu 2120 is selected, a hierarchy of spaces within a building (e.g., rooms, spaces, zones, levels, etc.) is populated. In some embodiments, the hierarchy of spaces presented under building structure menu 2120 is populated based on a selection of a site or building within site portfolio menu 2110.

In some embodiments, the hierarchy presented under building structure menu 2120 is based on the hierarchy structure generated by portfolio generator 530. In some embodiments, a user may navigate through the hierarchy shown in building structure menu 2120 to view particular equipment or BAS points associated with a space. For example, a user may select "Space 16" from building structure menu 2120 to view a plurality of BAS points associated with sensors in "Space 16".

In a similar manner to building structure menu 2120, space hierarchy menu 2130 may be selected, and a hierarchy of objects with the BIM (e.g., zones, equipment, etc.) populated. The hierarchy of objects presented under space hierarchy menu 2130 may be based on a selection of a space in building structure menu 2120, for example. In some embodiments, space hierarchy menu 2130 may be generated based on a hierarchy of objects within a BIM after the application of a semantic description schema. In this regard, space hierarchy menu 2130 may provide a hierarchy of building assets corresponding to objects in the BIM based on an intuitive and/or easy-to-understanding description schema.

FIG. 21C is shown to include a navigation interface that may be presented when level navigation icon 1912, described above with respect to FIG. 19, is selected. For example, responsive to a user may selection of level navigation icon 1912, the user may be presented with a level menu 2150. By selecting one or more levels (e.g., floors, zones, stories, etc.) to view (e.g., by selecting a checkbox corresponding to each level), the user may limit the number of levels shown with the interface. For example, a user may select all the available levels, except for level 8. In this example, the user is present with a filtered 3D model (e.g., 3D model 1910) including only the selected levels. In some embodiments, a separate BIM is associated with each of the level, such that the 3D model is a compilation of multiple BIMs being presented concurrently. In some embodiments, each of the levels is included in a single BIM that represents a single building (i.e., campus, site, etc.).

Figure 22:
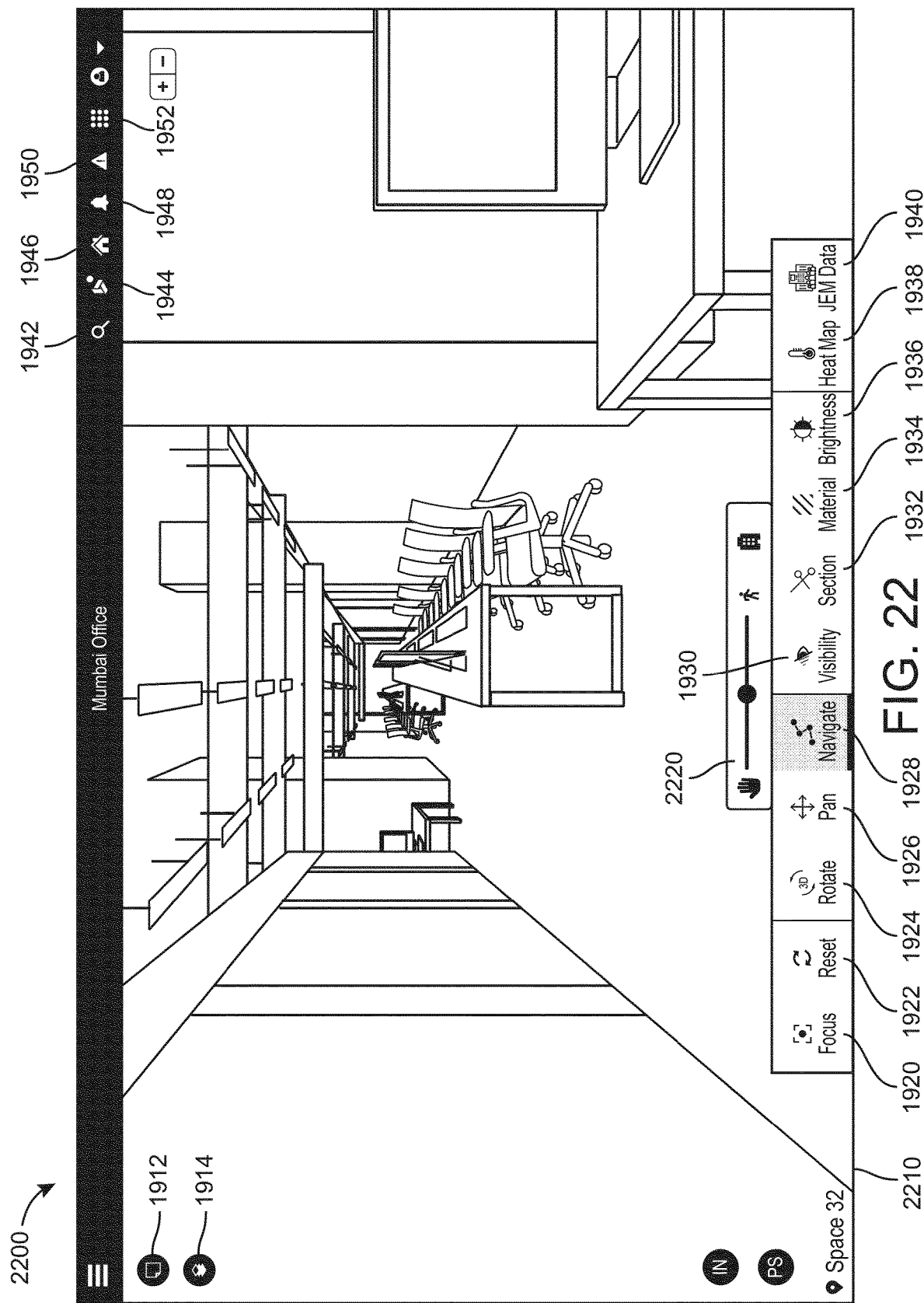
FIG. 22 is an example interface illustrating a first person perspective within a 3D building model, according to some embodiments.

Referring now to FIG. 22, an example interface 2200 illustrating a first person perspective within the BIM viewer is shown, according to some embodiments. Interface 2200 may be presented to a user when a user selects a particular space (e.g., floor, story, room) to view via the navigation interface described above with respect to FIGS. 21A-21C, for example. In some embodiments, interface 2200 is presented to a user when the user selects navigate icon 1928 and chooses to navigate to a particular story (i.e., floor, level) within 3D model 1910. For example, when a user selects navigate icon 1928, a navigation submenu 2220 may be presented. Navigation submenu 2220 may allow a user to select a particular floor of the building represented by 3D model 1910 and be presented with a first-person perspective view 2210 of the selected floor. The user may then adjust a slider shown in navigation submenu 2220 to control a speed at which to navigate through the 3D model of the selected floor.

Analytics

Figure 23:
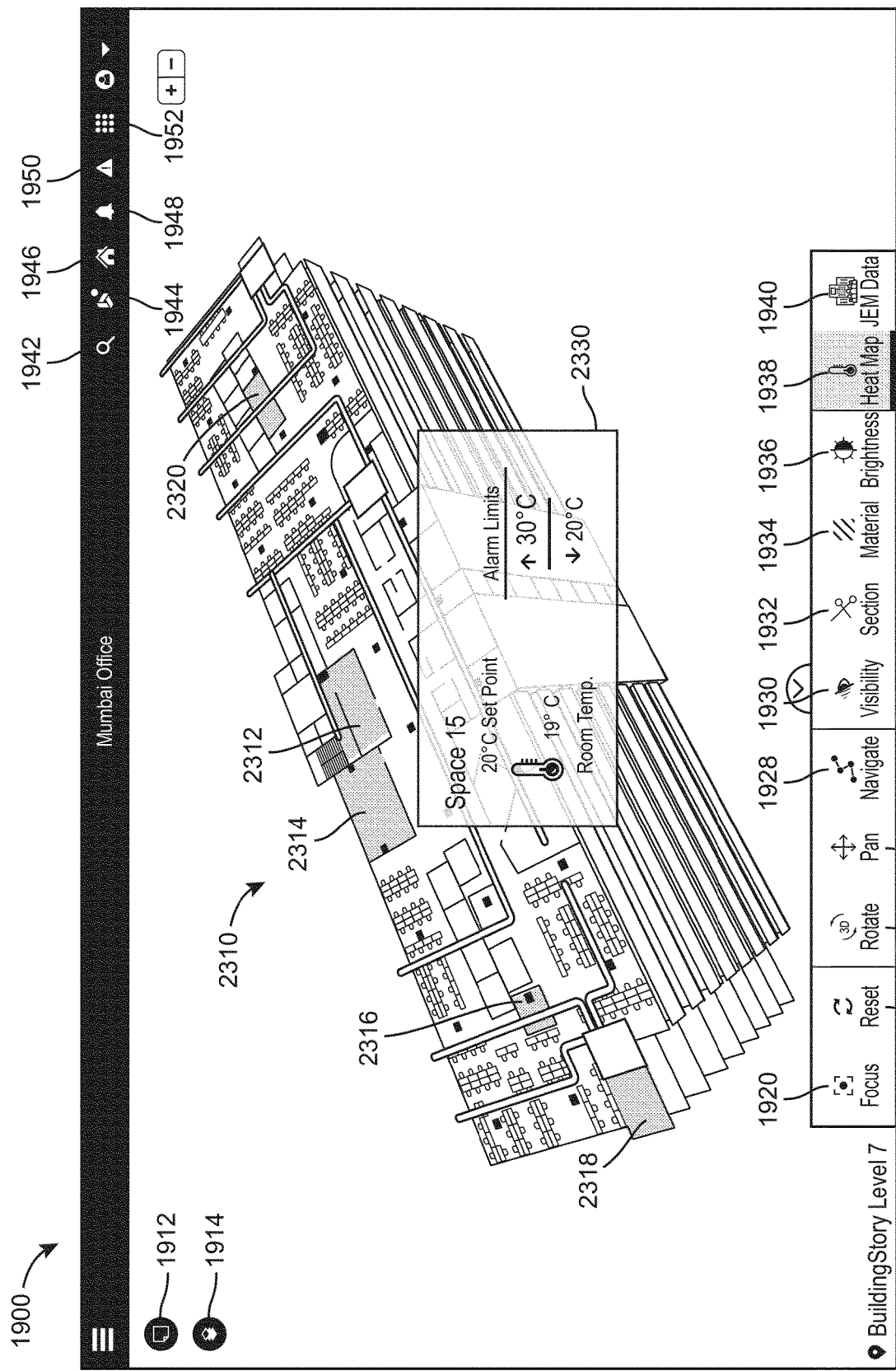
FIG. 23 is an example interface of a zone heat map that presents thermal data for particular spaces or zones within a 3D building model, according to some embodiments.

Referring now to FIG. 23, an example interface 2300 of a zone heat map that presents thermal data for particular spaces or zones within the BIM viewer is shown, according to some embodiments. Interface 2300 may be presented to a user via user device 546 responsive to a selection of heat map icon 1938, for example. In some embodiments, thermal data may be collected from an analytics engine by data collector 532. As shown, interface 2300 includes a 3D model 2310 of a building, where a top floor of the building is visible. 3D model 2310 includes a number of zones 2312-2320 that have been configured to present thermal data corresponding to each zone. For example, a user may select zone 2312 (e.g., a conference room) to display current temperature and temperature alarm data within a data window 2330. Data window 2330 may provide a variety of information to a user such as a space ID ("Space 15"), a temperature setpoint and current temperature (e.g., 20° C. and 19° C., respectively), and alarm data (e.g., an upper limit of 30° C. and a lower limit of 20° C.).

In some embodiments, a shading, color, style, or other identifying feature of each zone may change based on the temperature of the zone, an alarm status for the zone, a temperature setpoint for the zone, etc., thereby providing a user with an easy to understand overview of temperatures within a plurality of zones of a building or site. For example, user may identify, at a glance, what zones are above or below desired temperature setpoints. Such information may allow the user to quickly identify problems with spaces or equipment (e.g., air condition equipment that is not working correctly) or identify other information to aid in building or site management.

Figure 24:
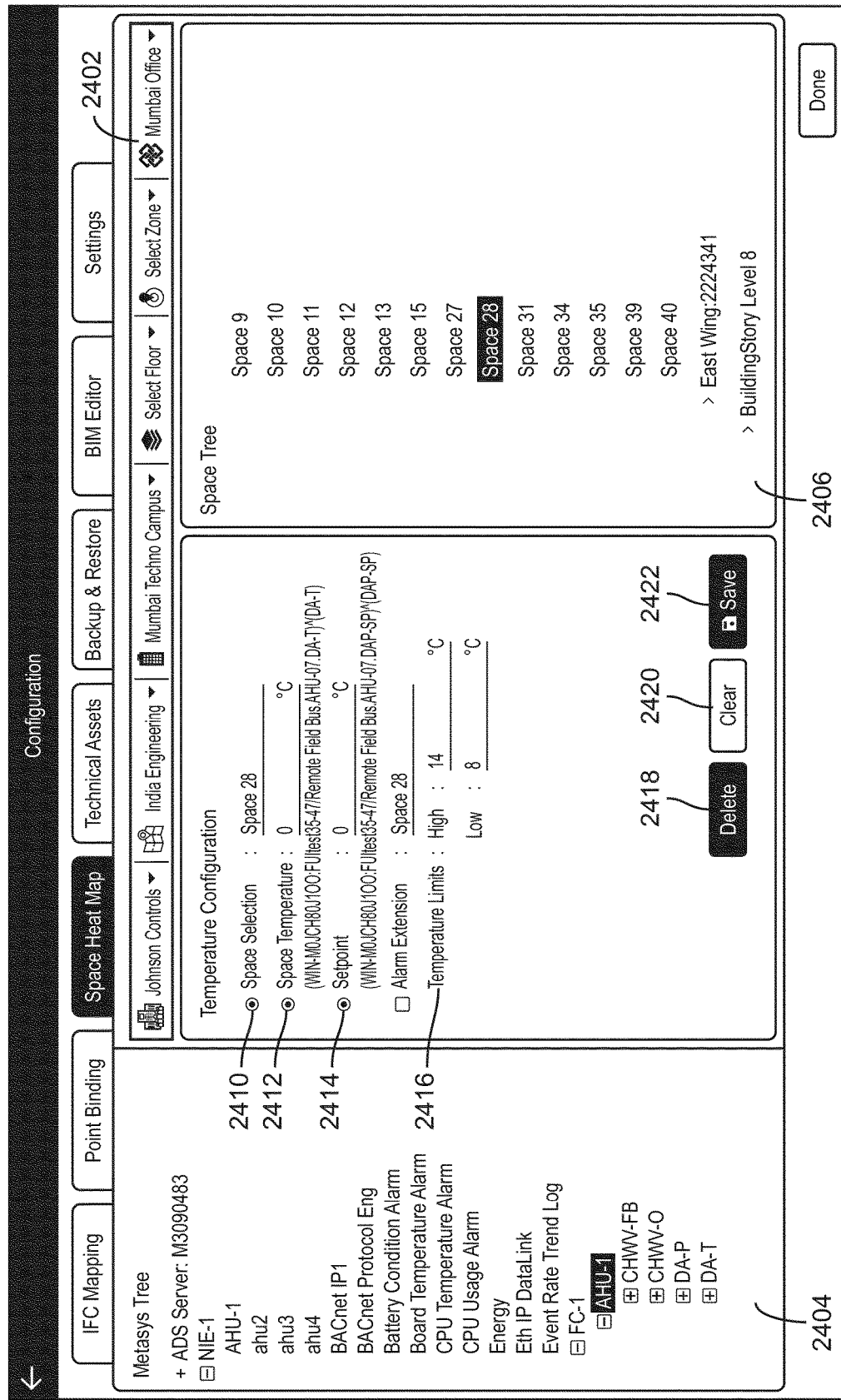
FIG. 24 is an example interface for configuring the zone heat map of FIG. 23, according to some embodiments.

Referring now to FIG. 24, an example interface 2400 for configuring the zone heat map of FIG. 23 is shown, according to some embodiments. Interface 2400 may be presented to a user via user device 546 responsive to a selection a configuration interface from menu icon 1952, for example. When presented with interface 2400, a user may first select a BIM to configure, utilizing a navigation bar 2402. After selecting the BIM, a BAS tree 2404 and a space tree 2406 may populate with a portfolio of BAS or BIM space objects associated with the selected BIM. A user may select a space (e.g., space 28) from space tree 2406, for example, and configure temperature data for the space.

As shown in interface 2400, a name or definition for the selected space may populate in a space selection field 2410. Interface 2400 is also shown to include a space temperature field 2412, a temperature setpoint field 2414, and a temperature limits field 2416. In some embodiments, a current temperature, temperature setpoint, and/or temperature limits for a space are retrieved from BAS 400 or an analytics engine associated with BAS 400, or entered by a user. The user may delete a stored zone configuration by selecting a delete button 2418. Likewise, by selecting a clear button 2420, the user can clear data entered into one of the fields 2412-2416. Selecting a save button 2422 may map the entered zone configuration to the zone, thereby populating the zone thermal data on the zone heat map.

Figure 25:
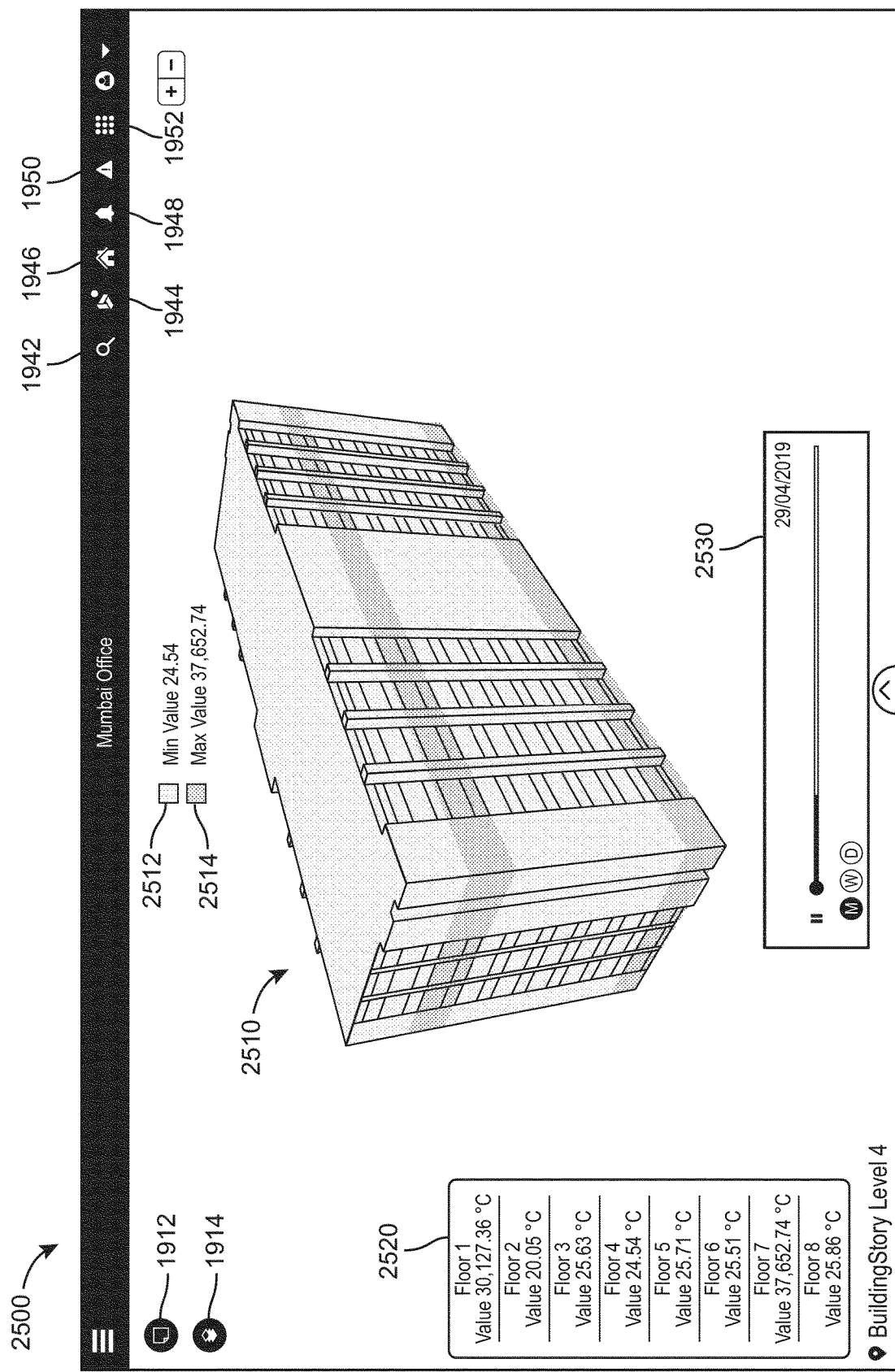
FIGS. 25 and 26 are example interfaces that present thermal data and energy consumption data within a 3D building model, according to some embodiments.
Figure 26:
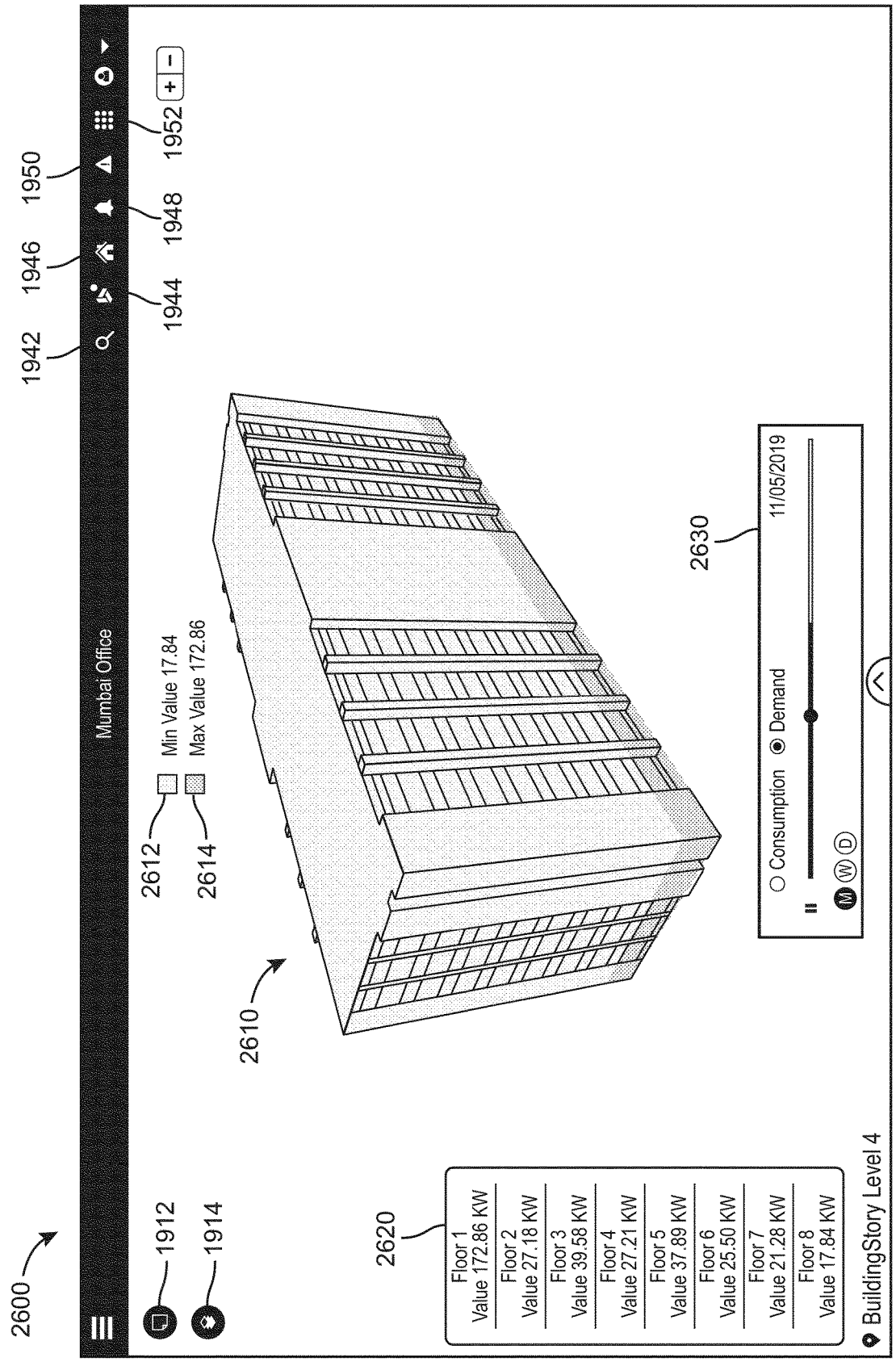

Referring now to FIGS. 25 and 26, example interfaces that present thermal data and energy consumption data within a 3D building model are shown, according to various embodiments. Specifically, FIG. 25 is shown to include an example interface 2500 and FIG. 26 is shown to include an example interface 2600. Interfaces 2500 and 2600 may be presented to a user responsive to a selection of data icon 1940, for example. The thermal and energy consumption data presented in interfaces 2500 and 2600 may be beneficial in the management of a campus or building, by allowing the user to view data trends and historical data to make decisions about future operations. It will be appreciated that, while interfaces 2500 and 2600 are described below with respect to floors of a 3D model, similar thermal and/or energy consumption data functionality may applied to other spaces or zones of a site, campus, or building (e.g., aggregate thermal or energy consumption data for zones, rooms, spaces, floors, buildings, etc.).

Interface 2500 is shown to include a 3D model 2510, generated from one or more BIMs. Much like 3D model 1910, 3D model 2510 may be generated by BIM viewer 534 and presented via user device 546. 3D model 2510 is shown to include a plurality of floors (i.e., levels, stories) in various shades or colors. The various shades may indicate an average aggregate temperature for each floor, for example. In some embodiments, the style or color of each floor is associated with a how closely the average temperature for each floor matches a minimum value 2512 or a maximum value 2514. For example, as a floor's average aggregate temperature approaches minimum value 2512, the color or style of the floor will more closely match that of the minimum value 2512.

In some embodiments, a user may be presented with a textual representation of the average aggregate temperature for each floor, as shown in a temperature table 2520. A user may also be able to select to view historical, live, or simulated, future thermal data via a navigation menu 2530. For example, a user may select to view historical thermal data for a previous month, week, or day. In another example, the user may view simulated thermal data over a selected time period, where the simulated future data is based on previously collected thermal data. The user may be presented with an animation of the thermal data, where the style or color of 3D model 2510 and/or the values presented in temperature table 2520 change with respect to the thermal data. This functionality may allow the user to view trends or identify other important information from the average temperature values of selected floors.

Interface 2600 is shown to include a 3D model 2610, generated from one or more BIMs. Much like 3D model 1910, 3D model 2610 may be generated by BIM viewer 534 and presented via user device 546. 3D model 2610 is shown to include a plurality of floors (i.e., levels, stories) in various styles or colors. The various shades may indicate an average aggregate energy consumption for each floor, for example. In some embodiments, the style or color of each floor is associated with a how closely aggregate energy consumption for each floor matches a minimum value 2612 or a maximum value 2614. For example, as a floor's aggregate energy consumption approaches minimum value 2612, the color or style of the floor will more closely match that of the minimum value 2612.

In some embodiments, a user may be presented with a textual representation of the aggregate energy consumption for each floor, as shown in an energy consumption table 2620. A user may also be able to select to view historical, live, or simulated, future energy consumption data via a navigation menu 2630. For example, a user may select to view historical energy consumption data for a previous month, week, or day. In another example, the user may view simulated energy consumption data over a selected time period, where the simulated future data is based on previously collected energy consumption data. The user may be presented with an animation of the energy consumption data, where the style or color of 3D model 2610 and/or the values presented in energy consumption table 2620 change with respect to the energy consumption data. This functionality may allow the user to view trends or identify other important information from the aggregate energy consumption values of selected floors.

Fault Tracer Logic

In many respects, a BIM can be a useful tool in identifying alarms, faults, or necessary maintenance events among building assets. As described above, for example, a BIM may act as a digital twin, providing a digital representation of a physical building asset. In this regard, the BIM may allow a user to interact with physical building assets via a 3D model, to view information regarding alarms, faults, and/or diagnostics. Viewing alarm, fault, and/or diagnostic data in this way can provide insight into how an alarm or fault may affect upstream or downstream assets of the problem asset, and may provide an easy to navigate and intuitive interface for viewing such data about multiple assets quickly. Viewing such data in a 3D model may also provide an indication to the physical location of a problem asset, thereby decreasing troubleshoot and/or maintenance times by aiding a user in navigating to the problem asset.

Figure 27:
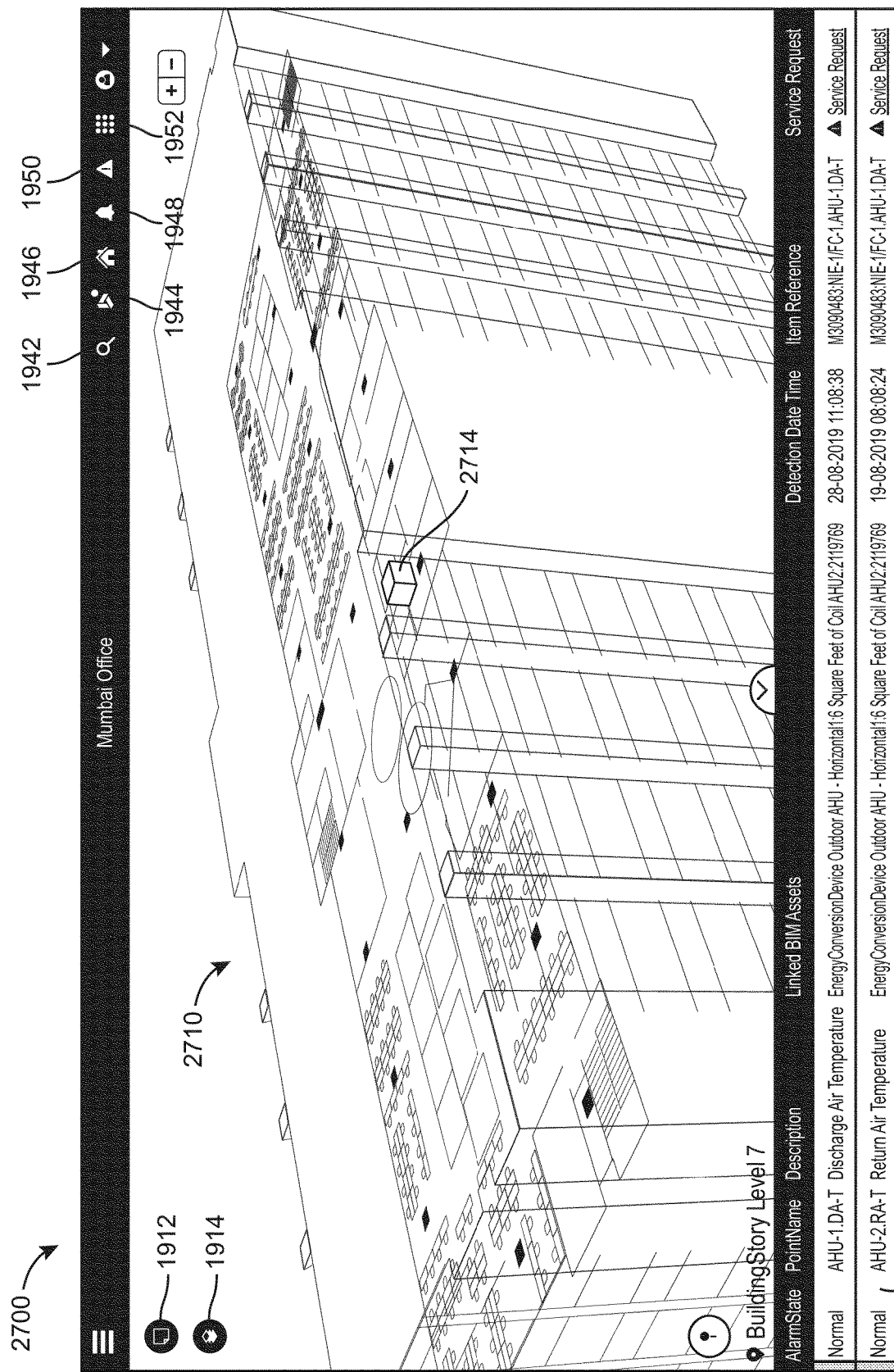
FIG. 27 is an example interface that shows alarm data associated with a building asset, according to some embodiments.

Referring now to FIG. 27, an example interface 2700 that shows alarm data associated with a building asset is shown, according to some embodiments. Interface 2700 may be presented to a user via user device 546, responsive to a selection of analytics icon 1944, for example. Interface 2700 is shown to provide a high-level 3D model 2710 of a building having a plurality of spaces (e.g., floors, levels, stories) and a plurality of building assets (e.g., equipment such as AHUs, VAVs, etc.). In some embodiments, alarms or faults associated with a physical building asset may be reflected within interface 2700, via a graphical object within 3D model 2710 (e.g., a BIM object) that corresponds to (i.e., represents) the physical building asset. Interface 2700 may also provide an overview of alarms or faults throughout the building by presenting a menu 2712 (e.g., list, table, etc.) of alarms and faults. In some embodiments, alarms and/or faults may be identify by alarm manager 538, as described above.

Shown within 3D model 2710 is an AHU object 2714. AHU object 2714 may be a digital representation of a physical building asset (e.g., an AHU) within the building represented by 3D model 2710, for example. In the event that the physical AHU associated with AHU object 2714 experiences an alarm or a fault, AHU object 2714 may provide a visual indication of the alarm or fault. For example, AHU object 2714 may highlight (e.g., change color or style), flash, or otherwise indicate the alarm or fault. In some embodiments, the alarm or fault may also be presented in menu 2712. Interface 2700, for example, shows AHU object 2714 experiencing a plurality of alarms.

By either selecting AHU object 2714, or one of the alarms from menu 2712, a user may be presented with additional information about the alarms. As shown in menu 2712, AHU object 2714 is experiencing a discharge air temperature alarm and a return air temperature alarm. The user may be presented with additional information such as an alarm state, a point name (e.g., of the BAS point associated with the alarm), a description, an indication of linked objects within the BIM (e.g., AHU object 2714), a detection time, a reference identifier, and a link to submit a service request, for example. In some embodiments, the user can use this information in developing a maintenance or service plan and tracking alarms and faults for building assets.

To increase efficiency and effectiveness in addressing alarms and fault among building assets, additional functionality can be included to trace alarms and faults through a system. For example, when a user selects a first object within a 3D model that indicates a fault, it may be useful for the user to be presented with an indication of additional objects that affect, or are affected by, the first object. Using FIG. 27 as an example, if a user selects AHU object 2714, it may be useful to present objects representing ductwork, terminal units, or other building assets that are served by the AHU associated with AHU object 2714. Such functionality, herein referred to as fault tracer logic, can provide the user with a visual indication of how an alarm or a fault in a particular building asset can affect upstream or downstream assets.

Figure 28:
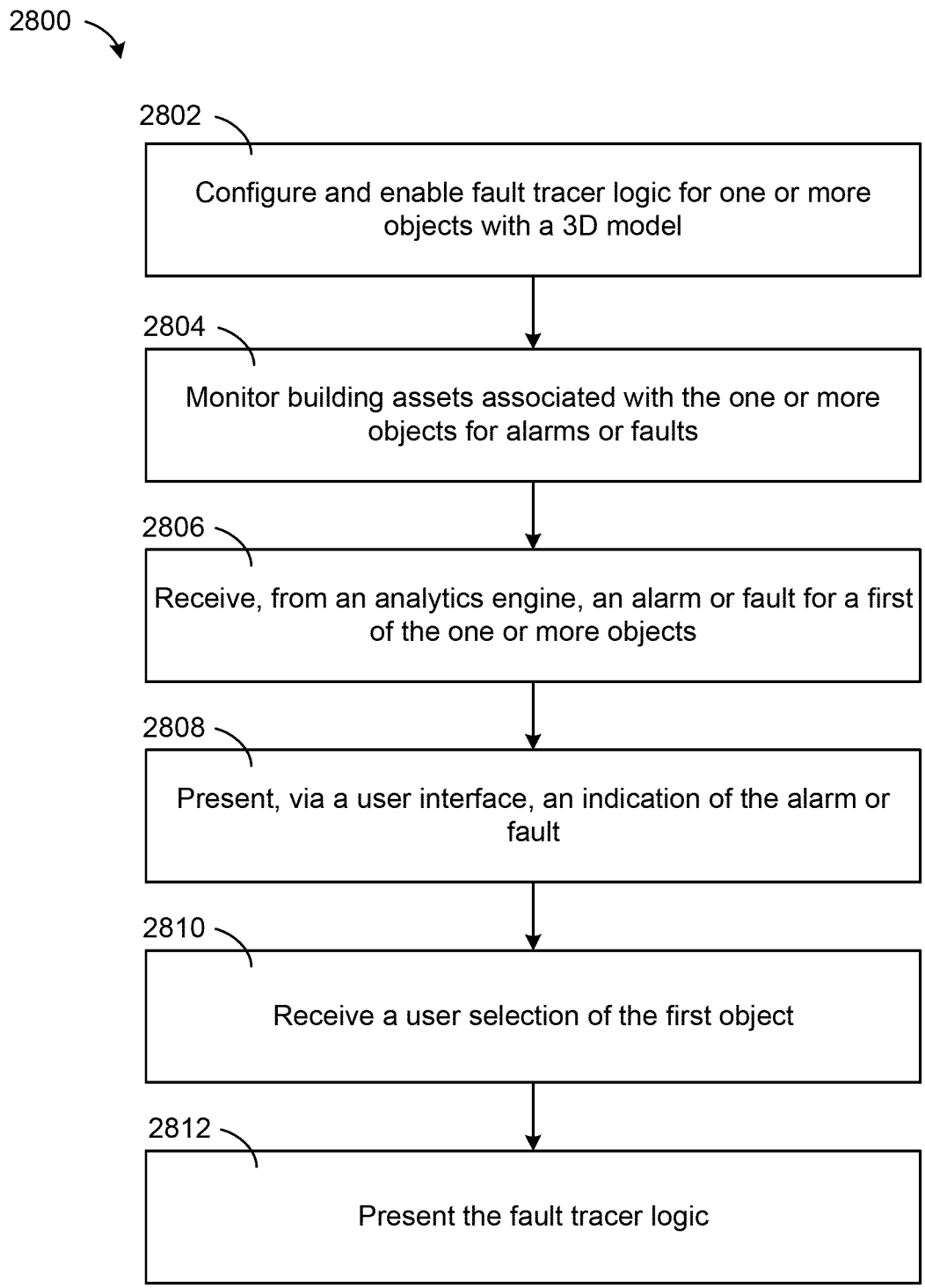
FIG. 28 is a process for configuring fault tracer logic, according to some embodiments.

Referring now to FIG. 28, a process 2800 for configuring fault tracer logic is shown, according to some embodiments. Process 2800 may be performed by tracer logic manager 540 in conjunction with alarm manager 538, for example. In some embodiments, portions of process 2800 are performed during the initial configuration of one or more BIMs. Process 2800 generally provides a method for configuring fault tracer logic and utilizing fault tracer logic to troubleshoot or service an alarm or fault for a building asset that is represented as a graphical object within a 3D model (e.g., 3D model 2710).

At step 2802, the fault tracer logic is configured by a user. In some embodiments, the fault tracer logic is configured by the user via user device 546 and the fault tracer logic configurations are generated based on user input by tracer logic manager 540. In various embodiments, fault tracer logic may be configured via a dedicated fault tracer logic configuration interface or directly within a 3D model (e.g., within a BIM viewer). In general, the user configures the fault tracer logic by selecting a first object (e.g., a graphical object) within the 3D model and identifying one or more upstream or downstream objects of the first object, where the upstream objects affect the first object and the downstream objects are affected by the first object. Each of the objects may be a digital representation of a building asset (e.g., a space or equipment). The identified upstream or downstream objects may then be linked to the first object by tracer logic manager 540.

As an example, the user may initiate a new instance of fault tracer logic for a first object (e.g., AHU object 2714) that represents a physical building asset (e.g., an AHU). The user may select the first object from a 3D model representing a building containing the physical building asset associated with the first object. The user may then identify one or more upstream or downstream objects representing physical building assets (e.g., terminating units such as VAVs, ductwork that connects the AHU to the VAVs) to the first object. In some embodiments, the user identifies upstream and downstream object by selecting the object and linking it to the first object. Once all the upstream and downstream objects are linked to the first object, the fault tracer logic configuration may be generated (e.g., by tracer logic manager 540) and stored (e.g., in network database 544). The user may subsequently select one or more fault tracer logic configurations (e.g., pre-configured for a plurality of objects) to enable or disable (e.g., to present or hide within the 3D model).

At step 2804, building assets represented by graphical objects configured for fault tracer logic are monitored for alarms and/or faults. In some embodiments, alarm manager 538 monitors the building assets in conjunction with an analytics engine associated with a BAS (e.g., BAS 400). The analytics engine may first receive data from a plurality of physical building assets (e.g., from sensors, equipment, spaces, etc.) and analyze the data to determine if one or more of the building assets is experiencing an alarm or fault condition. In the event that an alarm or fault is detected the analytics engine, a notification or other data may be sent to alarm manager 538.). In other embodiments, alarm manager 538 monitors the building assets directly.

At step 2806, an alarm and/or fault associated with a building asset is identified. In some embodiments, the alarm or fault is identified by alarm manager 538, responsive to a notification or other data received from the analytics engine. In additional to identifying the alarm or fault, information or additional data about the alarm or fault may be received. For example, information such as an alarm state, a point name (e.g., of the BAS point associated with the alarm), an indication of an object (e.g., a BIM object) associated with the point (e.g., AHU object 2714), a description of the alarm, a detection time, a reference identifier, or other information may also be identified or received.

At step 2808, the alarm or fault data is presented with a 3D model. In some embodiments, the alarm or fault is presented in an interface such as interface 2700, described above with respect to FIG. 27. The alarm or fault data may be presented as a list, table, text box, or other textual representation (e.g., menu 2712) of one or more alarms or faults. The alarm or fault data may also be presented within the 3D model, where a visual appearance of a graphical object (e.g., AHU object 2714) that represents the building asset associated with the alarm or fault is modified to indicate (e.g., highlight) the alarm or fault condition. As shown in FIG. 27, for example, AHU object 2714 may flash to indicate that the physical building asset represented by AHU object 2714 is experiencing an alarm or fault condition.

At step 2810, a user selection of a textual or graphical object that indicates an alarm or fault is received. In some embodiments, the user selection is received via user device 546. To continue the previous example, the user may make a selection of AHU object 2714, which indicates an alarm condition, from 3D model 2710. In another example, the user may select an alarm from menu 2712.

Figure 29:
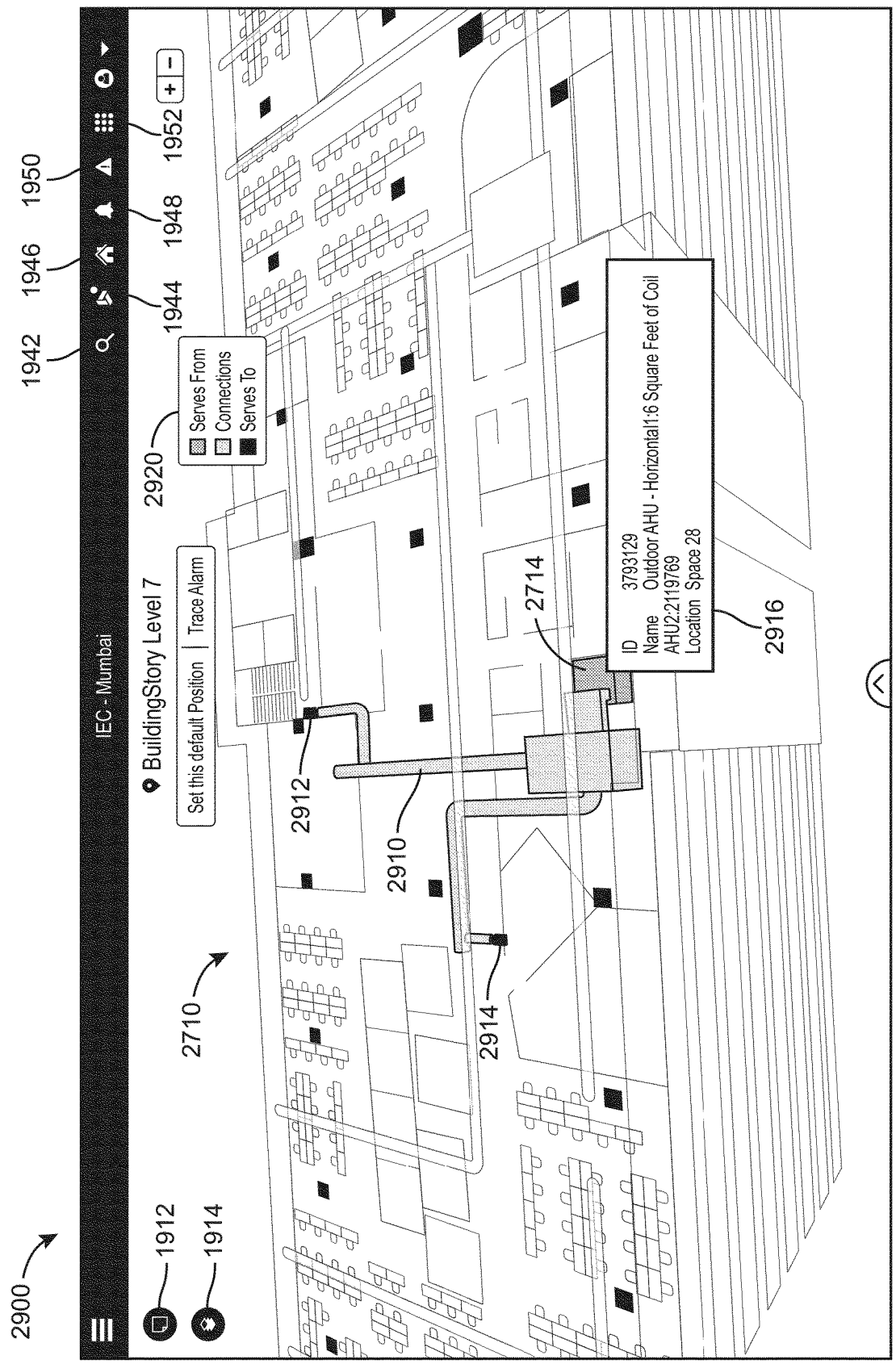
FIG. 29 is an example interface that shows fault tracer logic within a 3D model, according to some embodiments.

At step 2812, responsive to the user selection, the fault tracer logic is presented. In some embodiments, the fault tracer logic is presented to the user via user device 546, as shown in FIG. 29, described below in greater detail. The fault tracer logic may be presented by altering a visual appearance of the selected graphical object and any previously configured upstream or downstream objects. For example, responsive to the user selection of AHU object 2714, the visual appearance of AHU object 2714 and previously defined downstream objects just as ductwork and/or terminal units within 3D model 2710 may be altered. The visual appearance may alter by changing color or shading, flashing, or otherwise highlighting the selected graphical object and its associated upstream/downstream objects. The presentation of fault tracer logic is illustrated in FIG. 29, described in further detail below.

Referring now to FIG. 29, an example interface 2900 that shows the fault tracer logic within a 3D model is shown, according to some embodiments. In some embodiments, interface 2900 is an example of an interface presented to a user responsive to a selection of an object within a 3D model that has been configured for fault tracer logic. Interface 2900, for example, may be presented responsive to a selection of AHU object 2714, or responsive to a selection of an alarm associated with AHU object 2714 from menu 2712.

As shown, interface 2900 includes an alternate perspective view of 3D model 2710. A user may be presented with the alternate perspective view of 3D model 2710 as a result of panning, zooming in on, or otherwise manipulating 3D model 2710, for example. In some embodiments, the alternate perspective view is automatically presented responsive to the user selection of AHU object 2714.

Interface 2900 is shown to include a number of objects that represent downstream building assets associated with AHU object 2714, including a duct object 2910 and terminal unit objects 2912 and 2914. Duct object 2910 and terminal unit objects 2912 and 2914 may be BIM objects that correspond to physical building assets within the building represented by 3D model 2710. Responsive to a selection of AHU object 2714 and/or an alarm associated with said object, an appearance of duct object 2910 and terminal unit objects 2912 and 2914 may alter (e.g., a color change, highlighting, etc.) to indicate that said objects are affected by AHU object 2714. Additionally, a text box 2916 is presented that includes information about AHU object 2714, such as an identification number, a name, and a location. In some embodiments, text box 2918 can display more or less information about a selected object.

From the visual indication of interface 2900, a user can quickly determine how an alarm associated with AHU object 2714 may affect other building assets. For example, an alarm indicating a low output air temperature may indicate that rooms served by terminal units associated with terminal unit objects 2912 and/or 2914 may not reach a desire temperature setpoint. In another example, where one of terminal unit objects 2912 or 2914 represent a VAV, an alarm or fault indicated for the VAV may be traced back to the AHU represented by AHU object 2714. In this example, the alarm or fault indicated for the VAV may have actually been caused by the AHU, and fault tracer logic may provide such insight to a user.

In some embodiments, certain object or building asset relationships may be viewed without configuring fault tracer logic. Object or building asset relationships may be identified based on a hierarchy or site portfolio generated by portfolio generator 530, for example. Such functionality may reduce configuration time for a BIM while providing the user with an indication of how an object or building asset affects, or is affected by, other objects or building assets.

In some embodiments, a user may select any object within the 3D model and be presented with an interface similar to interface 2900. For example, a user may select a security device (e.g., a camera), a lighting device, a fire safety device, etc., and be presented with a fault tracer logic interface. In an example where a user selects an object that represents a security camera, the fault trace logic interface may show a communication path from the security camera to an associated server or recording device. In this regard, the fault tracer logic may provide the user with a visual indication of the relationships between any objects within the 3D model.

Figure 30:
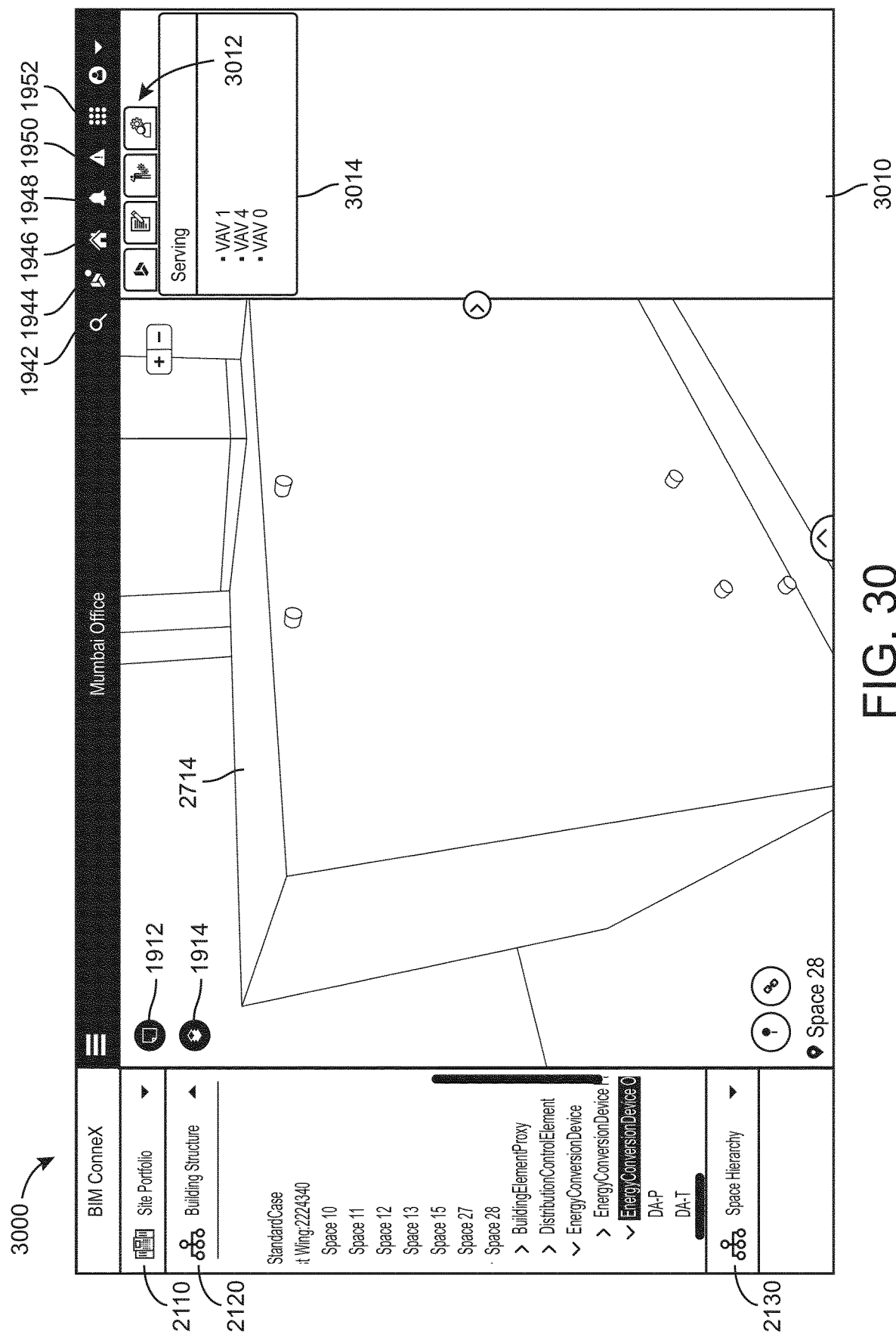
FIG. 30 is an example interface that presents object relationships within a 3D model viewer, according to some embodiments.

Referring now to FIG. 30, an example interface 3000 that presents object relationships within a 3D model viewer is shown, according to some embodiments. A user may be presented with interface 3000 responsive to a selection of a particular graphical object within a 3D model, for example. In some embodiments, interface 3000 may be an alternate view (i.e., perspective) of 3D model 2710. For example, a user may pan, zoom, or otherwise manipulate 3D model 2710 to achieve a perspective view such as that shown in FIG. 30. Such manipulation may provide a more focused view of a single graphical object within the 3D model, allowing the user to view a variety of additional information associated with the object.

Responsive to a selection of AHU object 2714, for example, additional information may be presented in an object menu 3010. In some embodiments, object menu 3010 may be presented within interface 3000 as an overlay, populated beside a graphical object (e.g., AHU object 2714) or covering the graphical object. Object menu 3010 is shown to include a number of navigation icons 3012 for navigating between submenus. One such submenu, a relationship submenu 3014, can present information regarding physical, mechanical, electrical, or other types of connections between building assets. For example, relationship submenu 3014 shows that an AHU (e.g., represented by AHU object 2714) serves a plurality of VAVs (e.g., VAV 0, VAV 1, and VAV 4).

Additionally, object menu 3010 may present information such as service or maintenance information for a building asset associated with the selected object. In some embodiments, service requests can be generated in response to an alarm, a fault, or a scheduled maintenance. Advantageously, providing service or maintenance information as an overlay to a graphical object representing a building asset may reduce the amount of time a user may need to spend searching for similar information (e.g., within a separate menu). Service and/or maintenance information may allow the user to track open or historical service request and monitor the health or status of building assets.

Figure 31:
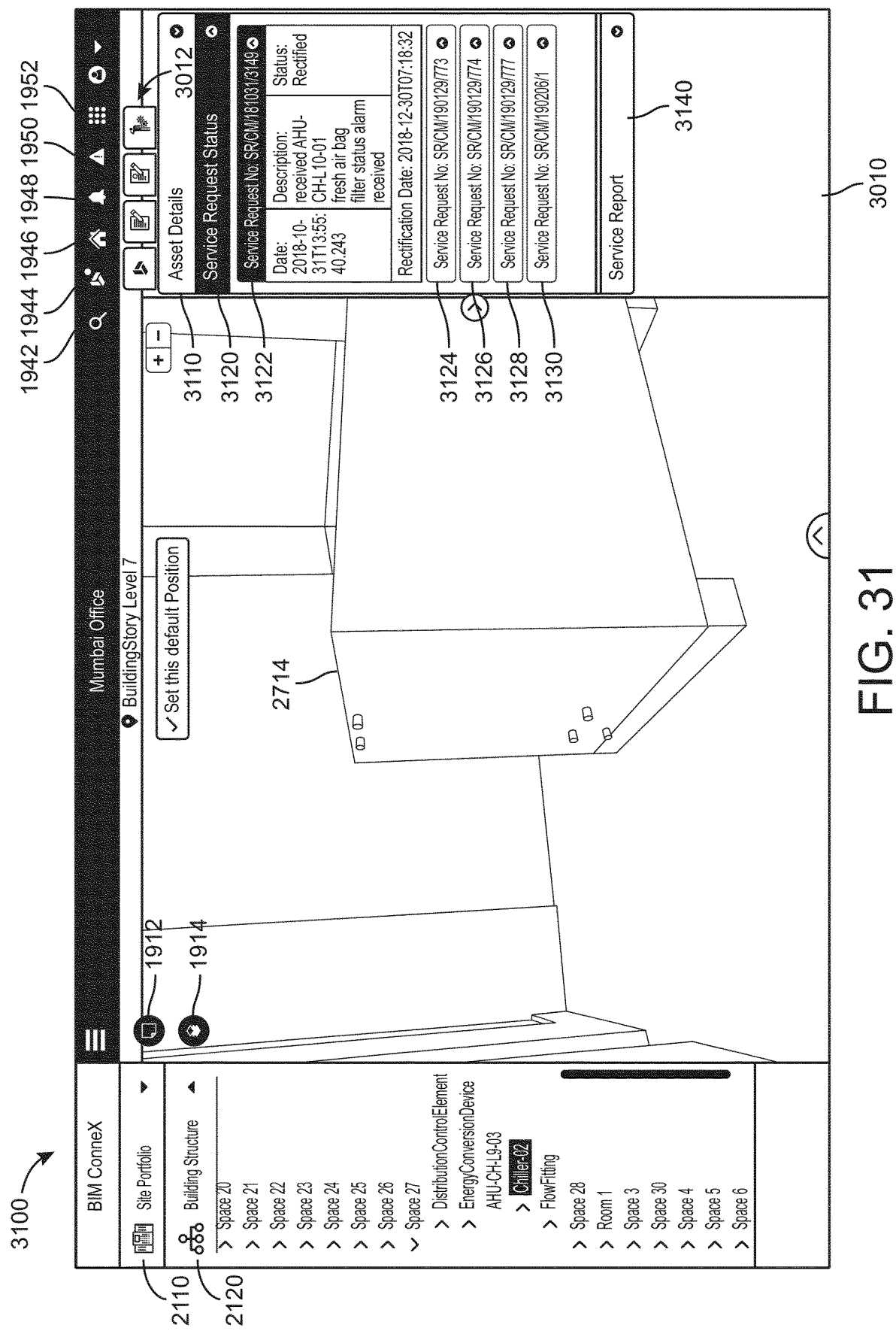
FIGS. 31 and 32 are example interfaces for viewing service information within a 3D model viewer, according to various embodiments.
Figure 32:
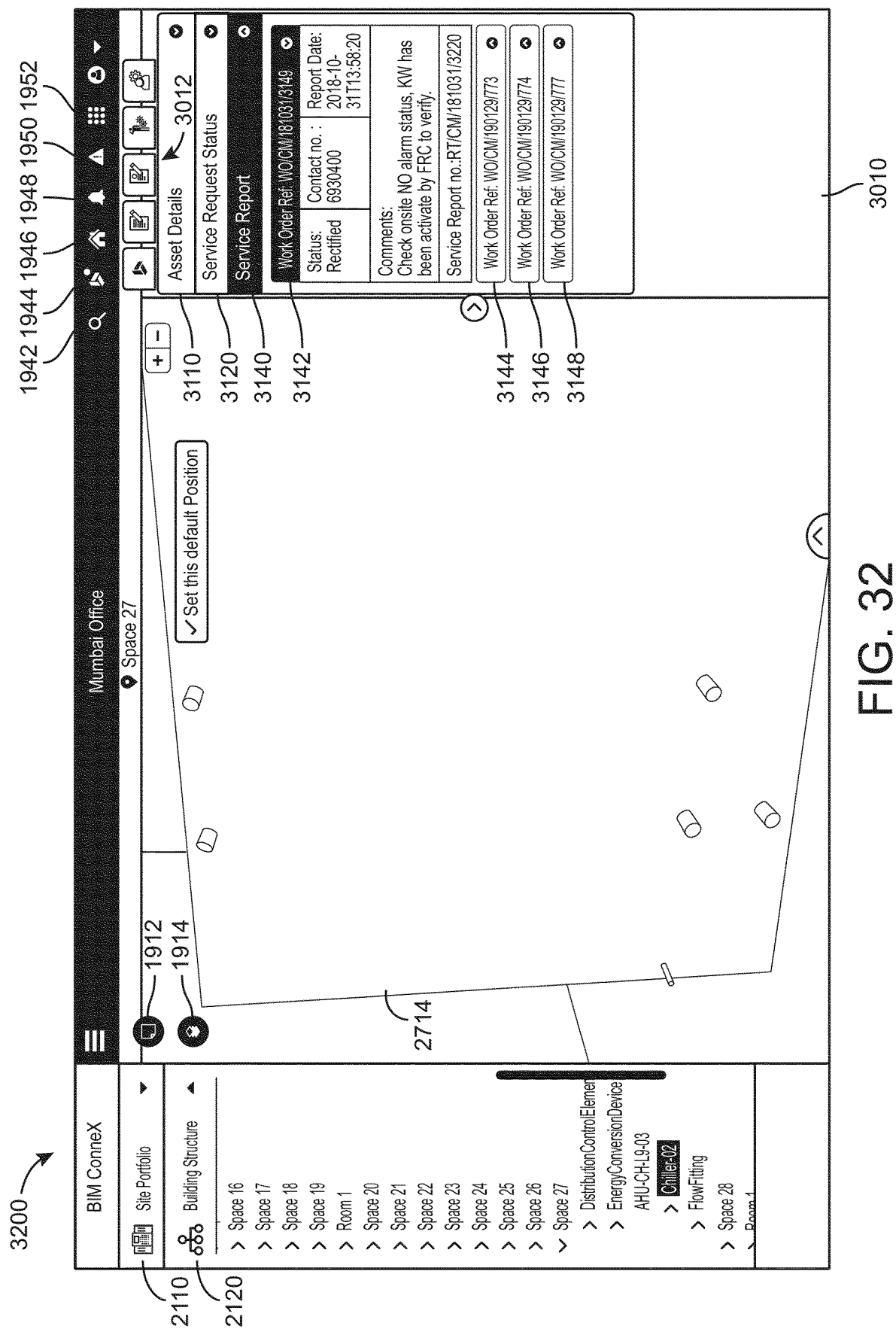

Referring now to FIGS. 31 and 32, example interfaces for viewing service information within a 3D model viewer are shown, according to various embodiments. Specifically, FIG. 31 is shown to include an example interface 3100 for viewing a service request status and FIG. 32 is shown to include an example interface 3200 for viewing historical service reports. In some embodiments, both interfaces 3100 and 3200 illustrate alternate views (i.e., perspectives) of 3D model 2710, described above. For example, a user may pan, zoom, or otherwise manipulate the 3D model to achieve a view such as that shown in FIGS. 31 and 32. Each of interfaces 3100 and 3200 are also shown to include a plurality of submenus, including an asset details menu 3110, a service request status menu 3120, and a service report menu 3140. In some embodiments, the submenus may be presented responsive to a user selection of one of navigation icons 3012.

In some embodiments, each of asset details menu 3110, service request status menu 3120, or service report menu 3140 may expand (e.g., drop-down) to present additional information, responsive to a user selection of a submenu. As shown in interface 3100, for example, selecting service request status menu 3120 may present the user with a drop-down menu, further presenting a number of service requests 3122-3130. One of the service requests may then be selected to present information associated with the service request. For example, service request 3122 may be selected to view information such as a service request number, a date, a description, a status, and a rectification date.

As shown in interface 3200, selecting service report menu 3140 may present the user with a drop-down menu that further presents a number of work orders 3142-3148. One of the work orders may be selected to present information associated with the selected work order. For example, work order 3142 may be selected to view information such as a work order reference number, a status, a contact number, a report date, comments, and a corresponding service report number.

In some embodiments, a user may also view other diagnostic data within the 3D model viewer. For example, the user may view diagnostic data other than the alarm data presented in interface 2700, and may navigate to the diagnostic data via object menu 3010, by selecting fault icon 1950, or by another method. Additional diagnostic data may aid the user in troubleshooting or servicing a faulty building asset.

Figure 33:
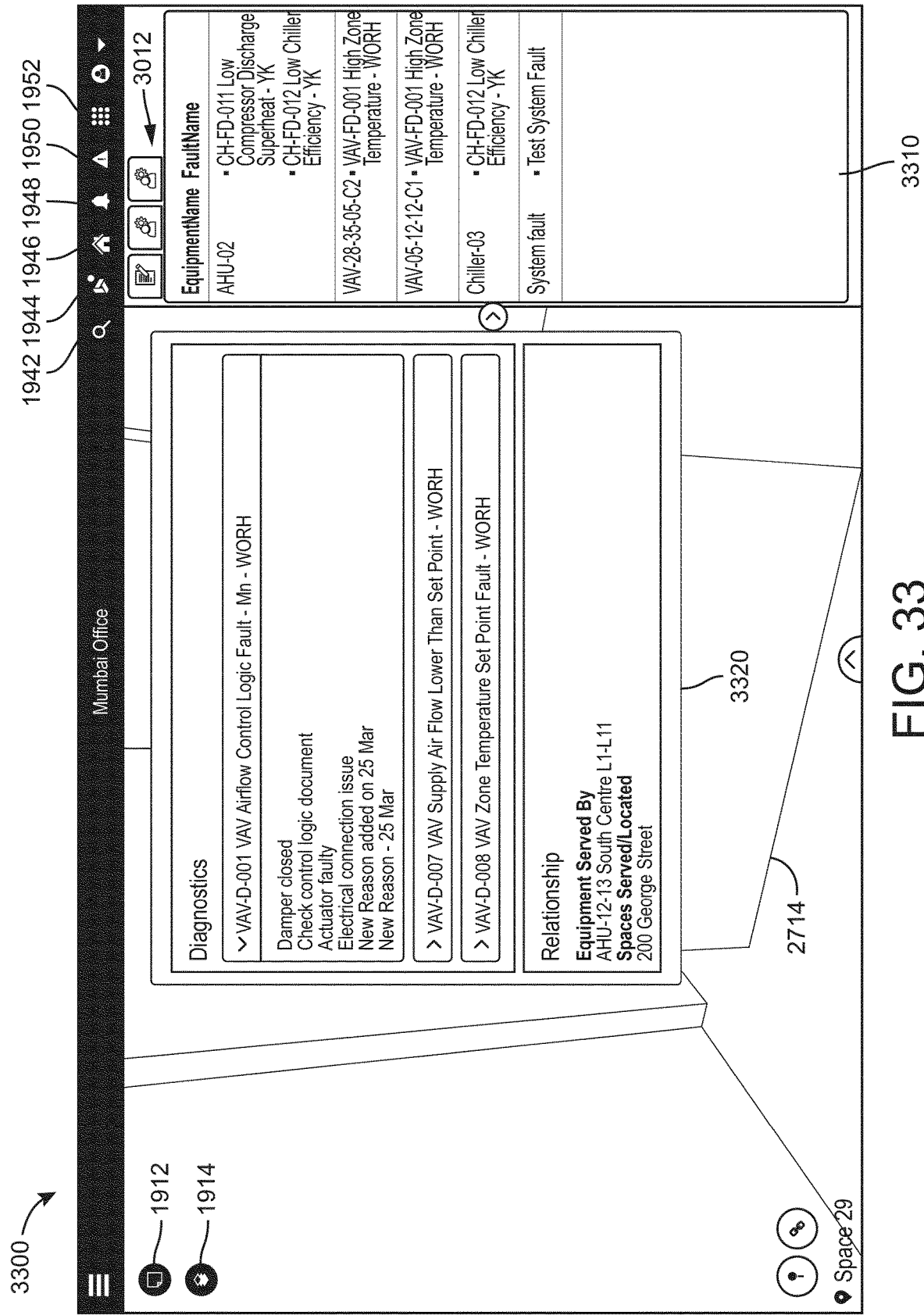
FIG. 33 is an example interface that presents diagnostic data as an overlay to a 3D model, according to some embodiments.

Referring now to FIG. 33, an example interface 3300 that presents diagnostic data as an overlay to a 3D model is shown, according to some embodiments. As described above, interface 3300 may be presented responsive to a selection of one of navigation icons 3012 or a selection of fault icon 1950, for example. Interface 3300 is shown to include a diagnostic menu 3310 within object menu 3010. Diagnostic menu 3310 is shown to provide fault data for a number of building assets. For example, "AHU-02" is shown to have two faults, including a "CH-FD-011 Low Compressor Discharge Superheat—YK" fault.

Additionally, interface 3300 is shown to include a diagnostic text box 3320. Diagnostic text box 3320 is shown superimposed (i.e., overlaid) on a 3D model (e.g., AHU object 2714). Diagnostic text box 3320 may provide additional information, beyond that found in diagnostic menu 3310. For example, diagnostic text box 3320 includes further details about specific faults (e.g., "damper closed", "actuator fault") for a particular building asset and may include additional information about the particular building asset such as relationship data. As described above, relationship data can be useful in troubleshooting and/or servicing building assets, by determining how a fault in a first building asset may affect upstream or downstream assets of the first asset.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and are considered to be within the scope of the disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor.

When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system comprising:
one or more memory devices having instructions stored thereon that, when executed by one or more processors, cause the one or more processors to perform operations comprising:
  obtaining building information model (BIM) data associated with a building comprising one or more building assets;
  identifying one or more BIM objects within the BIM data, the one or more BIM objects associated with the one or more building assets;
  identifying one or more object relationships between the one or more BIM objects, wherein the one or more BIM objects and the one or more object relationships are defined according to a semantic description schema;
  applying, based on the semantic description schema, semantic descriptions to the one or more BIM objects and the one or more object relationships, wherein the semantic descriptions change an identification of the one or more BIM objects and the one or more object relationships within a hierarchy structure according to the semantic description schema, the identification comprising natural language data to visualize the one or more BIM objects and the one or more object relationships in a graph;
  generating, based on an application of the semantic descriptions according to the semantic description schema, the hierarchy structure for the building based on the one or more BIM objects, the one or more object relationships, and the application of the semantic descriptions; and
  controlling the one or more building assets based on a building model that is generated using the hierarchy structure.

2. The system of claim 1, the operations further comprising extracting metadata from the BIM data, wherein the metadata is used to identify the one or more BIM objects and the one or more object relationships.

3. The system of claim 1, the operations further comprising mapping the one or more BIM objects to points within a building automation system (BAS) associated with the building, wherein the points within the BAS correspond to the one or more building assets.

4. The system of claim 1, wherein the BIM data is received as one or more industry foundation class (IFC) files.

5. The system of claim 1, wherein the semantic descriptions describe the one or more BIM objects and the one or more object relationships in a natural language.

6. The system of claim 1, wherein the operations further comprise applying the semantic descriptions to map the one or more BIM objects and the one or more object relationships to a Brick schema.

7. The system of claim 1, wherein the one or more building assets comprise building equipment and spaces within the building.

8. The system of claim 1, the operations further comprising generating a 3D model of the building based on the BIM data, the 3D model comprising the semantic descriptions of the one or more BIM objects and the one or more object relationships.

9. The system of claim 1, wherein the hierarchy structure defines physical or spatial relationships between the one or more BIM objects.

10. The system of claim 1, wherein generating the hierarchy structure comprises:
identifying hierarchy levels associated with the one or more BIM objects based on the one or more object relationships; and
ordering the one or more BIM objects based in an associated hierarchy level.

11. A method comprising:
obtaining, by one or more processors, building information model (BIM) data associated with a building comprising one or more building assets;
identifying, by the one or more processors, one or more BIM objects within the BIM, the one or more BIM objects associated with the one or more building assets;
identifying, by the one or more processors, one or more object relationships between the one or more BIM objects, wherein the one or more BIM objects and the one or more object relationships are defined according to a semantic description schema;
applying, based on the semantic description schema, semantic descriptions to the one or more BIM objects and the one or more object relationships, wherein the semantic descriptions change an identification of the one or more BIM objects and the one or more object relationships within a hierarchy structure according to the semantic description schema, the identification comprising natural language data to visualize the one or more BIM objects and the one or more object relationships in a graph;
generating, by the one or more processors, based on an application of the semantic descriptions according to the semantic description schema, the hierarchy structure for the building based on the one or more BIM objects, the one or more object relationships, and the application of the semantic descriptions; and
controlling the one or more building assets based on a building model that is generated using the hierarchy structure.

12. The method of claim 11, further comprising extracting, by the one or more processors, metadata from the BIM data, wherein the metadata is used to identify the one or more BIM objects and the one or more object relationships.

13. The method of claim 11, further comprising mapping, by the one or more processors, the one or more BIM objects to points within a building automation system (BAS) associated with the building, wherein the points within the BAS correspond to one of the one or more building assets.

14. The method of claim 11, wherein the BIM data is obtained as one or more industry foundation class (IFC) files.

15. The method of claim 11, wherein the semantic descriptions describe the one or more BIM objects and the one or more object relationships in a natural language.

16. The method of claim 11, further comprising applying the semantic descriptions to map the one or more BIM objects and the one or more object relationships to a Brick schema.

17. The method of claim 11, wherein the one or more building assets comprise building equipment and spaces.

18. The method of claim 11, further comprising generating, by the one or more processors, a 3D model of the building based on the BIM data, the 3D model comprising the semantic descriptions of the one or more BIM objects and the one or more object relationships.

19. The method of claim 11, wherein the hierarchy structure defines physical or spatial relationships between the one or more BIM objects.

20. A non-transitory computer readable media having instructions stored thereon that, when executed by one or more processors, cause the one or more processors to perform operations comprising:
- obtaining building information model (BIM) data associated with a building comprising one or more building assets;
- extracting metadata from the BIM data to identify one or more BIM objects associated with the one or more building assets and one or more object relationships between the one or more BIM objects;
- applying, based on a semantic description schema, semantic descriptions to the one or more BIM objects and the one or more object relationships, wherein the semantic descriptions change an identification of the one or more BIM objects and the one or more object relationships within a hierarchy structure according to the semantic description schema, the identification comprising natural language data to visualize the one or more BIM objects and the one or more object relationships in a graph;
- generating, based on an application of the semantic descriptions according to the semantic description schema, the hierarchy structure for the building based on the one or more BIM objects, the relationships, and the application of the semantic descriptions;
- controlling the one or more building assets based on a building model that is generated using the hierarchy structure; and
- presenting, via a user interface of a user device, the hierarchy structure.

* * * * *